(12) United States Patent
Welch, Jr. et al.

(10) Patent No.: US 7,952,218 B2
(45) Date of Patent: May 31, 2011

(54) BUOYANCY PUMP POWER SYSTEM

(75) Inventors: Kenneth W. Welch, Jr., Willis, TX (US);
Curtis J. Rothi, Anoka, MN (US);
Harold L. Rothi, Otsego, MN (US)

(73) Assignee: Independent Natural Resources, Inc., Eden Prairie, MN (US)

( * ) Notice: Subject to any disclaimer, the term of this patent is extended or adjusted under 35 U.S.C. 154(b) by 0 days.

(21) Appl. No.: 12/775,357

(22) Filed: May 6, 2010

(65) Prior Publication Data

US 2010/0215518 A1 Aug. 26, 2010

Related U.S. Application Data

(63) Continuation of application No. 12/011,708, filed on Jan. 29, 2008, now Pat. No. 7,737,572, which is a continuation of application No. 11/303,772, filed on Dec. 16, 2005, now Pat. No. 7,331,174.

(60) Provisional application No. 60/636,492, filed on Dec. 16, 2004, provisional application No. 60/653,618, filed on Feb. 16, 2005.

(51) Int. Cl.
*F04B 35/00* (2006.01)
*F03B 13/12* (2006.01)

(52) U.S. Cl. .............. 290/53; 290/42; 417/333

(58) Field of Classification Search .......... 290/43, 290/44, 53, 54, 55; 417/333
See application file for complete search history.

(56) References Cited

U.S. PATENT DOCUMENTS

| | | | | | |
|---|---|---|---|---|---|
| 3,487,228 | A * | 12/1969 | Kriegel | ............ | 290/52 |
| 4,103,490 | A * | 8/1978 | Gorlov | ............ | 60/398 |
| 4,208,878 | A * | 6/1980 | Rainey | ............ | 60/496 |
| 4,883,411 | A * | 11/1989 | Windle | ............ | 417/331 |
| 5,186,822 | A * | 2/1993 | Tzong et al. | ............ | 210/122 |
| 6,953,328 | B2 * | 10/2005 | Welch et al. | ............ | 417/333 |
| 7,059,123 | B2 * | 6/2006 | Welch et al. | ............ | 60/398 |
| 7,331,174 | B2 * | 2/2008 | Welch et al. | ............ | 60/398 |
| 7,584,609 | B2 * | 9/2009 | Welch et al. | ............ | 60/398 |
| 7,735,317 | B2 * | 6/2010 | Welch, Jr. | ............ | 60/398 |
| 7,737,572 | B2 * | 6/2010 | Welch et al. | ............ | 290/53 |
| 2008/0001410 | A1 * | 1/2008 | Welch | ............ | 290/53 |

* cited by examiner

*Primary Examiner* — Nicholas Ponomarenko
(74) *Attorney, Agent, or Firm* — SNR Denton US LLP

(57) ABSTRACT

A system for generating electricity includes a pump operable to convert wave motion from a body of water into mechanical energy. The pump includes an input port through which an operating fluid can enter the pump and an output port through which the operating fluid can exit the pump. A first outlet line and a second outlet line are fluidly coupled to the output port of the pump. A first reservoir is fluidly connected to the first outlet line, and a second reservoir is fluidly connected to the second outlet line, both reservoirs being selectively capable of receiving operating fluid driven through the output port.

15 Claims, 34 Drawing Sheets

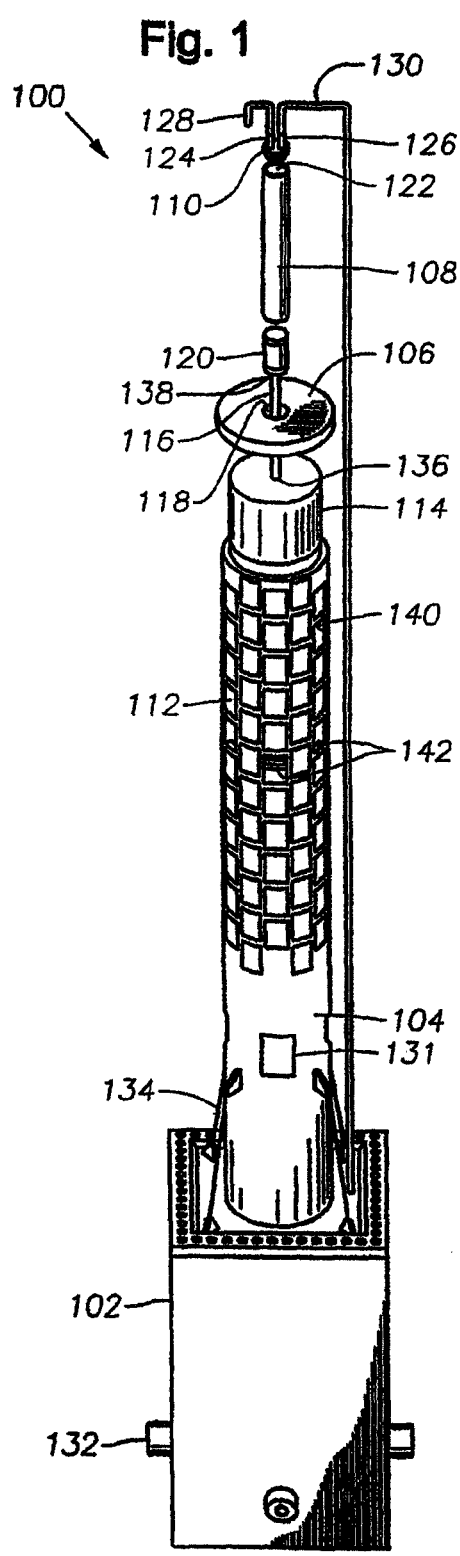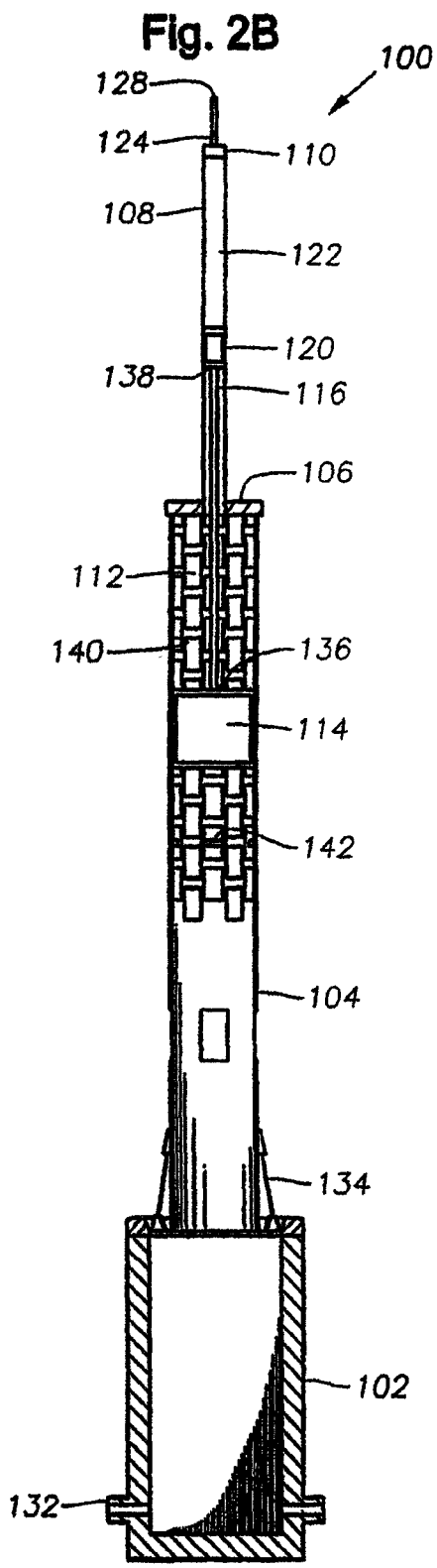

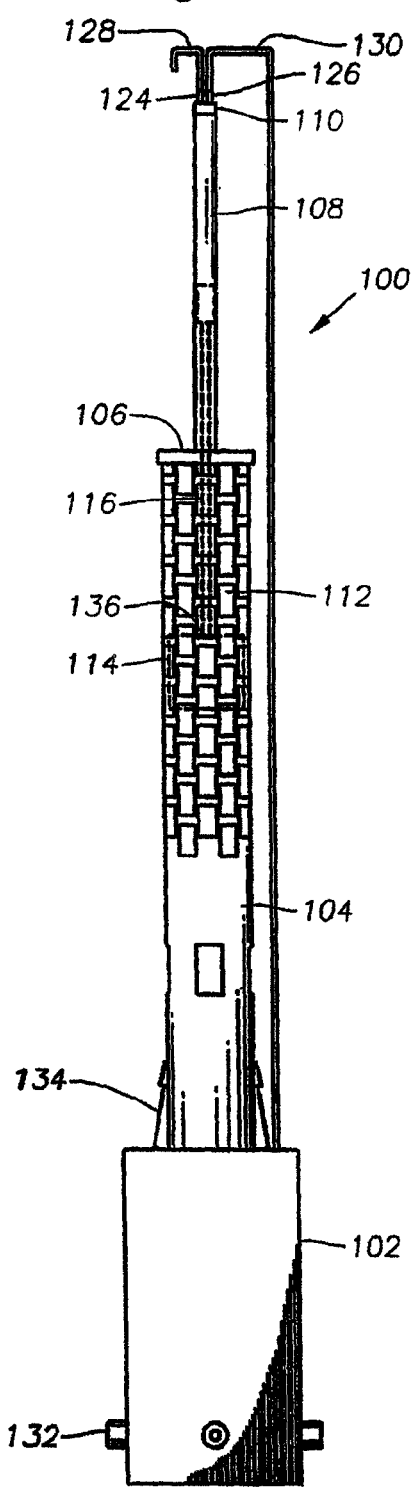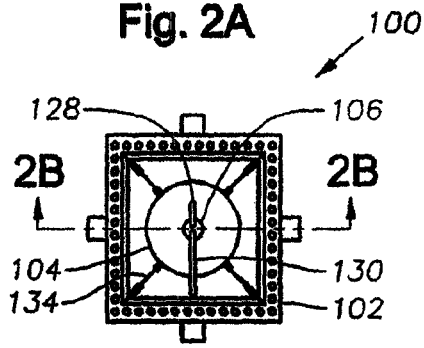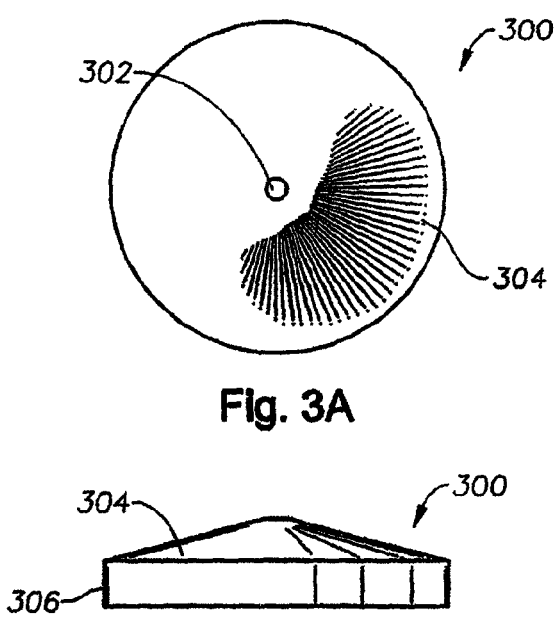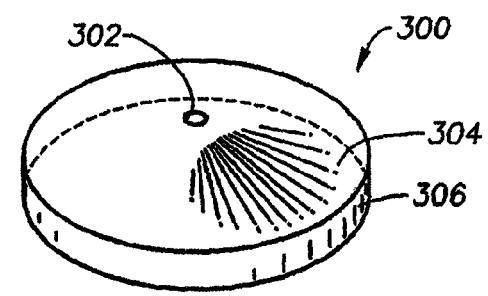

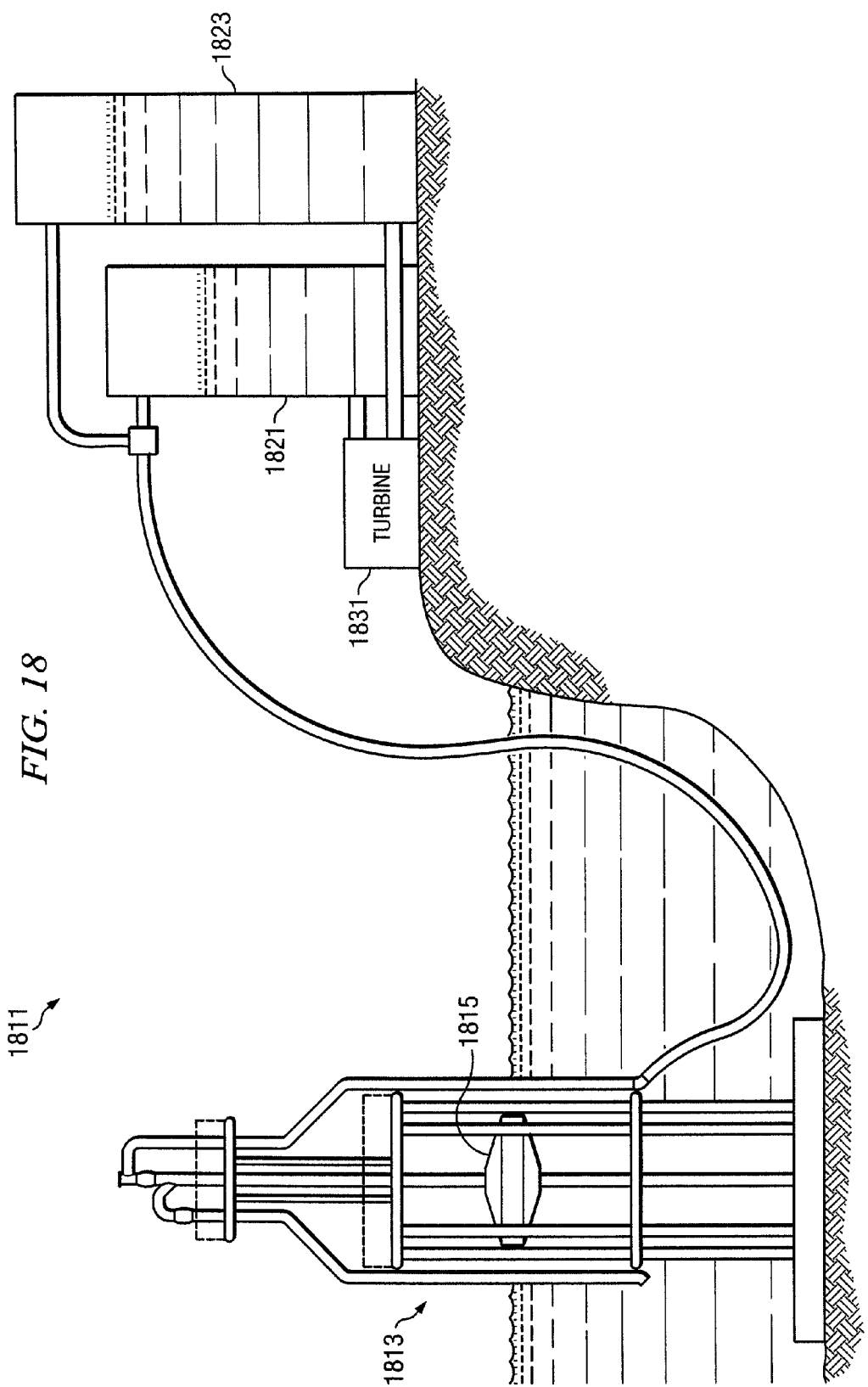

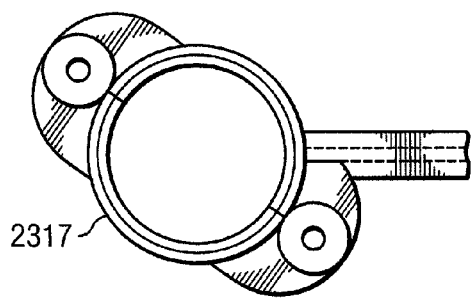
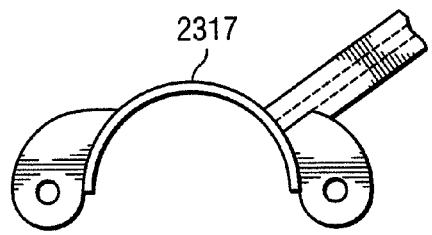
FIG. 22A        FIG. 22B
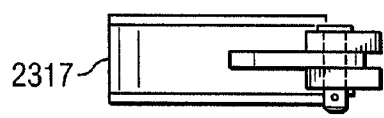
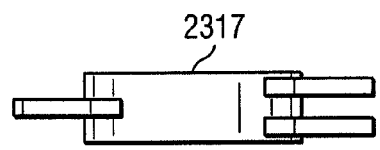
FIG. 22C        FIG. 22D
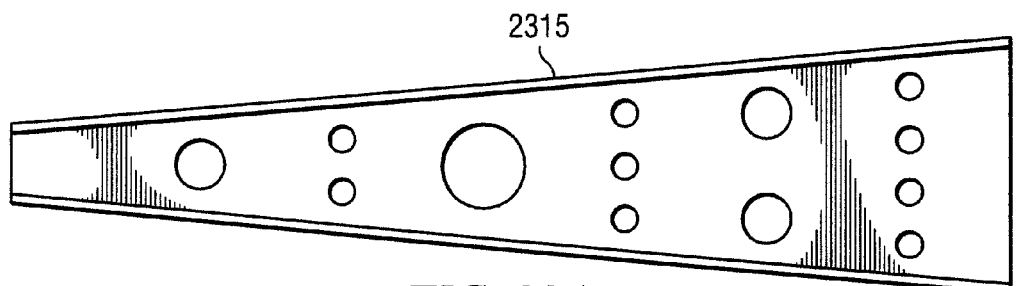
FIG. 23A
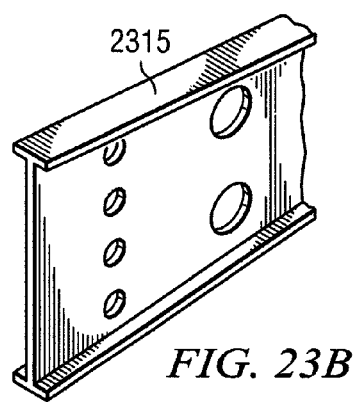
FIG. 23B

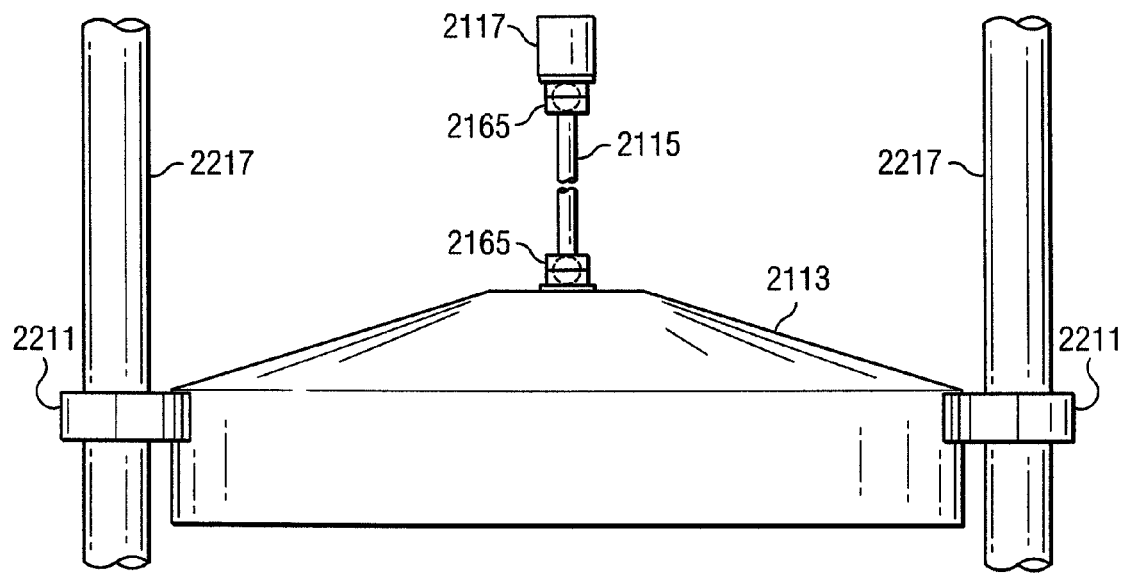
FIG. 26
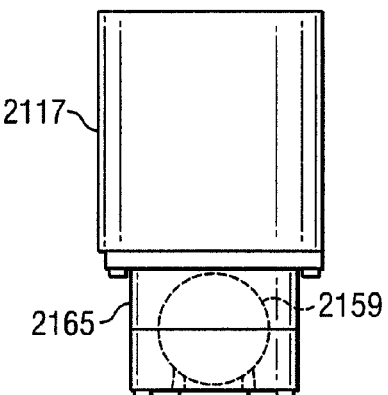
FIG. 27
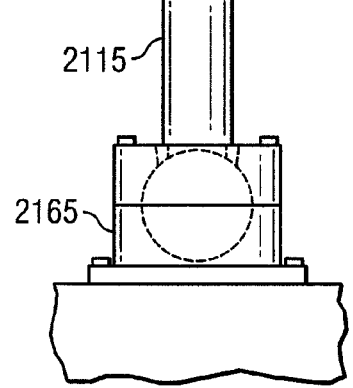

FIG. 30
FIG. 31
FIG. 32
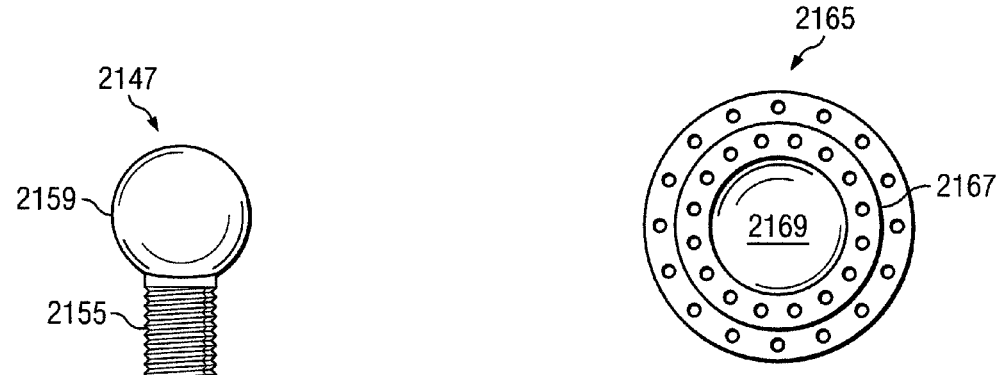
FIG. 33
FIG. 34A
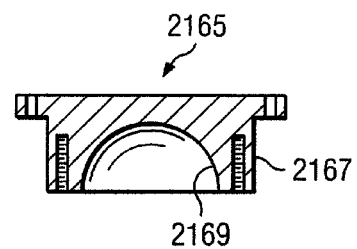
FIG. 34B

BUOYANCY PUMP POWER SYSTEM

CROSS-REFERENCE TO RELATED APPLICATIONS

This application is a continuation of U.S. application Ser. No. 12/011,708, filed Jan. 29, 2008 now U.S. Pat. No. 7,737,572, which is a continuation of U.S. application Ser. No. 11/303,772, filed Dec. 16, 2005, now U.S. Pat. No. 7,331,174, which claims the benefit of and priority to U.S. Provisional Application No. 60/636,492, filed Dec. 16, 2004, and U.S. Provisional Application No. 60/653,618, filed Feb. 16, 2005, all of which are hereby incorporated by reference.

BACKGROUND OF THE INVENTION

1. Field of the Invention

The present invention relates, in general, to a pumping device, and more particular but not by way of limitation, to a buoyancy pumping device in a buoyancy pump power system that utilizes a moving volume of water to move gas, liquid and combinations thereof from a first location to a second location.

2. Description of Related Art

There have been many attempts to harness what is commonly referred as to wave phenomena and to translate energy observed in wave phenomena into usable, reliable energy sources. Wave phenomena involves the transmission of energy and momentum by means by vibratory impulses through various states of matter, and in the case of electromagnetic waves for example, through a vacuum. Theoretically, the medium itself does not move as the energy passes through. The particles that make up the medium simply move in a translational or angular (orbital) pattern transmitting energy from one to another. Waves, such as those on an ocean surface, have particle movements that are neither longitudinal nor transverse. Rather, movement of particles in the wave typically involve components of both longitudinal and transverse waves. Longitudinal waves typically involve particles moving back and forth in a direction of energy transmission. These waves transmit energy through all states of matter. Transverse waves typically involve particles moving back and forth at right angles to the direction of energy transmission. These waves transmit energy only through solids. In an orbital wave, particles move in an orbital path. These waves transmit energy along an interface between two fluids (liquids or gases).

Waves occurring for example on an ocean surface, typically involve components of both the longitudinal wave and the transverse wave, since the particles in the ocean wave move in circular orbits at an interface between the atmosphere and the ocean. Waves typically have several readily identifiable characteristics. Such characteristics include: the crest, which is the highest point of the wave; the trough, which is the lowest point of the wave; the height, which is the vertical distance between a crest and trough; the wave length, which is the horizontal distance between a crest and trough; the period, which is the time that elapses during the passing of one wave length; the frequency, which is the number of waves that passed at a fixed point per unit of time; and the amplitude, which is half the height distance and equal to the energy of the wave.

There have been many attempts to harness and utilize energy produced by wave phenomena going back to the turn of the last century, such as the system disclosed in U.S. Pat. No. 597,833, issued Jan. 25, 1898. These attempts have included erecting a sea wall to capture energy derived from the wave phenomena; utilizing track and rail systems involving complex machinations to harness energy from wave phenomena; development of pump systems that are adapted only for shallow water wave systems; and construction of towers and the like near the sea shore where the ebb and flow of the tide occurs. Still other attempts have been made as well which are not described in detail herein.

Each of these systems is replete with problems. For example, certain systems which are adapted for sea water use are subjected accordingly to the harsh environment. These systems involve numerous mechanical parts which require constant maintenance and replacement, and therefore make the system undesirable. Other systems are limited to construction only at sea shore or in shallow water, which limit placement of the systems and therefore make the systems undesirable. Finally, other systems fail to use the full energy provided by the wave phenomena, and therefore waste energy through collection, resulting in an inefficient system.

Depletions in traditional energy sources, such as oil, have required the need for an efficient alternate sources of energy. The greenhouse effect, which is believed to be causes for such phenomena as global warming and the like, further establish the need for an environment-friendly energy creating device. The decline in readily available traditional fuel sources has lead to an increase in the costs of energy, which is felt globally. This adds yet another need for the creation of an environment-friendly, high efficiency, low cost energy device.

The need for readily available, cheaper sources of energy are also keenly felt around the world. In places such as China for example, rivers are being dammed up to create a large energy supply for a fast and growing population. Such projects can take twenty or more years to finish. The availability of the energy created by such a damming project does not even begin until completion of the project. Accordingly, there is yet another need for an energy device which provides energy immediately upon construction and has a short construction period.

BRIEF SUMMARY OF THE INVENTION

The above identified problems and needs are solved by a system of buoyancy pump devices driven by waves or currents according to the principles of the present invention. The buoyancy pump devices include a buoyancy block housing defining a buoyancy chamber therein through which the fluid may flow. A buoyancy block is disposed within the buoyancy chamber to move axially therein in a first direction responsive to rising of the fluid in the buoyancy chamber and a second direction responsive to lowering of the fluid in the buoyancy chamber.

A piston cylinder is connected to the buoyancy block housing and has at least one valve disposed therein operating as an inlet in response to movement of the buoyancy block in the second direction and an outlet in response to movement of the buoyancy block in the first direction. A piston is slideably disposed within the piston cylinder and connected to the buoyancy block, the piston being moveable in the first and second directions and responsive to movement of the buoyancy block in the second direction to draw a fluid substance into the piston cylinder through the at least one valve, and responsive to movement of the buoyancy block in the first direction to output the fluid substance through the at least one valve.

If the buoyancy pump devices are configured to pump liquid, the buoyancy pump devices are connected to a common liquid storage facility. The stored liquid is then utilized to power a liquid turbine for generation of power. If gas is the media to be pumped, the buoyancy pump devices are connected to common gas storage facility. The stored gas is then utilized to power a gas turbine for generation of power.

One embodiment for generating electricity includes a system and method for converting wave motion into mechanical power. A fluid substance or matter is driven as a function of the mechanical power to a reservoir. The fluid matter is flowed from the reservoir. At least a portion of a kinetic energy of the flowing fluid matter is converted into electrical energy. The fluid matter may be liquid or gas.

In designing the buoyancy pump devices to be located at a location in a body of water, a system and method for designing a buoyancy pump device may be utilized. The system may include a computing system including a processor operable to execute software. The software receives input parameters containing historical wave data from an area of the body of water and calculates at least one dimension of a buoyancy device of the buoyancy pump device as a function of the input parameters. The dimension(s) of the buoyancy device are adapted to enable the buoyancy device to create lift pressure for a fluid matter being driven by the buoyancy pump device.

Another embodiment according to the principles of the present invention includes a system and method for generating electricity from a turbine as a function of wave energy from a body of water. The system includes buoyancy pump devices configured in the body of water at spacings to enable a wave (i) to substantially re-form after passing at least one first buoyancy pump device and (ii) to drive at least one second buoyancy pump device. The buoyancy pump devices are operable to displace a fluid matter to drive the turbine.

The above as well as additional objectives, features, and advantages of the present invention will become apparent in the following detailed written description.

BRIEF DESCRIPTION OF THE DRAWINGS

A more complete understanding of the method and apparatus of the present invention may be obtained by reference to the following Detailed Description, with like reference numerals denoting like elements, when taken in conjunction with the accompanying Drawings wherein:

FIG. 1 is an exploded side-elevational view of a buoyancy pump device in a first embodiment in accordance with the principles of the present invention for use in a buoyancy pump power system;

FIG. 2A is a top plan view of the buoyancy pump device of FIG. 1;

FIG. 2B is a cross-section of FIG. 2A taken along line 2B-2B;

FIG. 2C is a side plan of the assembled buoyancy pump device of FIG. 1;

FIGS. 3A-3C are top plan, side, and isometric elevational views of an exemplary buoyancy block in accordance with the principles of the present invention;

FIG. 18 is a buoyancy pump system according to an embodiment of the present invention having a plurality of reservoirs capable of receiving operating fluid driven by the buoyancy pump system;

FIGS. 22A-22D illustrate top, top partial, front, and front partial views, respectively, of a sleeve used to attach the struts of FIG. 21 to the pilings;

FIGS. 23A and 23B illustrate front and perspective views, respectively, of one of the struts of FIG. 21;

FIG. 26 illustrates a front view of the buoyancy block, piston shaft, and piston of FIG. 20;

FIG. 27 illustrates an enlarged front view of the piston assembly, including the piston shaft the piston of FIG. 20, and a ball joint connecting the piston shaft to the piston;

FIGS. 30, 31, and 32 each illustrate a front view of one of the nested tubes of FIG. 29;

FIG. 33 illustrates a front view of one of the ball fittings of FIG. 29;

FIGS. 34A and 34B illustrate front and bottom views, respectively, of a cap portion of the ball joint of FIG. 27;

FIGS. 37A and 37B illustrate top and front views, respectively, of one portion of the slide mount of FIG. 36A, while

DETAILED DESCRIPTION OF THE PREFERRED EMBODIMENT

Figure 3D:
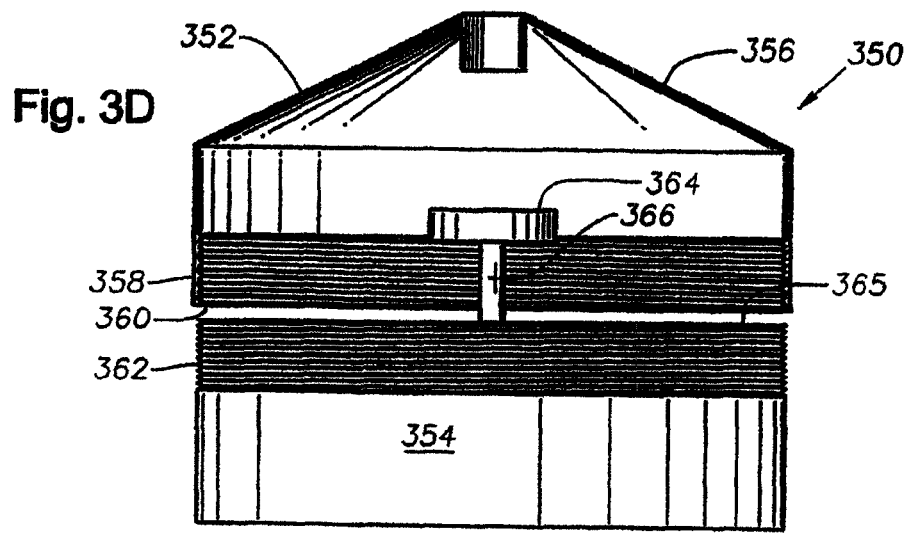
FIG. 3D is a partial cross-section of an exemplary buoyancy block having a telescoping portion.

In the following detailed description of the preferred embodiments, reference is made to the accompanying drawings, which form a part hereof and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

To solve the problems identified above, a buoyancy pump device is provided to convert the potential energy that exists in the natural movement of very large volumes of water found in the form of, but not limited to, oceans, lakes, and rivers in the form of swells and waves into mechanical energy at a relatively high efficiency. The buoyancy pump device is adaptable to pump both gas and liquid, or combinations of both. As such and as referred to herein, gas is defined as both fluid or gas, thereby including both air and water. The pumped gas or liquid, as a mechanical energy source, may then be utilized to power turbines, air tools, ventilation, or any other mechanical devices using this form of power. The mechanical energy source may also be used for the creation of electrical energy utilizing similar mechanical conversion devices.

Referring now to FIG. 1 through FIG. 2C in combination, a buoyancy pump device 100 is shown in various views according to a first embodiment of the present invention. The buoyancy pump device 100 includes a base 102, a buoyancy cylinder 104 connected at one end to the base 102 and closed at the other end by a buoyancy cylinder cap 106, and a piston cylinder 108 connected at one end to the buoyancy cylinder cap 106 and aligned generally coaxially with the buoyancy cylinder 104. The other end of the piston cylinder 108 is closed by a piston cylinder cap 110. The buoyancy cylinder 104 is closed at one end by the upper surface of the base 102 and at the other end by the buoyancy cylinder cap 106 to define a buoyancy chamber 112 therein.

A buoyancy block 114 generally cylindrical in shape is slideably positioned within the buoyancy chamber 112 to move axially therein. A piston shaft 116 connected to the upper end of the buoyancy block 114 extends generally axially therefrom through an opening 118 in the buoyancy cylinder cap 106. A piston 120 generally cylindrical in shape is slideably positioned within the piston cylinder 108 and connected at the lower end to the other end of the piston shaft 116 to move generally axially therewith. The piston cylinder 108 is closed at one end by the upper surface of the piston 120 and at the other end by the piston cylinder cap 110 to define a piston chamber 122 therein.

An inlet valve 124 and an outlet valve 126 extend through the piston cylinder cap 110 in communication with the piston chamber 122 to allow gas or liquid to flow therethrough. An inlet line 128 and an outlet line 130 are connected to the inlet valve 124 and outlet valve 126, respectively, and are adapted to receive and exhaust, respectively, gas or liquid from the other ends.

The base 102 may contain ballast for maintaining the buoyancy pump device 100 in a fixed position relative to the environment. The base 102 may also comprise a storage receptacle for the gas or liquid transferred therein which is connected to the outlet line 130 for receiving the air or liquid from the piston chamber 122. If the base 102 is to be used as storage, a base outlet 132 may be connected thereto to allow flow of gas or liquid to a desired location from the base 102. It is to be appreciated that the location of the base outlet 132 on the base 102 is adaptable such that the base outlet 132 may be placed anywhere on the base 102.

The buoyancy cylinder 104, which may also be a buoyancy block housing, may be connected to the upper surface of the base 102 by chains 134 that in turn are connected to the buoyancy cylinder 104. In this manner, the chains 134 stabilize the buoyancy cylinder 104 on the base 102. It is to be appreciated that guy wires or other connection means may be used to couple the buoyancy cylinder 104 to the base 102, and the present invention is not limited by the chains 134 as the connection means.

The buoyancy cylinder 104 may also have a plurality of regularly spaced openings on its perimeter to allow liquid such as water to flow through the buoyancy cylinder 104 surrounding the buoyancy block 114. To reduce turbulence associated with such flow, a plurality of turbulence openings 131 may be provided on the buoyancy cylinder 104. As such, the buoyancy cylinder 104 may comprise a cage or the like to reduce friction associated with gas flowing through the buoyancy cylinder 104.

The buoyancy cylinder 104 has a predetermined length. The length of the buoyancy cylinder 104 relates to movement of the buoyancy block 114 within different liquid environments. For example, when the buoyancy pump device 100 is placed in an ocean environment, the length of the buoyancy cylinder 104 needs to be adjustable to allow the buoyancy pump device 100 to perform with annual tide changes and wave heights. When the buoyancy pump device 100 is placed in a lake environment for example, the length of the buoyancy cylinder 104 would not require adjustment to wave height operational settings.

In another example, in a body of water having a 10 ft. water depth a buoyancy cylinder must be at least 10 ft., and have an additional 7 ft. operational height added to the 10 ft. to allow movement of the buoyancy block within the buoyancy chamber. Accordingly, the buoyancy cylinder would be 17 ft. tall and has a 7 ft. usable stroke. But if the body of water has tide changes, this example changes slightly.

In the changed example, with the buoyancy pump device in a 10 ft. sea with a 2 ft. tide change results in a 2 ft. loss of usable stroke. To account for this change, the difference between the annual low tide and high tide is added to the length of the buoyancy cylinder to be deployed. That is, in an environment where maximum wave height is 7 ft., low tide is 10 ft., and high tide is 14 ft., the difference between low tide and high tide would be 4 ft. This is added to the buoyancy cylinder length (7 ft. (for maximum wave height)+10 ft. (to allow the buoyancy pump device to operate in low tide conditions)+4 ft. (difference between low and high tides)) for a total buoyancy cylinder length of 21 ft. This allows a 7 ft. stroke on high tide days with complete use of the passing waves.

The buoyancy cylinder cap 106 is adapted to support the piston cylinder 108 thereon, and the opening 118 therein is adapted to prevent liquid flowing into the buoyancy chamber 112 from entering the piston cylinder 108 therethrough. The buoyancy cylinder cap 106 may be connected to the buoyancy cylinder 104 by welding or threads, or other suitable connection means adapted to resist environmental forces while supporting the loads created by the piston cylinder 108 and its structural components. Seals may be used in the opening 118 of the buoyancy cap 106 to prevent liquids or gases from entering into the piston cylinder 108 from the buoyancy chamber 112. The piston cylinder 108 is adapted to seal the inside of the piston cylinder 108 from the environment. The piston cylinder 108 is constructed of material designed to limit the effects of the environment, including water in lakes, oceans, and rivers.

The buoyancy block 114 disposed within the buoyancy chamber 112 is generally cylindrical and has a tapered upper surface. The buoyancy block 114 has a predetermined buoyancy, such that the buoyancy block 114 moves in a cycle conforming to the fluid dynamics of the water in which the buoyancy pump device 100 is positioned and the hydraulic or pneumatic system characteristics of the buoyancy pump device 100 itself. The buoyancy of the buoyancy block 114 may likewise be adjusted depending on the characteristics and fluid dynamics of the water and the system. Such adjustment may occur by (1) manually or remotely adjusting the buoyancy block 114 either axially or radially with respect to the buoyancy chamber 112 or in both directions; and (2) adjusting other characteristics of the buoyancy block 114 affecting its behavior in the water. An exemplary adjustment means is described in greater detail below.

The piston shaft 116 is coupled to the buoyancy block 114 and the piston 120 via respective connection joints 136, 138. The connection joints 136, 138 may be designed to be movable or flexible in response to any radial motion of either the piston 120 or the buoyancy block 114 when the piston 120 and buoyancy block 114 are not axially aligned. Such movement or flexibility may be achieved through the use of a swivel-couple or other suitable coupling means.

The piston shaft 116 is designed to be lightweight and environmentally resistive, such that the piston shaft 116 continues to function after exposure to harsh environmental conditions. The piston shaft 116 is further designed to translate forces from the buoyancy block 114 to the piston 120 and from the piston 120 to the buoyancy block 114. Finally, the piston shaft 116 may be telescopically adjustable, such that the length of the piston shaft 116 may be increased or decreased, depending on the requirements of the buoyancy pump device 100. The adjustment of the piston shaft 116 may be needed when air is the pumping media, or the height of waves or swells are less than desirable. Such adjustment enables maximum utilization of the potential energy in the waves or swells.

In order to seal the piston chamber 122, the piston 120, which is slideably positioned inside the piston cylinder 108, may include a seal therebetween extending around the perimeter of the piston 120. The seal is adapted to prevent seepage of gas or liquid from the environment into the piston chamber 122, or from the piston chamber 122 to the environment, while the piston 120 remains slidable within the piston chamber 122.

The inlet and outlet valves 124, 126 are unidirectional flow devices which permit the flow of gas or liquid into and out of the piston chamber 122, respectively. It is to be appreciated that the valves 124, 126 may be positioned at differing locations on the piston cylinder cap 110, so long as a desired pressure is achievable within the piston chamber 122.

Because movement of the buoyancy block 114 in the buoyancy cylinder 104 may be hampered by friction or other elements entering the buoyancy cylinder 104, a plurality of shims 140 may be connected to the inner surface of the buoyancy cylinder 104. The shims 140 axially extend along the perimeter of the buoyancy cylinder 104, and further serve to stabilize the orientation of the buoyancy block 114 within the buoyancy cylinder. The shims 140 may be constructed of a suitable material, such that the coefficient of friction between the shims 140 and the buoyancy block 114 approaches zero.

To limit axial movement of the buoyancy block 114 within the buoyancy cylinder 104, a plurality of stops 142 may be provided on the inner surface of the buoyancy cylinder 104 and disposed at a lower portion thereof. The positioning of the stops 142 may be adjusted to match a desired stroke length of the piston 120 within the piston cylinder 108.

It is to be understood that axial movement of the buoyancy block 114 in the buoyancy cylinder 104 translates to axial movement of the piston 120 within the piston cylinder 108 via the piston shaft 116. The piston shaft 116 and connection joints 136 further fix the position of the piston 120 with respect to the buoyancy block 114.

Referring now to FIGS. 3A-3C, an exemplary buoyancy block 300 is shown in top plan, side and isometric views, respectively. The buoyancy block 300 has an axial opening 302 adapted to receive the coupling joint 136 (FIG. 2B) and thereby couple to the piston shaft 116 (FIG. 1). An upper portion 304 is tapered radially inward from the perimeter of the buoyancy block 300, and terminates at the axial opening 302. The tapers on the upper portion 304 assist axial movement of the buoyancy block 300, especially when the buoyancy block 300 is submerged in water and is moving towards the surface of the water. Although the upper portion 304 is shown as separate from a lower portion 306 of the buoyancy block 300, it is to be appreciated that the tapers may begin from any portion of the buoyancy block 300 and terminate at the axial opening 302 to facilitate axial movement of the buoyancy block 300 in water.

Referring now to FIG. 3D, a partial cross-section of an alternative, exemplary buoyancy block 350 is shown. The buoyancy block 350 has an upper portion 352 and a lower portion 354. The upper portion 352 has a radially tapered portion 356 to facilitate axial movement of the buoyancy block 350 in water, and a non-tapered portion 358 connected to the tapered portion 356. Formed on the inner perimeter of the upper portion 352 of the buoyancy block 350 are threads 360.

The lower portion 354 of the buoyancy block is generally cylindrical, and has a plurality of threads 362 formed on the external perimeter of the lower portion 354. The threads 362 of the lower portion 354 are adapted to mate with the threads 360 of the upper portion 352 and allow axial movement of the lower portion 354 with respect to the upper portion 352.

Movement of the lower portion 354 with respect to the upper portion 352 is accomplished through the use of a motor 364. The motor 364 is connected to the lower portion 354 on an upper surface 365 of the lower portion 354. A drive shaft 366 couples the motor 364 to the upper surface 365 and rotates the lower portion 354 in a predetermined direction, thereby telescoping the buoyancy block 350. The telescoping of the lower portion 354 increases or decreases the height of the buoyancy block 350, thereby increasing or decreasing the buoyancy of the buoyancy block 350. It is to be appreciated that the diameter of the buoyancy block 350 is likewise adjustable using similar methods.

Figure 3E:
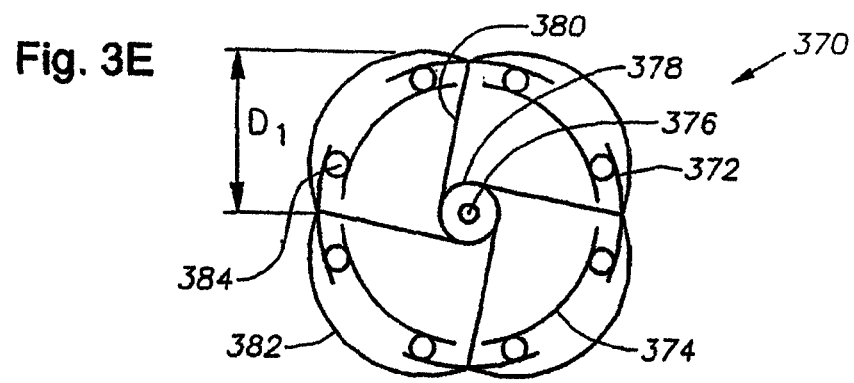
FIGS. 3E-3F are top plan views of an exemplary adjustable base portion of an exemplary buoyancy block in a contracted configuration and expanded configuration, respectively.
Figure 3F:
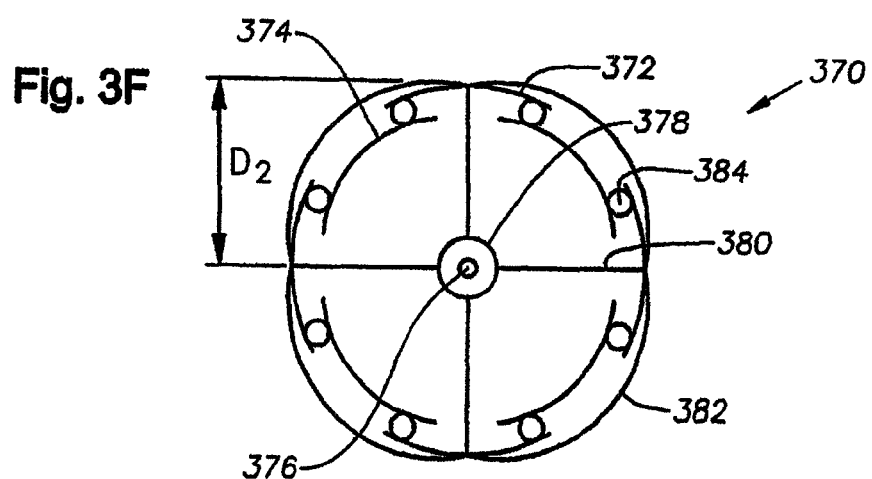

Referring now to FIGS. 3E and 3F in combination, a top view of an exemplary adjustable buoyancy block base 370 is shown. The adjustable buoyancy block base 370 includes outer plates 372, inner plates 374 connected to the outer plates 372, an axially disposed motor 376 connected to a gear 378, and a plurality of expansion bars 380 connected to the gear 378 and the outer plates 372. The circumference of the buoyancy block base 370 is sealed by plastic, thermoplastic or other sealant material 382, such as, for example, rubber. The sealant material 382 thus prevents environmental materials from entering into the buoyancy block base 370.

The outer plates 372 connect to the inner plates 374 via rollers 384. The rollers 384 allow movement of the outer plates 372 with respect to the inner plates 374. Guides for the rollers 384 may be positioned on respective surfaces of the outer and inner plates 372, 374.

The motor 376 is axially positioned within the buoyancy block base 370 and powered by a suitable power source. The motor 376 is connected to the gear 378, such that upon actuation of the motor 376, the gear 378 rotates in a clockwise or counter-clockwise direction.

The gear 378 is connected to the expansion bars 380, such that rotation of the gear 378 in a clockwise or counter-clockwise direction results in respective expansion or contraction of the diameter of the buoyancy block base 370 through the movement of the outer plates 372 with respect to the inner plates 374 via the rollers 384.

For example, FIG. 3E shows the buoyancy block base 370 in a contracted position having a diameter delineated by D1. When the motor 376 is actuated to rotate the gear 378 in a clockwise direction, the expansion bars 380 correspondingly rotate to thereby expand the diameter of the buoyancy block base 380 as shown in FIG. 3F and delineated by D2. The thermoplastic material 382 likewise expands in relation to the expansion of the buoyancy block diameter. Accordingly, the buoyancy block base 370, when used in a buoyancy pump device, may radially expand or contract to increase or decrease the diameter of the associated buoyancy block. It is to be appreciated that, although shown in a generally cylindrical configuration, the buoyancy block base 370 may be in other configurations depending on the design and requirements of the buoyancy pump device.

Figure 4C:
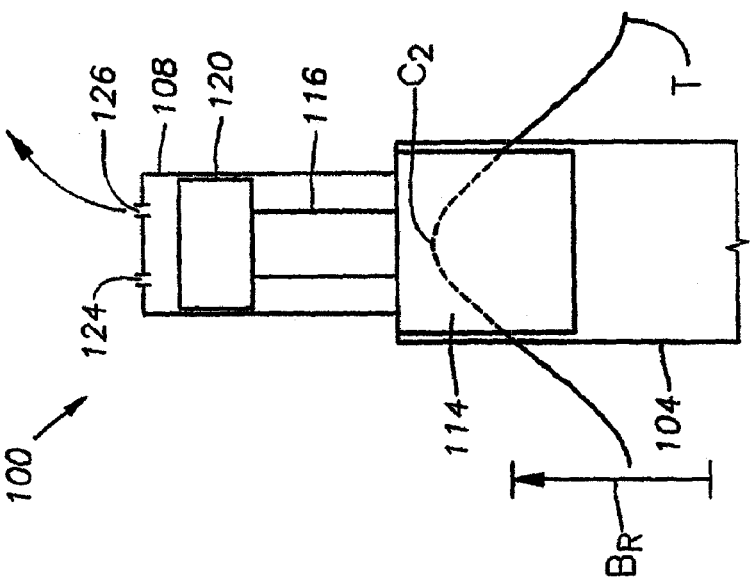
FIGS. 4A-4C are side views of the buoyancy pump device of FIG. 1 as a wave passes through the buoyancy pump device.
Figure 4B:
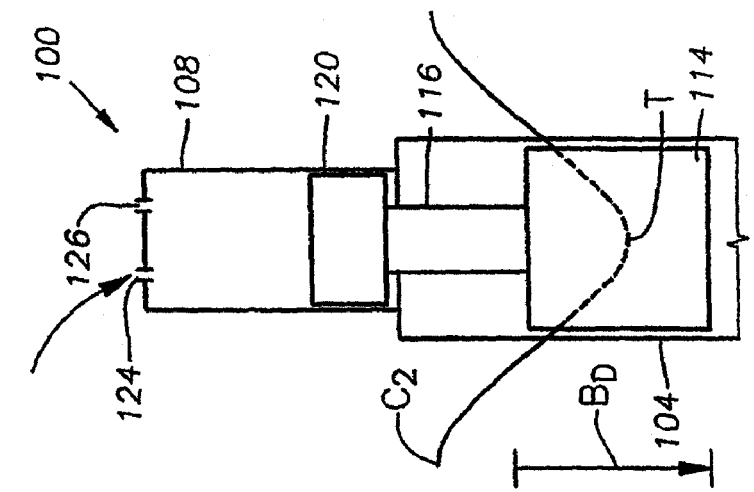
Figure 4A:
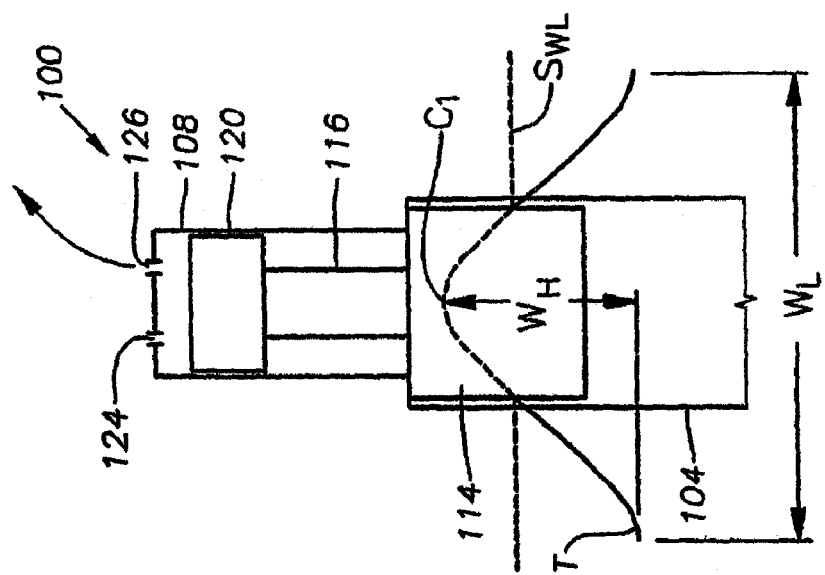
Figure 4D:
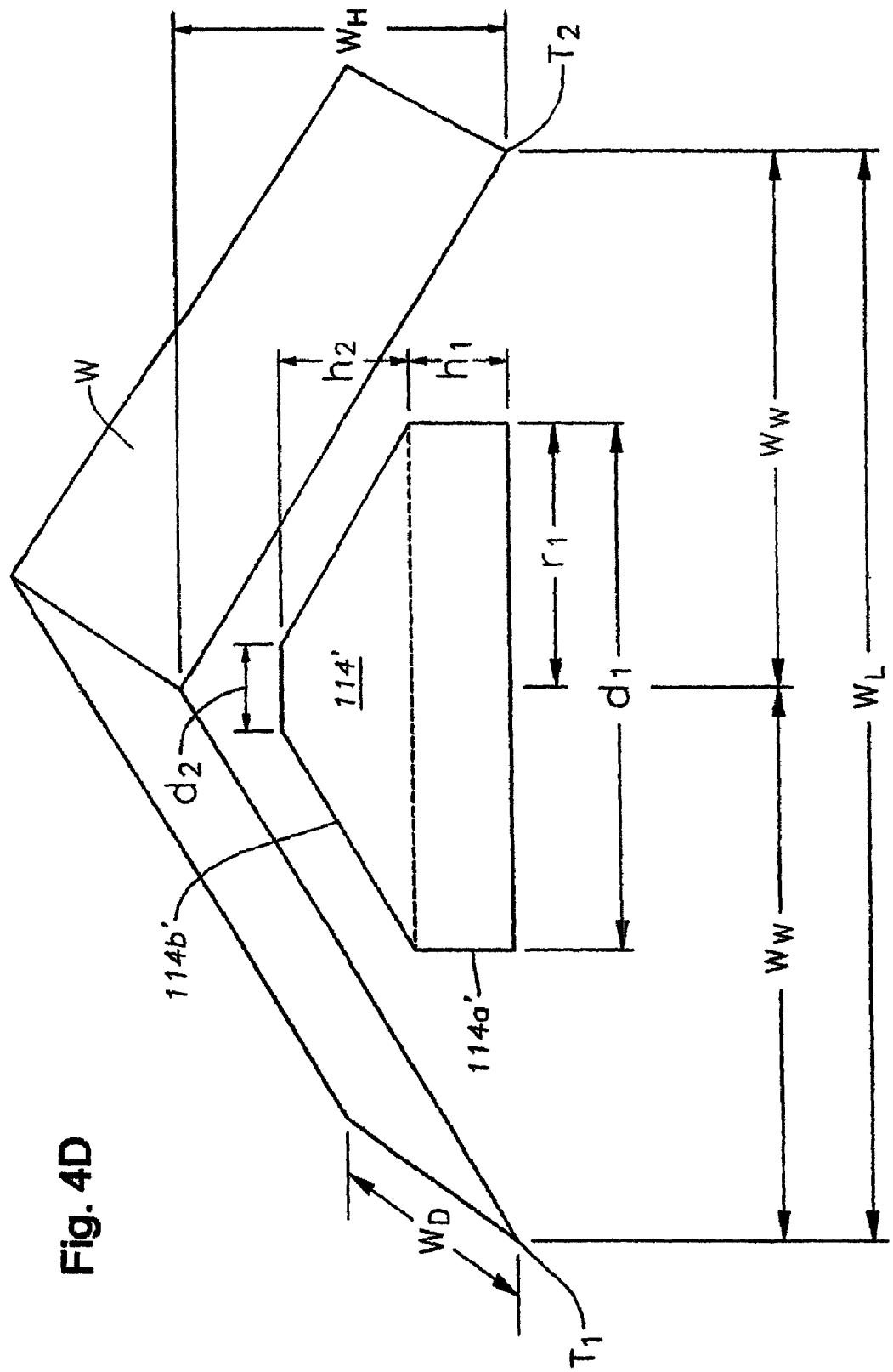
FIG. 4D is a schematic illustration of an exemplary wave.

Referring now to FIGS. 4A, 4B and 4C, the buoyancy pump device 100 is shown in various positions as a wave (W) passes through the buoyancy chamber 112 (FIG. 1). The waves (W) passing through the buoyancy pump device 100 have geometric characteristics including the following:

Wave height ($W_H$) is the vertical distance between the crest (C) or high point of the wave and the trough (T) or low point of the wave;

Wave length ($W_L$) is the distance between equivalent points, e.g., crests or troughs, on the waves; and Stillwater level ($S_{WL}$) is the surface of the water in the absence of any waves, generally the midpoint of the wave height ($W_H$).

In FIG. 4A, the buoyancy block 114 is shown at its highest vertical position supported by the crest ($C_1$) of the wave (W) as fluid is output through the outlet valve 126. As the wave (W) travels through the buoyancy chamber 112 by a distance of about one-half (½) the wave length ($W_L$) as shown in FIG. 4B, the buoyancy block 114 falls to its lowest vertical position within the trough (T) of the wave (W) as fluid is drawn through the inlet valve 124. In FIG. 4C, the wave (W) has traveled the full wave length ($W_L$) so that the buoyancy block 114 has returned to the highest vertical position on the following crest ($C_2$) and fluid is again output through the outlet valve 126.

The piston stroke ($P_s$) (not shown) of the buoyancy pump device 100 is defined as the distance the piston 120 is moved by the buoyancy block 114 as the wave (W) travels one wave length ($W_L$) through the buoyancy chamber 112. As the wave (W) travels through the buoyancy chamber 112, the buoyancy block 114 drops a distance ($B_D$) equal to the wave height from the crest ($C_1$) position in FIG. 4A to the trough (T) position in FIG. 4B, and then rise the same distance ($B_R$) from the trough (T) position in FIG. 4B to the crest ($C_2$) position in FIG. 4C. Hence, the piston stroke ($P_s$) equals twice the wave height ($W_H$):

$$P_s = B_D + B_R = 2W_H$$

Thus, the piston 120 has a "half stroke" descending and a "half stroke" rising, also referred to as the "dropping stroke" and "lifting stroke", respectively.

The wave has a given wave height $W_H$ and period $W_P$ as it passes through the buoyancy pump device 100. The buoyancy pump device 100 has a piston stroke $P_S$, which is defined by the piston moving across one full wave period $W_P$. As can be seen in FIG. 4A, as a wave moves across the buoyancy pump device 100, the buoyancy block moves in direct association with the passing wave.

When the buoyancy pump device 100 is in a zero-pressure state, the buoyancy block 114 is able to travel the maximum distance resulting from the wave motion, i.e., $P_{smax}=2W_L$. This translates into a full half-stroke travel of the piston 120 in the piston cylinder 108, which forces fluid out of the piston chamber through the valve.

Referring back to FIG. 1 and in operation, after the buoyancy pump device 100 has been placed initially in a body of water, such as an ocean, lake, river, or other wave- or swell-producing environment, the initial pressure in the outlet line 130, outlet valve 126 and piston chamber 122 begins at a zero-pressure state. A wave, having recognized properties, arrives at the buoyancy pump device 100. Water from the wave incrementally fills the buoyancy chamber 112. As the water fills the buoyancy chamber 112, the buoyancy block 114 begins to rise with the rising water in the buoyancy chamber 112.

The buoyancy of the buoyancy block 114 is designed such that a majority of the buoyancy block 114 rides relatively high out of the water within the buoyancy chamber 112, thereby allowing axial movement of the buoyancy block 114 within the buoyancy chamber 112. As the wave departs, the buoyancy block 114 lowers with the settling water in the buoyancy chamber 112 and by gravity. The piston shaft 116 translates the movement of the buoyancy block 114 to the piston 120.

At the other end of the spectrum, when the buoyancy pump device 100 starts with maximum pressure in the outlet line 130 and outlet valve 130, a majority of the buoyancy block 114 will be virtually submerged within the water in which the buoyancy pump device 100 is placed. This results in a decreased stroke-length of the piston 120 through the piston chamber 122.

Gravity powers the down stroke of the buoyancy block 114 and the piston 120 as a given wave or swell passes. With the rise of a given wave or swell, the buoyancy of the buoyancy block 114 provides the lift/power for the piston 120 via the piston shaft 116. When piston 120 pressure from the outlet valve 126 is low, the buoyancy block 114 rides relatively high in the water within the buoyancy chamber, because the buoyancy lift required is only relative to the back pressure delivered into the piston chamber 122 via the outlet valve 126.

When the piston pressure is high, the axial movement of the buoyancy block 114 within the buoyancy chamber is limited, resulting in the buoyancy block 114 riding lower in the water. In certain high pressure states in the piston chamber 122, the buoyancy block 114 may be almost completely submerged and still axially move within the buoyancy chamber to pump the liquid or gas within the piston chamber 122. Eventually, the pressure from the outlet valve 126 may become so great that the buoyancy of the buoyancy block 114, even when completely submerged, can no longer provide enough lifting force to move the piston 120. At this point, the buoyancy block 114 and piston 120 cease movement even as the wave or swell continues to rise with respect to the buoyancy pump device 100.

For example, in a buoyancy pump device having a buoyancy block with a one foot height deployed in a maximum pressure situation, the buoyancy pump device will lose about one foot of pump stroke within the piston cylinder. Should a wave of only one foot be present, the buoyancy pump device will not pump.

Should this point not be reached, the buoyancy block 114 and piston 120 will continue to axially move with the rise of a given wave or swell until the wave or swell reaches its respective maximum height, allowing the piston 120 to move the liquid or gas in the piston chamber 122 through the outlet valve 126. This process is maintained until the maximum compression point in the piston chamber 122 is reached but still allowing outward flow.

When the buoyancy block 114 is almost submerged or submerged yet still axially moving, this is termed the high waterline of the buoyancy pump device 100. As the wave or swell passes, the lowest point of descent of the buoyancy block 114 is termed the low waterline of the buoyancy pump device 100. The distance between the high waterline and low waterline determines the power stroke of the piston 120.

For example, when gas is the media to be pumped, the inlet line 128, which may be adjusted to connect to a gas source, is placed in a location that communicates with and receives gas from a gas environment such as ambient air. The outlet line 130 may be connected to the base 102 for storing the compressed gas. It is to be appreciated that the outlet line 130 may be connected to another location for storing the gas, such as a fixed storage tank that is located external the buoyancy pump device 100.

In the gas example, when the piston 120 lowers with a settling wave, it creates a vacuum in the piston chamber 122, and draws gas through the inlet line 128 and the inlet valve 124 into the piston chamber 122. At the trough of the wave and after the water has evacuated the buoyancy chamber 112, or when the buoyancy block 114 contacts the stops 142 which inhibits further downward movement of the buoyancy block 114 and piston 120, the maximum amount of gas fills the piston chamber 122.

As the wave begins to rise and water incrementally fills the buoyancy chamber 112, the buoyancy block 114 is exposed to and contacted by the water. The buoyancy of the buoyancy block 114 results in a natural lift of the buoyancy block 114 in response to the rising water within the buoyancy chamber 112. Due to the fixed position of the buoyancy block 114 with respect to the piston 120 as facilitated by the piston shaft 116, the piston 120 rises in direct relation to the lifting of the buoyancy block 114.

The gas that has been introduced into the piston chamber 122 compresses within the piston chamber 122 as the buoyancy block 114 rises, until the pressure of the compressed gas overcomes the line pressure in the outlet line 130. At this point, the gas flows through the outlet valve 126 and the outlet line 130 and is transported to a desired location for use or storage. For example, the exemplary base 102 described above or other storage location may be used for storage of the compressed gas. It is further conceivable that the gas may be dispelled into the atmosphere should the situation require.

Upon the wave reaching its maximum height as it passes through the buoyancy pump device 100, water begins to exit the buoyancy chamber 112. Gravity urges the buoyancy block 114 downward with the wave, resulting in a downward movement of the piston 120, which creates a vacuum in the piston chamber 122. The vacuum again draws gas into the piston chamber 122 as described previously, thereby repeating the process with each successive wave, thereby driving the buoyancy pump device 100 to successively and cyclically draw gas into the piston chamber 122, compress gas within the piston chamber 122, and force gas from the piston chamber 122 into the base 102. The piston 120 further compresses the gas stored in the base 102 with each cycle until the buoyancy block 114 can no longer overcome the pressure of the stored gas and in the outlet line 130. At this point, the buoyancy block 114 no longer rises with respect to the waves.

In another example, when a liquid is the media to be pumped, the inlet line 128 is connected to a liquid environment, such as water. The outlet line 130 may be connected to a storage reservoir, including but not limited to a lake bed, water tower, or other water system. When incompressible liquids such as water are being pumped, the piston shaft 116 may not require adjustment because the buoyancy pump device 100 will pump once the piston chamber 122 is completely filled with the incompressible liquid.

In the liquid example, the lowering of the piston 120 correspondingly creates a vacuum in the piston chamber 122, which draws water through the inlet line 128 and inlet valve 124 and into the piston chamber 122. At the trough of the wave and when water evacuates the buoyancy chamber 112, or when the buoyancy block 114 contacts the stops 142 that inhibit further downward movement of the buoyancy block 114, the maximum amount of liquid fills the piston chamber 122.

As the wave begins to rise and water incrementally fills the buoyancy chamber 112, the buoyancy block 114 is exposed to and contacted by the water. The buoyancy of the buoyancy block 114 results in a natural lift of the buoyancy block 114 in response to the incrementally rising water within the buoyancy chamber 112. Due to the fixed nature of the buoyancy block 114 with respect to the piston 120 as facilitated by the piston shaft 116, the piston 120 incrementally rises in direct relation to the lifting of the buoyancy block 114. In the case of water as the media, the rising incompressible water within the piston chamber 122 overcomes the line pressure in the outlet line 130. At this point, the water flows through the outlet valve 126 and the outlet line 130, and is transported to a desired location for use or storage. It is conceivable that the liquid and/or gas may be dispelled into the atmosphere should the situation require.

Upon the wave reaching its maximum height as it passes through the buoyancy pump device 100, and departs, water begins to incrementally exit the buoyancy chamber 112. Gravity urges the buoyancy block 114 downward, resulting in a downward movement of the piston 120 and a vacuum in the piston chamber 122. The vacuum serves to draw liquid and/or gas into the piston chamber 122. The process is repeated with each successive wave, thereby driving the buoyancy pump device 100 to successively and cyclically draw liquid and/or water into the piston chamber 122, and pump the liquid and/or water from the piston chamber 122.

It is to be appreciated in the liquid example that a loss of buoyancy lift must be factored due to the weight of the water/liquid present within the piston chamber 122. However, in the gas example, because of the relatively lightweight properties of the gas vs. the liquid, this loss is virtually non-existent. The loss in the liquid example may be overcome through the adjustable properties of the buoyancy block 114.

The operation of the buoyancy pump device 100 depends on the environment where it is to be used. For example, when the buoyancy pump device 100 is situated in an ocean having predetermined annualized wave averages, the buoyancy pump device 100 must be coupled to a structure relative to the waves, or positioned with ballast such that the buoyancy pump device maintains its relative position to the waves. Such structures could be fixed or substantially fixed, or could include a seaworthy vessel, a platform-type arrangement, or direct coupling of the buoyancy pump device 100 to the ocean floor. Such connections are common, especially within the oil and gas industry, and are contemplated to be used in conjunction with the novel buoyancy pump device 100 according to the principles of the present invention.

The buoyancy lift for driving the piston within the piston cylinder via the piston shaft is directly related to the buoyancy block's lift capability. Theoretically, for example, given a total displacement of the buoyancy block at 100 lbs., subtracting the buoyancy block weight (10 lbs.), piston shaft, connectors, other miscellaneous parts (5 lbs.), and the piston weight (2.5 lbs.) from the total displacement (100 lbs.) leaves a lift capability of 82.5 lbs. Empirical testing of the buoyancy pump device 100 operates about 96% efficient to this formula.

It is contemplated that the buoyancy pump device 100 may be used to self-calibrate its position with respect to the ocean floor and thereby maintain a generally stable position relative to the wave environment in which it is placed. For example, ballast tanks may be coupled to the buoyancy pump device 100 and filled with appropriate ballast. The buoyancy pump device 100 may pump gas or liquid into the ballast tanks and thereby adjust the position of the buoyancy pump device 100 relative to the wave environment. Such a configuration may be accomplished by coupling the outlet line 130 of the buoyancy pump device 100 to the ballast tank and providing a control system to adjust flow into and out of the ballast tank upon a predetermined condition. Both gas and liquid may be used depending on the desired location adjustment of the buoyancy pump device 100.

It is also contemplated that the length and width (diameter) of the piston 120 may be adjusted to correspond to the pumping media or the properties of the piston 120, the buoyancy chamber 112, and the buoyancy block 114. Likewise, the piston 120 may have a telescopic adjustment or the like thereon for adjusting the height or width of the piston 120 similar to the buoyancy block 300 (See FIGS. 3A-3C).

For example, flow rates and pressure settings within the buoyancy pump device 100 are related to the inside diameter and height of the piston cylinder 108. The larger the piston cylinder 108 and the longer the piston stroke within the piston cylinder 108, the greater amount of liquid or gas flow is accomplished with the least pressure present. The smaller the piston cylinder 108 and the shorter the piston stroke within the piston cylinder 108, the greatest pressure is present to the liquid or gas flow and the least amount of liquid or gas flow is accomplished.

It is recognized that friction losses may occur, even though modest, as related to the lengths and dimensions of the inlet line 128 and outlet line 130 and other materials including the inlet and outlet valves 124, 126.

The size of the buoyancy chamber 112 and buoyancy block 114 may also be adjusted to provide for maximum buoyancy pump device efficiency. Such adjustments may be made, for example, manually, by interchanging parts, automatically, by including telescoping portions on the respective component, or remotely, by configuring a control system to adjust the properties of the desired component. In this manner, the buoyancy pump device 100 may be calibrated to function on waves having varying properties, such that the buoyancy pump device 100 may take advantage of large waves, small waves, and waves having more moderate properties.

To take advantage of these waves, the buoyancy pump device 100 does not necessarily have to be secured to the base 102. Rather, the buoyancy pump device may be, for example, mounted to the floor of the body of water, secured to a structure mounted on the floor of the body of water, secured to a rigid floating platform, secured to a sea wall, or other mounting locations that provide a stable platform or its equivalent.

The size of the buoyancy pump device 100 and the function of the buoyancy pump device 100 related to the amount of energy in the wave or swell may be determined by several factors. For example, these include: the annual high, low and average wave size; the annual high, low and average tide marks; the average period of the wave or swell; the depth of liquid at the location of the wave or swell; the distance from shore to the wave or swell; the geography of the near vicinity of the wave or swell location; and the structure of the buoyancy pump device 100. It is contemplated that the buoyancy pump device 100 may be used in combination with other buoyancy pump devices in a grid fashion to pump larger volumes of gas or liquid through the pumps.

To determine the horsepower generated from a given wave height and velocity, the wave horsepower (potential energy) and the buoyancy block horsepower in falling and lifting configurations were calculated. From this data, the piston pumping horsepower was then calculated for both water and air pumping configurations. These calculations are described below according to an exemplary testing configuration.

EXAMPLE A

Low Wave Size

1. Wave Horsepower

Referring more specifically to FIGS. 4A-4D, wave horsepower (Wave HP) is determined for a wave (W) traveling over a distance of one-half the wave length ($\frac{1}{2} W_L$) as follows:

$$\text{Wave HP} = [(W_V)(D)/(HP)](W_S)$$

where $$W_V(\text{Wave Volume}) = (W_W)(W_D)(W_H)(\text{gallons water/ft}^3)$$

$W_W$=Wave Width($\frac{1}{2}W_L$)=17.5 feet $W_D$=Wave Depth=17.5 feet $W_H$=Wave Height=5 feet and D=density of water (8.33 lbs/gal)

and

HP=horse power unit (550)

and $W_S$=Wave Speed($\frac{1}{2}W_L/W_T$)

and $W_T$=Wave time to travel $\frac{1}{2}W_L$(7.953 sec).

For example, the wave depth ($W_D$) is assumed to be equal to the wave width ($W_W$) so that the profile of the wave (W) will completely cover the buoyancy block 114' which is cylindrical in shape. For the numbers indicated above which are exemplary, the calculations are as follows:

Wave HP=[(11,453 gal)(8.33 lbs/gal)/(550)](2.2 ft/sec)=382 where $W_V$=(1,531 ft$^3$)(7.481 gal/ft$^3$)=11,453 gal; and $W_S$=(17.5 feet)/(7.953 sec)=2.2 ft/sec.

2. Buoyancy Block Dropping HP

As the wave (W) travels through the buoyancy chamber 104 during the dropping stroke (FIGS. 4A and 4B), the buoyancy block 104 drops with gravity into the trough (T). The buoyancy block horsepower generated during the dropping stroke ($BB_D$) can be determined from the following equation:

$$BB_D = [(BB_V)(D(WR)/HP](DS_S)(TR_D)$$

where $BB_V$(Buoyancy Block Volume)=(VB+VC)(7.48 gal/ft$^3$)

VB=Volume of Base 114'a=$\pi r_1^2 h_1$

VC=Volume of Cone 114'b=$(\pi h_2/12)(d_1^2+d_1 d_2+d_2^2)$ and ($BB_V$)(D)=the displacement weight of the buoyancy block 114' where

D=density of water (8.33 lbs/gal)

and

WR=Weight ratio of water to the buoyancy block 114' material and

HP=horsepower unit (550)

and $DS_S$=Dropping Stroke Speed=$B_D/T_D$ where $B_D$=distance of stroke travel when dropping $T_D$=time to travel distance $B_D$ and $TR_D$=Time Ratio, i.e., the percentage of time buoyancy block drops during a wave period=50% (assuming symmetrical long waves).

Continuing with the exemplary data set forth above for the Wave HP calculations, the calculations for $BB_D$ are as follows:

$$BB_D = [4,186 \text{ gal})(8.333 \text{ lbs/gal})(0.10)/550](0.25 \text{ ft/sec})(0.5)$$

$$= 0.79 \ HP$$

(i.e., the horsepower available from Dropping Stroke of Buoyancy Block)
where $$BB_V = (BV + VC)(7.48 \text{ gal/ft}^3)$$

$$= \pi r_1^2 h_1 (\pi h_2/12)(d_1^2 + d_1 d_2 + d_2^2)(7.48 \text{ gal/ft}^3)$$

and where $d_1$=17.5 ft $r_1$=8.75 ft $d_2$=3.5 ft $h_1$=1.5 ft $h_2$=2.0 ft so that $$BB_V = [\pi(8.75)^2(1.5) + (\pi(2.0/12)(17.5^2 + (17.5)(3.5) + 3.5^2)]$$
$$(7.48 \text{ gal/ft}^3)$$
$$= (361 \text{ ft}^3 + 199 \text{ ft}^3)(7.48 \text{ gal/ft}^3)$$
$$= (560 \text{ ft}^3)(7.48 \text{ gal/ft}^3)$$
$$= 4,186 \text{ gal}$$

and $$DS_S = (1.00 \text{ ft})/(3.976 \text{ sec}) = 0.25 \text{ ft/sec}$$

and $$(BB_V)(D) = 34,874 \text{ lbs (total displacement)}$$

and $$(BB_V)(D)(WS) = 3,487 \text{ (usable weight)}$$

2b. Buoyancy Block Lifting Horsepower

As the wave (W) continues traveling through the buoyancy chamber 104 during the lift stroke (FIGS. 4B and 4C), the buoyancy block 104 rises with the wave until it peaks at the crest ($C_2$). The buoyancy block lifting horsepower generated during the lift stroke ($BB_L$) can be determined from the following equation:

$$BB_L = [(BB_V)(D)(1-WR)/HP](LS_S)(TR_R)$$

where $LS_S$=Lifting Stroke Speed=$B_R/T_R$ $B_R$=distance of stroke travel when rising=1 ft.

$T_R$=time to travel distance $B_R$=4.0 sec and $TR_R$=Time Ratio (i.e., percentage of time buoyancy block rises during a wave period)=50% assuming symmetrical long waves.

$(BB_V)(D)(1-WR)$=Usable weight during lifting stroke $(UW_L)$=31,382 lbs such that $$BB_L = [(31,382 \text{ lbs})/550](1 \text{ ft}/4.0 \text{ sec})(0.5) = 7.13 \text{ HP}$$

2c. Total Input Horsepower

Accordingly, the total amount of input horsepower withdrawn from the wave by the buoyancy block ($BB_T$) is as follows:

$$BB_T = BB_D + BB_L$$

Using the above-exemplary numbers set forth above, the total input power for the buoyancy block 114' is as follows:

$$BB_T = 0.79 + 7.13 = 7.92 \text{ HP}.$$

3. Piston Pumping Power (CFM/PSI)

The piston pumps water at a given rate in cubic feet per minute (CFM) and a given pressure in lbs. per square inch (PSI) for each half (½) stroke when the buoyancy pump device is configured to pump water according to the following formulae:

$$PF = \text{Piston Water flow} = (S_V)(SPM)(BP_{\text{eff}})$$

where $$S_V = \text{Volume per 1/2 stroke}$$
$$= (\pi/2)(\text{piston radius})^2(\text{stroke length})$$
$$= (\pi/2)(8.925 \text{ in})^2(12 \text{ in})/(1,728 \text{ in}^3/\text{ft}^3)$$
$$= 1.74 \text{ ft}^3$$

and

SPM=Strokes per minute=7.54 strokes/min and $BP_{\text{eff}}$=Empirical Tested Efficiency of Exemplary Buoyancy Pump Device=83% so that $$PF = (1.74 \text{ ft}^3)(7.54 \text{ strokes/min})(.83)$$
$$= 10.88 \text{ CFM}$$
$$= 0.181 \text{ CFS}.$$

The determination of the piston water pressure (PSI) for each half (½) stroke in the buoyancy pump device (PP) is made by the following equation:

$$PP = \{UW_L - [(S_V)(D)(7.48 \text{ gallons water/ft}^3)]\}/SA_P$$

where $UW_L$=usable weight during a lift stroke=31,386 lbs $S_v$=1.74 ft$^3$

D=density of water (8.33 lbs/gal)

and $$SA_P = \text{Surface Area of the Piston (in}^2\text{)}$$
$$= \pi(8.925 \text{ in})^2$$
$$= 250 \text{ in}^2.$$

Accordingly, for the above-exemplary numbers, the PSI/stroke for the exemplary buoyancy pump device is calculated as follows:

$$PP = [31,386 \text{ lbs} - (1.74 \text{ ft}^3)(8.33 \text{ lbs/gal})$$
$$(7.48 \text{ gal/ft}^3)]/250 \text{ in}^2$$
$$= (31,386 \text{ lbs} - 108 \text{ lbs})/250 \text{ in}^2$$
$$= 125 \text{ PSI/stroke}.$$

When the buoyancy pump is configured to pump air, the surface area of the piston is increased to compensate for the compressibility of air in order to achieve similar results. If the radius of the piston is increased to 12.6 inches, the surface area of the piston ($SA_p$) increases to 498.76 square inches. Also, the added weight of the water above the piston [(SV)(D)(7.48 gal/ft$^2$)=108 lbs] is removed and thus is not subtracted from the usable weight during the lift stroke ($UW_L$)

when calculating the piston air pressure ($PP_a$). All other numbers remaining the same, the piston air flow ($PF_a$) and the piston air pressure ($PP_a$) would have the following values:

$PF_a$=21.7 CFM $PP_a$=51.8 PSI/stroke.

Because one skilled in the art would readily understand the difference between the use of a piston to pump water or air, the remaining examples will focus on pumping water.

4. Usable Generator Produced HP

When the exemplary buoyancy pump device in a water-pumping configuration is connected to an exemplary water storage tank for use in powering an exemplary water turbine, the following empirical formula is used to measure power produced by the buoyancy pump device:

$$BP=\{(PP)(BP_{eff})(Head)-[(Loss)(Head)(Pipe\ Ft./Section)]\}[(PF)(T_{eff})(KW)/HP]$$

where $BP_{eff}$=Empirically tested buoyancy pump efficiency=88%

Head=PSI to Head(ft) conversion factor=2.310

Loss=Pipe loss efficiency factor=0.068

Pipe Ft./Section=One pipe has a length of 100 ft., and 10 pipes=1 section of pipe such that 1 mile of pipe=5.280 sections of pipe $T_{eff}$=Turbine efficiency based on existing water turbine=90%

KW=Conversion factor for ft/sec to KW=11.8

HP=Conversion factor for KW to HP=0.746

Accordingly, using the above-exemplary numbers in combination with the prior calculations, the Output BP for an exemplary power system utilizing the buoyancy pump device is as follows:

$$BP=[\{(125)(0.88)(2.310)]-[(0.068)(2.310)(10)(5.280)]\}[(0.181)(0.9/11.8)/0.746]=0.4558\ (total\ Output\ HP\ available).$$

When the buoyancy pump is configured to pump air, the output power ($BP_a$) for an exemplary system using the numbers above would be about 2.72 HP. Rather than using a water turbine to produce the output power, an air turbine would be used including, for example, the one disclosed in U.S. Pat. No. 5,555,728, which is incorporated herein by reference.

5. Input HP v. Output HP Efficiency

Accordingly, the conversion efficiency of input HP to output HP is determinable according to the following:

Conversion Efficiency=$BP/BB_T$=4.558/7.92=57%.

Thus, using empirical and theoretical data, it is appreciated that the exemplary buoyancy pump device according to the principles of the present invention, when used in conjunction with an exemplary water turbine, has about a 57% conversion efficiency of the horsepower withdrawn from a passing wave ($BB_T$) to Output BP, which may then be used as a source of power.

EXAMPLE B

Average Wave Size

The above-exemplary calculations were made with an exemplary buoyancy block 114' having a fixed diameter ($d_1$) depending on the geometry of the buoyancy block 114' and height ($h_1+h_2$). It is to be appreciated that the wave height ($W_H$) varies for different locations and for different times during the year at each location. Thus, it is desirable to reconfigure or adjust this buoyancy block based on the varying wave characteristics as described above. To ensure high efficiencies, the height and/or diameter of the buoyancy block 114' can be adjusted. For example, the buoyancy block 114' can be designed or adjusted to increase the height of its base 104'a (h1) and related diameter to accommodate waves having a greater wave height ($W_H$) as will be described below.

Assuming that the wave height ($W_H$) increases from 5.0 ft. to 9.016 ft. (an average sized wave), the height of the buoyancy block base ($h_1$) is increased by 1.5 ft. (see FIG. 4D), i.e., the "warp" of the buoyancy block, to increase the overall performance of the buoyancy pump device in bodies of water with larger swells on the average of 9 ft. Correspondingly, the stroke length of the piston increases and the number of strokes decrease as follows:

Stokes=5.52

Piston stroke length=42.2 in so that $S_P$(volume/stroke)=12.8 ft³

Assuming that all other factors remain the same and applying the formulas above, we construct the following table, TABLE 1:

TABLE 1

| | Values | 5 ft Wave | 9.016 ft Wave |
|---|---|---|---|
| 1 | Wave Power | 382 HP | 2,952 HP |
| 2 | Buoyancy Block Power | | |
| | $BB_D$ | 0.79 HP | 2.05 HP |
| | $BB_L$ | 7.13 HP | 31.67 HP |
| | $BB_T$ | 7.92 HP | 33.72 HP |
| 3 | Piston Pumping Power | | |
| | PF | 10.88 CFM | 27.98 CFM |
| | PP | 125 PSI | 185 PSI |
| 4 | Generator Power (BP) | .4558 HP | 20.32 HP |
| 5 | Pump Efficiency | 57% | 60% |

Accordingly, it can be seen that increasing the buoyancy pump height by 1.5 ft. results in larger horsepower in the lifting and dropping of the buoyancy block, and larger output horsepower in the exemplary system with improved overall efficiency. Fundamentally, the availability of larger waves at a site provides a source of wave power for buoyancy pumps having larger buoyancy blocks and pistons that generate larger flow rates (e.g., PF=27.98 CFM) and consequently more horsepower output (e.g., BP=20.32 HP) at a given location.

As noted above, the diameter ($d_1$) of the buoyancy block 114' (see FIG. 4D) may also be adjusted to accommodate larger waves at a site. The following table, TABLE 2, illustrates the extent to which variations in the diameter of the buoyancy block affects the resulting horsepower ($BB_T$) as the wave speed ($W_S$) varies for a specific wave height ($W_H$) and as the wave height varies for a specific speed.

TABLE 2

| Wave Height ($W_H$) | Buoyancy Block Diameter (in) | | Buoyancy Block Horsepower ($BB_T$) | |
|---|---|---|---|---|
| | $W_S$ = 3 mph Low Wave | $W_S$ = 8 mph High Wave | $W_S$ = 3 mph Low Wave | $W_S$ = 8 mph High Wave |
| 3 | 12.6 | 126 | 0.9 | 26.9 |
| 4 | 16.8 | 168 | 2.21 | 64.76 |
| 5 | 21 | 210 | 4.39 | 126.94 |
| 6 | 25.2 | 252 | 7.67 | 219.88 |
| 7 | 29.4 | 294 | 12.28 | 349.77 |
| 8 | 33.6 | 336 | 18.45 | 522.78 |
| 9 | 37.8 | 378 | 26.39 | 745.09 |
| 10 | 42 | 420 | 36.33 | 1022.9 |

The data for TABLE 2 was generated based on a wave having the indicated wave height and moving at 3 miles per hour for the low wave, and 8 miles per hour for the high wave. The equations set forth above were used to calculate the horsepower for the low and high wave settings. The diameter or width of the buoyancy block was adjusted to perform in larger wave environments as indicated and described above to maximize the efficiency of the buoyancy pump with respect to the varying wave heights and wave speeds.

The larger and faster the wave, swell or current, the greater the potential energy available for extraction through the buoyancy pump device. Likewise, the larger the buoyancy block, either in height or diameter, the greater the potential energy available for extraction from the water. The smaller and slower the wave, swell or current, the smaller the potential energy available for extraction from the water through the buoyancy pump device. Similarly, the smaller the buoyancy block, the smaller potential energy available for extraction from the water. To optimize the potential energy available from the buoyancy pump device 100, the buoyancy block 114 should be fully submerged and should not exceed the width or height of the wave or swell arc.

All of the examples above assume that certain size waves are available at a specific site and on a regular daily basis for the buoyancy pump device to be operationally efficient. Fortunately, data regarding the wave heights at specific locations for each day of the year is available from several sources including the website at http://www.ndbc.noaa.gov which is incorporated herein by reference. The following table (TABLE 3) illustrates wave data for January 2001 and February 2001 taken from GRAYS HARBOR, Wash.

TABLE 3

Annualized Wave Averages
Grays Harbor, WA Buoy (water depth = 125.99 feet)

| | January 2001 | | | February 2001 | |
|---|---|---|---|---|---|
| Day | Wave Height (ft.) | Period (sec) | Day | Wave Height (ft.) | Period (sec) |
| 1 | 8.20 | 11.020 | 1 | 8.00 | 11.500 |
| 2 | 9.20 | 11.020 | 2 | 16.20 | 11.500 |
| 3 | 7.10 | 11.020 | 3 | 16.50 | 11.500 |
| 4 | 10.20 | 11.020 | 4 | 7.50 | 11.500 |
| 5 | 9.80 | 11.020 | 5 | 11.80 | 11.500 |
| 6 | 13.60 | 11.020 | 6 | 6.40 | 11.500 |
| 7 | 6.30 | 11.020 | 7 | 7.80 | 11.500 |
| 8 | 7.00 | 11.020 | 8 | 5.50 | 11.500 |
| 9 | 10.30 | 11.020 | 9 | 9.40 | 11.500 |
| 10 | 16.50 | 11.020 | 10 | 9.40 | 11.500 |
| 11 | 9.10 | 11.020 | 11 | 6.90 | 11.500 |
| 12 | 10.60 | 11.020 | 12 | 6.60 | 11.500 |
| 13 | 6.50 | 11.020 | 13 | 5.20 | 11.500 |
| 14 | 12.10 | 11.020 | 14 | 4.10* | 11.500 |
| 15 | 8.80 | 11.020 | 15 | 5.60 | 11.500 |
| 16 | 5.30 | 11.020 | 16 | 5.70 | 11.500 |
| 17 | 8.40 | 11.020 | 17 | 5.00 | 11.500 |
| 18 | 9.30 | 11.020 | 18 | 7.20 | 11.500 |
| 19 | 14.40 | 11.020 | 19 | 5.60 | 11.500 |
| 20 | 9.70 | 11.020 | 20 | 6.80 | 11.500 |
| 21 | 17.20 | 11.020 | 21 | 6.60 | 11.500 |
| 22 | 7.10 | 11.020 | 22 | 6.80 | 11.500 |
| 23 | 8.40 | 11.020 | 23 | 6.50 | 11.500 |
| 24 | 9.00 | 11.020 | 24 | 5.60 | 11.500 |
| 25 | 9.10 | 11.020 | 25 | 4.90* | 11.500 |
| 26 | 10.50 | 11.020 | 26 | 6.70 | 11.500 |
| 27 | 9.80 | 11.020 | 27 | 5.60 | 11.500 |
| 28 | 5.00 | 11.020 | 28 | 6.70 | 11.500 |
| 29 | 19.00 | 11.020 | | | |
| 30 | 9.40 | 11.020 | | | |
| 31 | 9.60 | 11.020 | | | |
| AVG. | 9.89 | 11.020 | AVG. | 7.38 | 11.500 |

*Non-operational (less than 5 ft)

In Table 3, the wave heights were measured for each respective day of the month to achieve a daily average. Wave period was averaged for the entire month and the same wave period was used for each day of the month. For January 2001, there were 31 total operation days, given an exemplary buoyancy pump device having a minimum wave height operational requirement of 5 ft. For February 2001, because day 14 and day 25 had wave heights less than 5 ft., there were only 26 operation days for the exemplary buoyancy pump device.

Referring now to TABLE 4, the average wave height data is shown for January and February, and then for the entire year (the remaining data for March through December 2001 is available at the web site referred to above).

TABLE 4

| | January | February | ... | Annual |
|---|---|---|---|---|
| Average Wave Speed | 11.02 | 11.50 | | 9.922 |
| Average Wave Height | 9.89 | 7.38 | | 7.467 |
| Operational Days | 31 | 26 | | — |
| Cumulative Operational Days | 31 | 57 | | 236 |
| Average Weight Height - Operational | 9.89 | 7.60 | | — |
| Cumulative Average Wave Height | 9.89 | 8.75 | | 8.54 |

The average of the wave heights for the operational days in January and February were thus determined to be 9.89 ft. and 7.60 ft., respectively. The annualized operational wave height for January and February 2001, would be averaged at 8.75 ft. of over a period of 57 days of operation. For calendar year 2001, the number of operational days was 236 with an average operational wave height of 8.54 ft. A user of a buoyancy pump device disclosed herein is able to obtain the publicly available data and determine effective annualized waveheights and operation days for a given buoyancy pump device configuration.

The components of the buoyancy pump device 100 must be adapted to function in a saline environment, such as an ocean. Accordingly, the components of the buoyancy pump device 100 must have anti-oxidation properties and/or otherwise be corrosive-resistant. To provide for minimal environmental impact, the inlet 126 of the piston chamber 122, which may be exposed to the surrounding environment, may have a filter placed thereon to filter out undesired components. In the case of seaweed or other decaying material, such as algae entering into the buoyancy chamber 112 or the buoyancy cylinder 104, the seaweed will act as a natural lubricant between the moving components of the buoyancy pump device 100. For example, if algae were to become lodged between the shims 140 and the buoyancy block 114, the algae would reduce the friction between the shims 140 and the buoyancy block 114, thereby increasing the buoyancy pump device efficiency.

Figure 5:
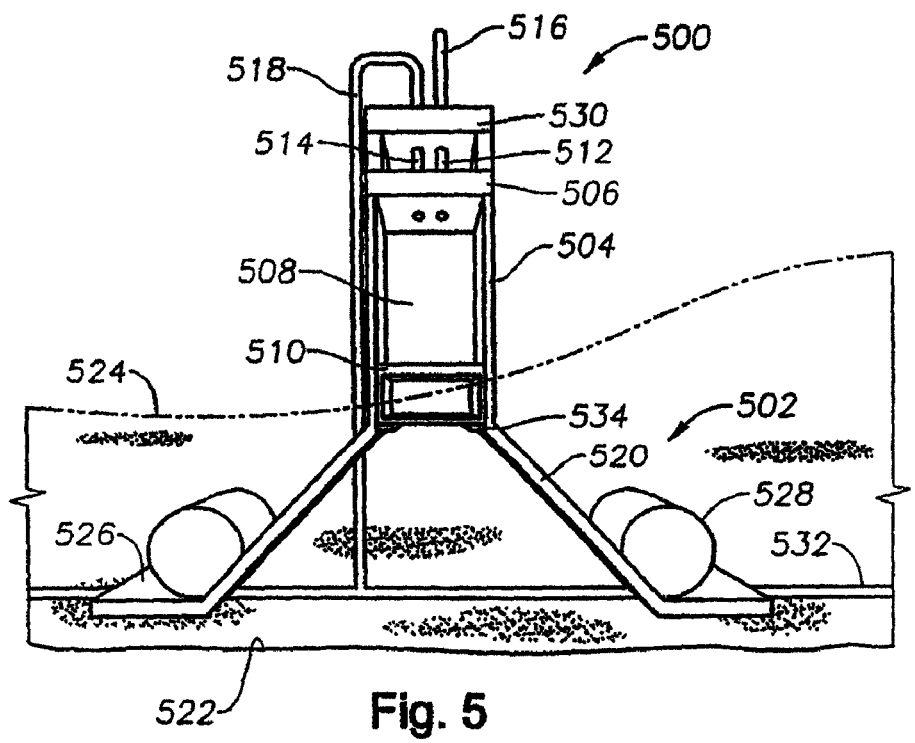
FIG. 5 is an elevated side view of an alternate embodiment of an exemplary buoyancy pump device for use in a buoyancy pump power system according to the principles of the present invention.

Referring now to FIG. 5, an elevated side plan view of an alternate embodiment of a buoyancy pump device 500 is shown in accordance with the principles of the present invention. The buoyancy pump device 500 includes a base 502, a buoyancy cylinder 504 connected at one end to the base 502 and enclosed at the other end by a buoyancy cylinder cap 506 and aligned generally coaxially with the buoyancy cylinder 504. The other end of the buoyancy cylinder 504 is open and exposed to the environment. The buoyancy cylinder 504 and buoyancy cylinder cap 506 collectively define a buoyancy chamber 508 therein.

A buoyancy block 510 generally cylindrical in shape is slidably positioned with the buoyancy chamber 508 to move axially therein. It is to be appreciated that the buoyancy pump device 500 in this embodiment eliminates the need for a piston and piston shaft by combining the buoyancy block of FIG. 1 and the buoyancy block and piston of FIG. 1 into one equivalent buoyancy block 510.

An inlet valve 512 and an outlet valve 514 extend through the buoyancy cylinder cap 506 in communication with the buoyancy chamber 508 to allow gas or liquid to flow therethrough. An inlet line 516 and an outlet line 518 are connected to the inlet valve 512 and outlet 514, respectively, and are adapted to receive and exhaust, respectively, gas or liquid from the other ends.

The base 502 may have a plurality of legs 520 extending towards a floor 522 of the body of water 524. A support base 526 is coupled through the legs 520 to secure the buoyancy pump device 500 on the floor 522. The base 502 connects to ballast tanks 528 for maintaining the buoyancy pump device 500 in a fixed position relative to the environment.

Positioned axially above the buoyancy cylinder cap 506 is a ballast cap 530 which further serves to stabilize the buoyancy pump device 500. The ballast cap 530 is adapted to allow the valves 512, 514 and lines 516, 518 to communicate therethrough. Instead of a storage tank, the outlet line 518 may be connected to a flow line 532 to move gas or liquids flowing through the flow line to a desired location (not shown).

The buoyancy block 510 disposed within the buoyancy chamber 508 has a predetermined buoyancy, such that the buoyancy block 510 moves in a cycle conforming to the fluid dynamics of the water in which the buoyancy pump device 500 is positioned and the hydraulic or pneumatic system characteristics of the buoyancy pump device 500 itself. The buoyancy of the buoyancy block 510 may be adjusted in a manner as described above. Stops 534 are disposed on an inner perimeter at a lower end of the buoyancy cylinder 504 to prevent the buoyancy block 510 from withdrawing outside of the buoyancy cylinder 504. The buoyancy block 510 has a seal formed about the perimeter of the buoyancy block 510 to prevent communication between the buoyancy chamber 508 and the water 524.

The inlet and outlet valves 512, 514 are unidirectional flow devices which permit the flow of gas or liquid into and out of the buoyancy chamber 508, respectively. It is to be appreciated that the valves 512, 514 may be positioned at differing locations, so long as a desired pressure is achievable within the buoyancy chamber 508.

In operation, as waves pass the buoyancy pump device 500, water contacts the buoyancy block 510 through the opening in the buoyancy cylinder 504 to raise the buoyancy block 510 in a cycle conforming to the fluid dynamics of the water and the hydraulic or pneumatic system characteristics of the buoyancy pump device 500. Gas or liquid in the buoyancy chamber 508 is expelled or exhausted through the outlet valve 514 and outlet line 518 into the flow line 532. As the wave departs the buoyancy pump device 500, the buoyancy block 510 incrementally descends as urged by gravity, creating a vacuum within the buoyancy chamber 508. Accordingly, gas or liquid is entered in through the inlet line 516 and inlet valve 512 into the buoyancy chamber 508. As the next successive wave approaches, gas or liquid that has been drawn into the buoyancy chamber 508 is again expelled through the outlet valve 512, outline line 518 and flow line 532 in relation to the position of the buoyancy block as it rises with respect to the wave.

Figure 6:
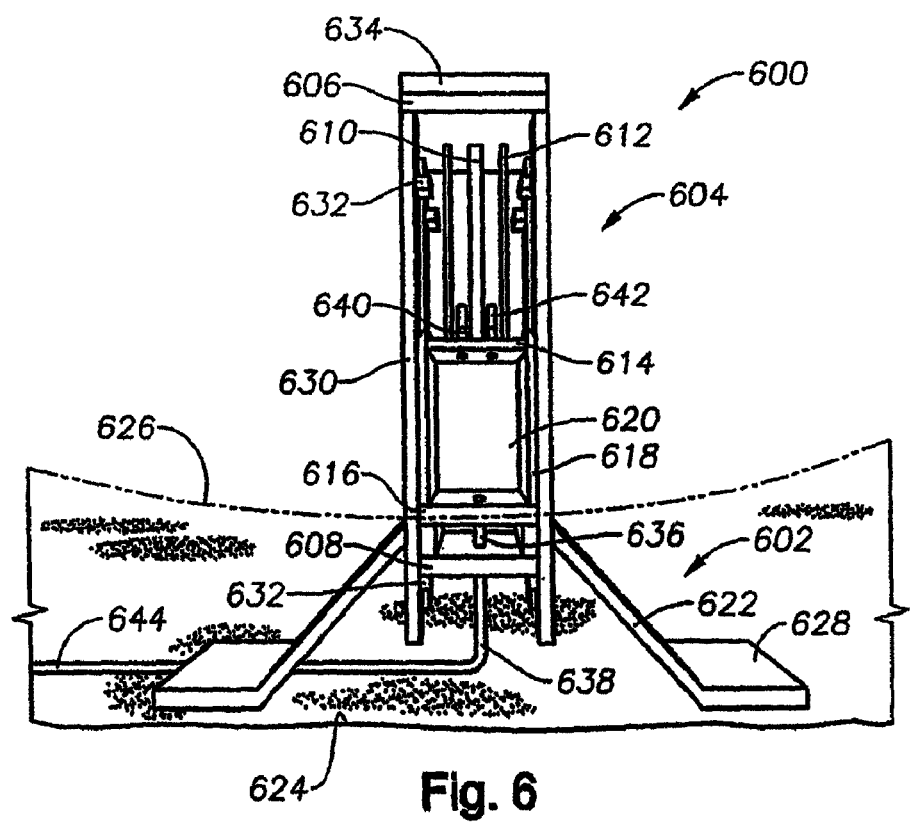
FIG. 6 is an elevated side view of yet another embodiment of an exemplary buoyancy pump device for use in a buoyancy pump power system according to the principles of the present invention.

Referring now to FIG. 6, an elevated side view of yet another embodiment of a buoyancy pump device 600 is shown. The buoyancy pump device 600 includes a base 602, a buoyancy housing 604 connected to the base 602, a buoyancy housing cap 606 coupled to the buoyancy housing 604, and a buoyancy housing base 608 coupled to the other end of the buoyancy housing 604. Axially descending from the buoyancy housing cap 606 and connected thereto is a piston shaft 610 and a plurality of piston supports 612. Connected to the other end of the piston shaft 610 and piston supports 612 is a piston 614. Between the piston 614 and the buoyancy housing base 608 is positioned a buoyancy block 616 having buoyancy block walls 618 extending towards the buoyancy housing cap 606. The buoyancy block 616, buoyancy block walls 618, and piston 614 form a piston chamber 620 therein. The buoyancy block walls 618 are adapted to slidably move between the piston 614 and the buoyancy housing 604. The base 602 has a plurality of legs 622 descending towards a floor 624 of the body of water 626. Base supports 628 are connected to the legs 622 and positioned on the floor 624 of the water 626. The base supports 628 may be filled with a suitable ballast to maintain the position of the buoyancy pump device 600 in a position relative to the water 626.

The buoyancy housing 604 comprises four vertically extending posts 630 coupled to and positioned between the buoyancy housing cap 606 and the buoyancy housing base 608. A plurality of stops 632 are positioned on respective upper and lower portions of the posts 630 to maintain the buoyancy block 616 within the buoyancy housing 604 and limit axial movement thereof. At the top of the buoyancy housing 604 a ballast cap 634 is connected thereto to assist in maintaining the buoyancy pump device 600 in a fixed position relative to the water 626. The buoyancy housing base 608 connects on one surface to an outlet valve 636 and at the other surface to an outlet line 638. The buoyancy housing base 608 provides for communication between the outlet valve 636 and the outlet line 638. The outlet line 638 is telescoping in nature, and slidably received through the buoyancy housing base 608 such that should the buoyancy block 616 move in relation to the buoyancy housing base 608, constant communication is maintained between the outlet valve 636 and the outlet line 638. The piston shaft 610 and the piston supports 612 are fixed relative to the buoyancy housing cap 606 and the piston 614 to maintain a fixed position of the piston 614 with respect to the buoyancy housing cap 606.

The piston 614 connects to an inlet valve 640 to allow communication of the inlet valve 640 with the piston chamber 620. The inlet valve 640 in turn is connected to an inlet line 642 to allow communication with the piston chamber 620 and the desired supply source.

The buoyancy block 616 and buoyancy block walls 618 are slidable with respect to the buoyancy housing 604 and buoyancy housing posts 630, such that the buoyancy block 616 and buoyancy block walls 618 may move axially within the buoyancy housing 604. The interface between the piston 614 and the buoyancy walls 618 is preferably sealed such that the piston chamber 620 may be under a fixed pressure with respect to axially movement of the buoyancy block 616 with respect to the piston 614, thereby maintaining a pressure therein.

The inlet and outlet valves 640, 636 are unidirectional flow devices which permit the flow of gas or liquid into and out of the piston chamber 620, respectively. It is to be appreciated that the valves 640, 636 may be positioned at differing locations on the buoyancy housing cap 606 and buoyancy housing base 608, respectively, so long as a desired pressure is achievable within the piston chamber 620.

In operation, as a wave having predetermined characteristics approaches and contacts the buoyancy block 616 and buoyancy block walls 618, the buoyancy block 616 and buoyancy block walls 618 move axially upward relative to the cycle conforming to the fluid dynamics of the water in which the buoyancy pump device 600 is positioned and the hydraulic or pneumatic system characteristics of the buoyancy pump device 600 itself. The buoyancy of the buoyancy block 616 may be adjusted in a manner described above.

The buoyancy block 616 pressurizes the gas or liquid in the piston chamber 620, such that the gas or liquid within the piston chamber 620 is expelled through the outlet valve 636 and outlet line 638 to be transported to a desired location through a flow line 644 coupled to the outlet line 638. As the wave departs the buoyancy pump device 600, gravity urges the buoyancy block 616 and buoyancy block walls 618 downward, thereby creating a vacuum within the piston chamber 620. Gas or liquid is then drawn through the inlet line 642 and inlet valve 640 into the piston chamber 620 until the buoyancy block either contacts the stops or reaches the trough of the wave. As the next wave cyclically approaches the buoyancy pump device 600, the process is then repeated.

Figure 7:
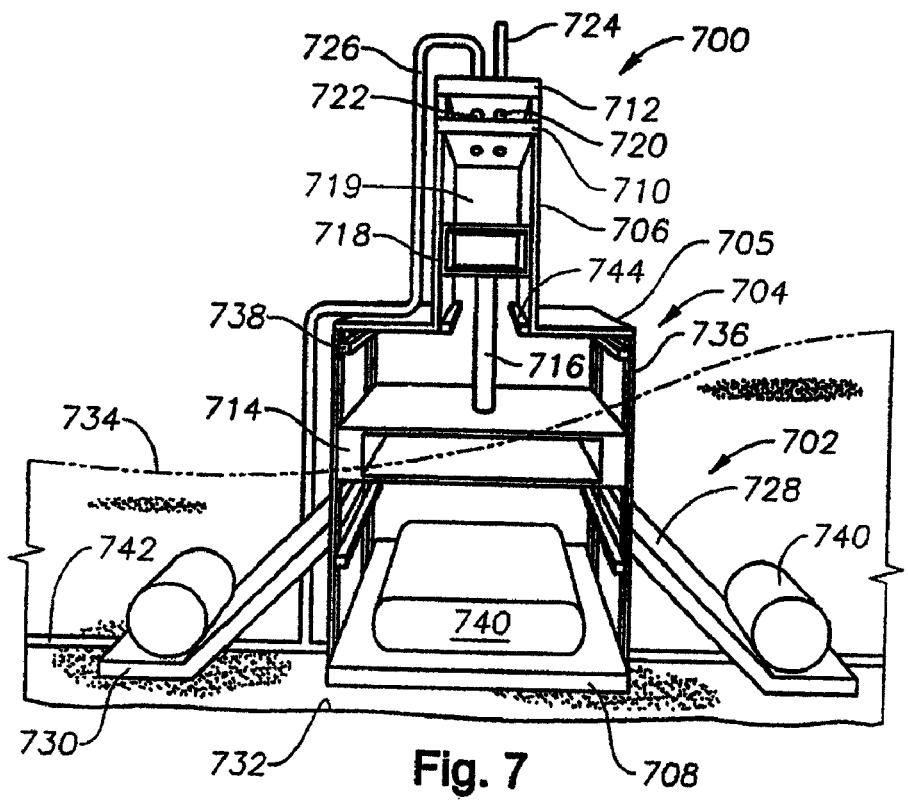
FIG. 7 is an elevated side view of another embodiment of an exemplary buoyancy pump device for use in a buoyancy pump power system according to the principles of the present invention.

Referring now to FIG. 7, an elevated side view of yet another embodiment of a buoyancy pump device 700 is shown. The buoyancy pump device 700 includes a base 702, a buoyancy housing 704, a buoyancy housing cap 705 connected to the buoyancy housing, a piston housing 706 connected to the buoyancy housing cap 705, a buoyancy housing base 708 connected to the other end of the buoyancy housing 704, the piston housing cap 710 connected to the piston housing 706, and a ballast cap 712 positioned above the piston housing cap 710 and coupled thereto.

A buoyancy block 714 is axially disposed within the buoyancy housing 704. A piston shaft 716 connects to the upper surface of the buoyancy block 714 at one end and to a piston 718 axially disposed within the piston housing 706 at the other end. A piston chamber 719 is formed between the upper surface of the piston 718, the lower surface of the piston housing cap 710 and the piston housing 706.

An inlet valve 720 and an outlet valve 722 are connected to the piston chamber 719 through the piston housing cap 710. The inlet valve 720 and outlet valve 722 extend through the ballast cap 712 and connect to an inlet line 724 and an outlet line 726, respectively.

The base 702 has a plurality of support legs 728 which extend toward a support base 730. The support base 730 preferably seats on a floor 732 of the body of water 734.

The buoyancy housing 704 has a plurality of buoyancy housing legs 736 extending towards the buoyancy housing base 708 and connected thereto. The buoyancy housing legs 736 allow water 734 to pass therethrough. A plurality of buoyancy block stops 738 are disposed at upper and lower locations on an inner surface of the buoyancy housing legs 736 to limit axial movement of the buoyancy block 714 within the buoyancy housing 704.

The buoyancy housing base 708 has a ballast tank 740 positioned thereon to maintain the position of the buoyancy pump device 700 relative to the body of water 734. The buoyancy housing base 708 is further connected to a flow line 742 and allows the flow line 742 to flow through the buoyancy housing base 708.

The piston housing 706 has a plurality of piston stops 744 disposed at a lower end of and inside of the piston housing 706 to limit axial movement of the piston 718 in the piston housing 706. The piston housing 706 is further adapted to allow slidable axial movement of the piston 718 within the piston housing 706.

The ballast cap 712 may be used to further stabilize the buoyancy pump device 700 with respect to the body of water 734 by having a predetermined ballast or a variable ballast within the ballast cap 712.

The buoyancy block 714, which may be adjustable in the manner described above, is adapted to slidably axially move within the buoyancy housing 704 as limited by a cycle conforming to the fluid dynamics of the water 734 in which the buoyancy pump device 700 is positioned and the hydraulic or pneumatic system characteristics of the buoyancy pump device 700 itself.

The piston shaft 716 is preferably rigid and maintains a fixed relationship between the piston 718 and the buoyancy block 714. The piston 718 is exposed to water on the lower end due to the opened end of the piston housing 706 disposed towards the buoyancy block 714. The piston 718 preferably has a seal (not shown) disposed about the perimeter of the piston 718 that prevents leaking or seepage from the piston chamber 719 into the area beneath the piston. In such a manner, the piston chamber is therefore kept free from the external environment and provides an effective location for pumping gas or liquid therein in a pressure relationship.

The inlet and outlet valves 720, 722 are unidirectional flow devices permit the flow of gas or liquid into and out of the piston chamber 719, respectively. It is to be appreciated that the valves 720, 722 may be positioned at different locations on the piston housing cap 710, so long as a desired pressure is achievable within the piston chamber 719.

The inlet line 724 is adapted to be connected into a desired gas or liquid, and therefore provide a desired source of gas or liquid to be pumped by the buoyancy pumping device 700. The outlet line 726 is coupled to the flow line 742, which in turn directs flow to a desired location.

In operation, as a wave approaches the buoyancy pump device 700, the buoyancy block 714, having a predetermined buoyancy, incrementally rises with respect to the wave. The piston 718 will move in direct relation to the buoyancy block 714, thereby expelling gas or liquid from the piston chamber 719 through the outlet valve 722, outlet line 726, and flow line 742. As the wave departs the buoyancy pump device 700, the buoyancy block 714, urged by gravity, descends with respect to the wave. The piston 718, moving in direct relation to the descent of the buoyancy block 714, likewise descends, thereby creating a vacuum within the piston chamber 719.

Gas or liquid is drawn through the inlet line 724 and inlet valve 720 into the piston chamber 719, thereby filling the piston chamber 719. The cycle continues to repeat in relation to the cycle conforming to the fluid dynamics of the water and the hydraulic or pneumatic system characteristics of the buoyancy pump device 700 itself.

Figure 8:
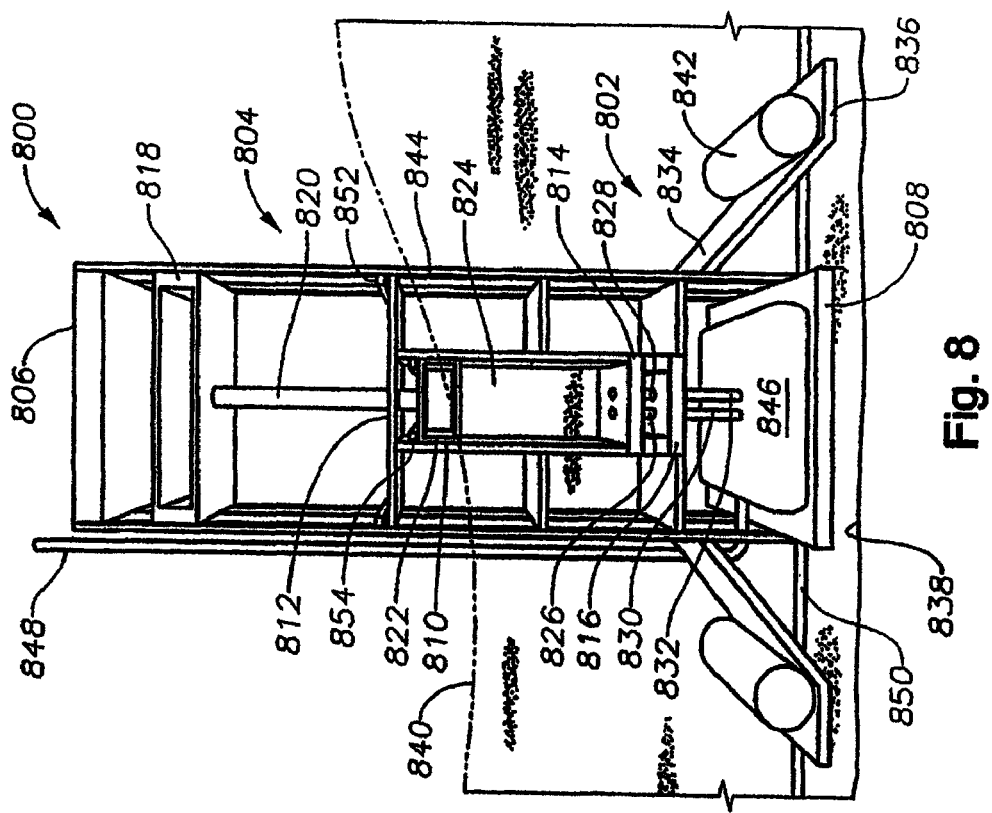
FIG. 8 is an elevated side view of yet another embodiment of an exemplary wave-pump another alternate embodiment of an buoyancy pump device for use in a buoyancy pump power system according to the principles of the present invention.

Referring now to FIG. 8, a side elevational view of an alternative embodiment of an exemplary buoyancy pumping device 800 is shown in accordance with the principles of the present invention. The buoyancy pump device 800 includes a base 802, a housing 804 connected to the base 802, a housing cap 806 connected to the housing 804, and a housing base 808 connected to the other end of the housing 804. A piston housing 810 is axially disposed in a lower portion of the housing 804. The piston housing 810 includes a piston housing cap 812 and a piston housing base 814. A piston housing ballast portion 816 is connected to the piston housing 810 at a lower portion thereof.

A buoyancy block 818 having a predetermined buoyancy, is disposed within the housing 804. A piston shaft 820 is connected to a lower end of the buoyancy block 818 and extends axially therefrom. A piston 822 is connected to the other end of the piston shaft 820. The piston 822 is adapted to axially move within the piston housing 810. A piston chamber 824 is formed by a lower surface of the piston 822, the piston housing base 814 and the piston housing 810.

An inlet valve 826 is connected through the piston housing base 814 and in communication with the piston chamber 824. Likewise, an outlet valve 828 is connected to the piston housing base 814 and in communication with the piston chamber 824. An inlet line 830 and an outlet line 832 is connected to the other respective ends of the inlet valve 826 and outlet valve 828.

The base 802 includes support legs 834 which extend and connect to a support base 836. The support base 836 is adapted to rest against a floor 838 of the body of water 840. Ballast tanks 842 are connected to an upper surface of the support base 836 and adapted to receive and/or expel ballast and thereby maintain the position of the buoyancy pump device 800 with respect to the body of water 840.

The housing 804 comprises a plurality of housing legs 844 connected to the housing base 808 at one end and to the housing cap 806 at the other end. The housing legs 844 allow water to freely flow therebetween.

A flow tank 846 is connected to the inlet line 830 and outlet line 832, and positioned on a surface of the housing base 808. The flow tank 846 is further connected to a supply line 848 and a flow line 850. The flow tank 846 may control flow to and from the piston chamber 824, and direct outlet flow from the piston chamber 824 to a desired location through the flow line 850.

The buoyancy of the buoyancy block 818 is adjustable in a manner described above. The buoyancy block 818 is adapted to slideably axially move within the housing 804 in a cycle conforming to the fluid dynamics of the water 840 in which the buoyancy pump device 800 is positioned and the hydraulic or pneumatic system characteristics of the buoyancy pump device 800 itself.

The piston shaft 820 maintains the buoyancy block 818 and the piston 822 in a fixed relationship, such that movement of the buoyancy block 818 corresponds to movement of the piston 822.

The housing 804 has a plurality of buoyancy block stops 852 positioned on an inside of the housing legs 844 to limit axial movement of the buoyancy block 818 therein. Likewise, the piston housing 810 has a plurality of piston stops 854 on an inner surface of the piston housing 810 adapted to limit the axial movement of the piston 822 therein.

The inlet valve 826 and outlet valve 828 are unidirectional flow devices which permit the flow of gas or liquid into and out of the piston chamber 824, respectively. It is to be appreciated that the valves 826, 828 may be positioned at differing locations on the piston housing base 814, so long as the desired pressure is achievable within the piston chamber 824.

In operation, as a wave having predetermined characteristics arrives at the buoyancy pump device 800, the buoyancy block 818 and piston 822 incrementally rise. A vacuum is created within the piston chamber 824, thereby drawing gas or liquid, depending on the supply source connected to the supply line 848 is drawn into the piston chamber 824 through the inlet line 830 and inlet valve 826. As the wave departs the buoyancy pump device 800, gravity urges the buoyancy piston axially downward, thereby compressing the gas or liquid within the piston chamber 824 and exhausting or expelling the gas or liquid within the piston chamber 824 through the outlet valve 828, outlet line 832, flow tank 846 and flow line 850.

Figure 9:
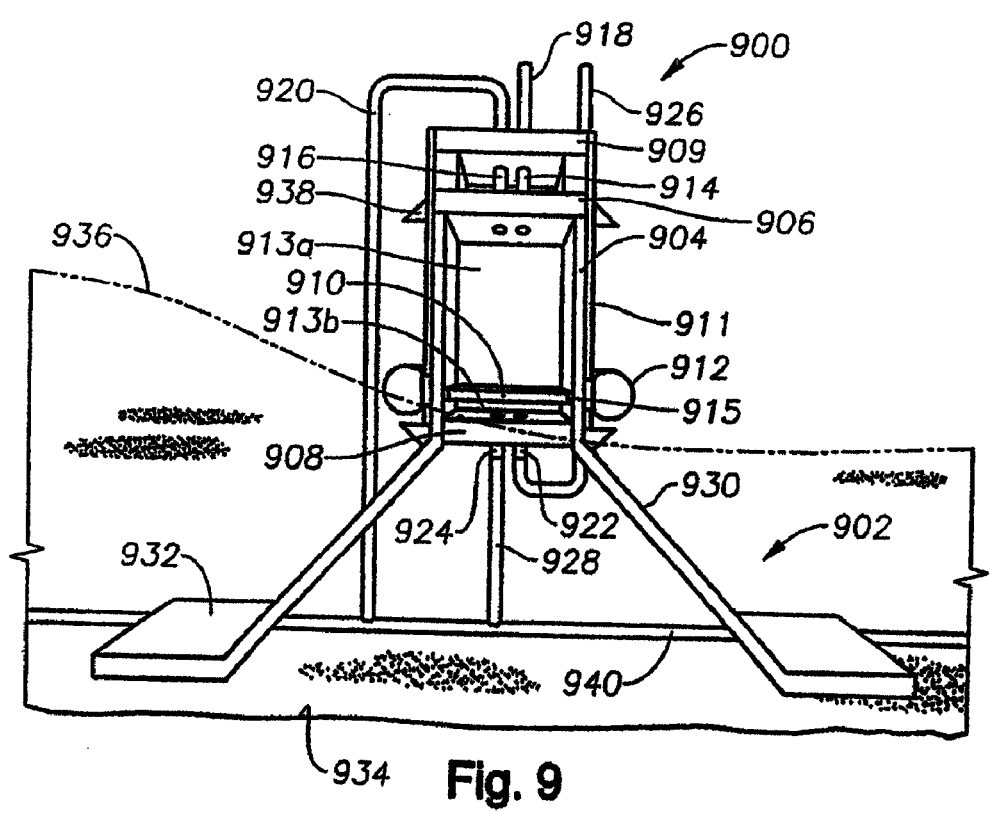
FIG. 9 is an elevated side view of another embodiment of an exemplary buoyancy pump device for use in a buoyancy pump power system according to the principles of the present invention.

Referring now to FIG. 9, a side elevational view in an alternative embodiment of an exemplary buoyancy pump device 900 is shown. The buoyancy pump device 900 includes a base 902, a housing 904 connected to a base 902, a housing cap 906 and a housing base 908. A housing ballast portion 909 is disposed axially above the housing cap 906.

A metallized piston 910 is disposed within the housing 904 and is adapted to axially move within the housing 904. Positioned outside of the housing 904 and adjacent to the ends of the piston 910 are a plurality of magnetized buoyancy blocks 912, having predetermined buoyancy. The magnetized buoyancy blocks 912 are positioned next to the metallized piston 910, such that movement of the magnetized buoyancy block 912 corresponds to movement of the metallized piston 910 within the housing 904. A guide rail 911 is provided on the housing 904 to guide movement of the magnetized buoyancy block 912 in relation to the metallized piston 910. Piston chambers 913a, 913b are defined on opposite sides of the piston 910. A non-metallic seal 915 may be placed on and coupled to an outer surface of the metallized piston 910 between the metallized piston 910 and the housing 904 to prevent fluid or liquid flow between the piston chambers 913a, 913b.

A first inlet valve 914 and a first outlet valve 916 are connected through the housing cap 906 with the piston chamber 913a. The first inlet valve 914 and first outlet valve 916 are connected through the housing ballast portion 909 to a first inlet line 918 and a first outlet line 920, respectively.

A second inlet valve 922 and a second outlet valve 924 are connected at one end through the housing base 908 with the piston chamber 913b. The second inlet valve 922 and second outlet valve 924 are connected at other respective ends to the second inlet line 926 and second outlet line 928.

The base 902 includes a plurality of support legs 930 coupled at one end to the housing 904 and at the other end to a support base 932. The support base 932 is adapted to rest against a floor 934 of a body of water 936 in which the buoyancy pump device 900 is placed.

The housing 904 includes a plurality of stops 938 on an external surface, which are adapted to limit axial movement of the magnetized buoyancy blocks 912. The outlet lines 920, 928 are connected to a flow line 940 for transmission of flow therein to a desired location.

The magnetized buoyancy blocks 912 move in a cycle conforming to the fluid dynamics of the water in which the buoyancy pump device 900 is positioned and the hydraulic or pneumatic system characteristics of the buoyancy pump device 900 itself. The buoyancy of the magnetized buoyancy blocks 912 may be adjusted by flooding the magnetized buoyancy blocks 912 with a predetermined fluid or solid, or expelling from the magnetized buoyancy blocks 912 the predetermined fluid or solid.

The inlet valves 914, 922 and outlet valves 916, 924 are unidirectional flow devices which permit the flow of gas or liquid into and out of the piston chambers 913a, 913b. For example, the first inlet valve 914 allows flow into piston chamber 913a, and the first outlet valve 916 allows flow out of the piston chamber 913a. The second inlet valve 922 and second outlet valve 924 allow flow into and out of the piston chamber 913b. It is to be appreciated that the first inlet valve 914 and first outlet valve 916 may be positioned at differing locations on the housing cap 906. Likewise, the second inlet valve 922 and second outlet valve 924 may be positioned at differing locations on the housing base 908, so long as a desired pressure is achievable within the piston chambers 913a, 913b.

In operation, as a wave from the body of water 946 departs the buoyancy pump device 900, the magnetized buoyancy blocks 912 incrementally lower due to gravity, thereby magnetically lowering the metallized piston 910 to create a vacuum within the piston chamber 913a. At the same time, the dropping of the magnetized buoyancy blocks 912 and metallized piston 910 compresses the gas or liquid within the piston chamber 913b. The gas or liquid therein is exhausted or expelled through the second outlet valve 924, second outlet line 928 and into the flow line 940. In the piston chamber 913a, the vacuum draws gas or liquid from the first inlet line 918 through the first inlet valve 914, and into the piston chamber 913a.

As the next wave approaches, the magnetized buoyancy blocks 912 and metallized piston 910 incrementally rise in a magnetic interrelationship with respect to the passing water 936, thereby pressurizing the gas or liquid within the piston chamber 913a and expelling the gas or liquid through the first outlet valve 916 and first outlet line 920 into flow line 940. The piston chamber 913b becomes a vacuum, thereby drawing gas or liquid through the second inlet line 926, second inlet valve 922 and into the piston chamber 913b. The process is cyclically repeated with each successive wave.

Should the pressure in either outlet valve 916, 924 inhibit movement of the metallized piston 910, the magnetic buoyancy blocks 912 will separate from the metallized piston 910 to move with respect to the wave, and re-engage the metallized piston 910 in the next wave cycle.

Figure 10:
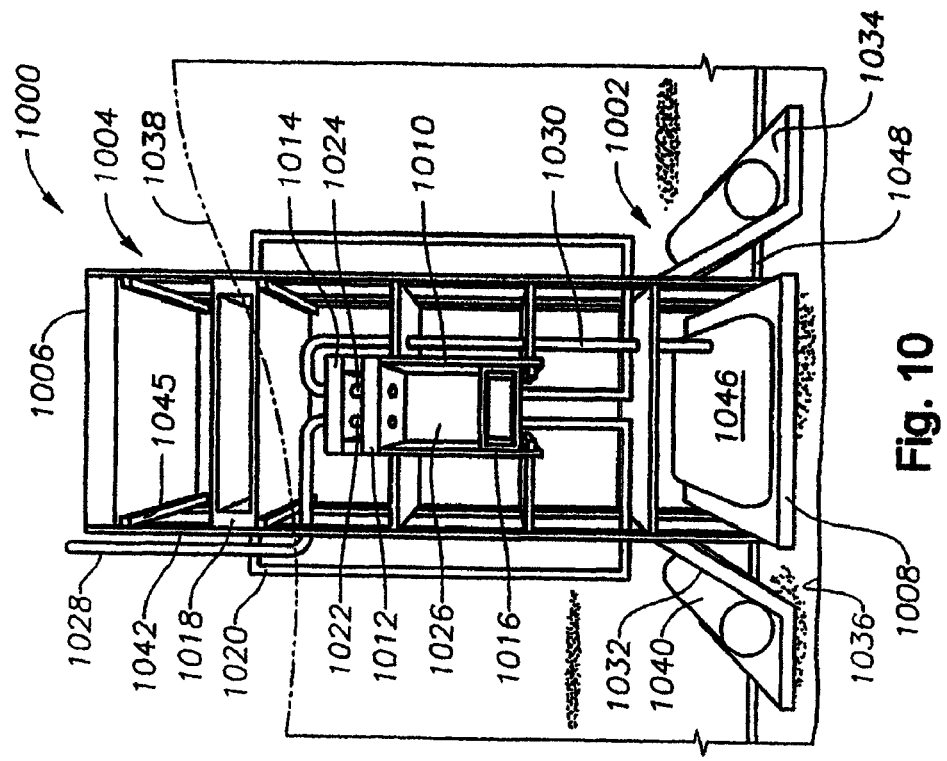
FIG. 10 is an elevated side view of yet another embodiment of an exemplary buoyancy pump device for use in a buoyancy pump power system according to the principles of the present invention.

Referring now to FIG. 10, yet another embodiment of an exemplary buoyancy pump device 1000 is shown in accordance with the principles of the present invention. Buoyancy pump device 1000 includes a base 1002, a housing 1004 connected to the base 1002, a housing cap 1006 connected to the housing 1004 and a housing base 1008. A piston cylinder 1010 is disposed within the housing 1004 and includes a piston cylinder cap 1012, and a piston cylinder ballast portion 1014 connected to the piston cylinder 1010 and disposed above the piston cylinder cap 1012. A piston 1016 is adapted to axially move within the piston cylinder 1010. A buoyancy block 1018 is axially positioned with the housing 1004 above the piston cylinder 1010 and is adapted to axially move within the housing 1004. A plurality of piston shafts 1020 extend from a lower surface of the piston 1016 and connected to lateral surfaces of the buoyancy block 1018.

An inlet valve 1022 and an outlet valve 1024 are connected through the piston cylinder cap 1012 to a piston chamber 1026 formed by the piston cylinder cap 1012, piston cylinder 1010 and the upper surface of the piston 1016. An inlet line 1028 and an outlet line 1030 are connected to the inlet valve 1022 and outlet valve 1024, respectively. The inlet line 1028 and outlet line 1030 extend through the piston cylinder ballast portion 1014.

The base 1002 includes support legs 1032 connected to a lower portion of the housing 1004 at one end and to a support base 1034 at the other end. The support base 1034 is adapted to rest against a floor 1036 of a body of water 1038. A ballast tank 1040 is connected to an upper portion of the support base 1034 to maintain the buoyancy pump device 1000 in a fixed position relative to the body of water 1038.

The housing 1004 includes a plurality of housing legs 1042 which are adapted to allow the water 1038 to flow therebetween. The housing legs 1042 connect to the housing base 1008. The housing 1004 further includes a plurality of stops 1045 formed on an inner surface of the housing legs 1042 to limit axial movement of the buoyancy block 1018 therein.

Connected to the outlet line is a flow tank 1046, which is connected to the housing base 1008. The flow tank 1046 is adapted to direct flow received from the outlet line 1030 and supply the flow from the outlet line 1040 to a flow line 1048.

The piston cylinder 1010 is open at the end opposing the piston cylinder cap 1012, such that water may contact the bottom surface of the piston 1016. A seal (not shown) is provided on the perimeter of the piston 1016 to prevent communication between the piston chamber 1026 and the body of water 1038.

The piston 1016, which is adjustable in a manner described above, is slidably axially movable within the piston cylinder 1010. Because the piston 1016 and buoyancy block 1018 are connected via the piston shaft 1020, movement of the buoyancy block 1018 corresponds in direct movement of the piston 1016.

The buoyancy block 1018 has a predetermined buoyancy, such that the buoyancy block 1018 moves in a cycle conforming to the fluid dynamics of the water in which the buoyancy pump device 1000 is placed. The buoyancy of the buoyancy block 1018 may be adjusted in a manner described above, depending on the characteristics and fluid dynamics of the water and the system.

The inlet and outlet valves 1022, 1024 are unidirectional flow devices which permit the flow of gas or liquid into and out of the piston chamber 1026, respectively. It is to be appreciated that the valves 1022, 1024 may be positioned at differing locations on the piston cylinder cap 1012, so long as a desired pressure is achievable within the piston chamber 1026.

In operation, after the buoyancy pump device 1000 has been initially placed in a body of water, such as ocean, lake, river or other wave producing environment, the initial pressure in the outlet line 1030, valve 1024 and piston chamber 1026 begins at a zero-pressure state. The wave, having recognized properties, arrives at the buoyancy pump device 1000. Water from the wave incrementally lifts the buoyancy block 1018, thereby lifting both the buoyancy block 1018 and a piston 1016. The gas or liquid that has been introduced into the piston chamber 1026 begins to pressurize until the pressure in the piston chamber 1026 overcomes the line pressure in the outlet line 1030. At this point, the gas or liquid flows through the outlet valve 1024 and the outlet line 1030 and is transferred through the flow line 1048 to a desired location for use or storage.

As the wave departs the buoyancy pump device 1000, gravity urges the buoyancy block 1018 down, thereby resulting in a corresponding downward axial movement of the piston 1016 within the piston cylinder 1010. A vacuum is created within the piston chamber 1026, thereby drawing gas or liquid through the inlet line 1028, inlet valve 1022 and into the piston chamber 1026. The cycle is cyclically repeated with each successive wave.

Figure 11:
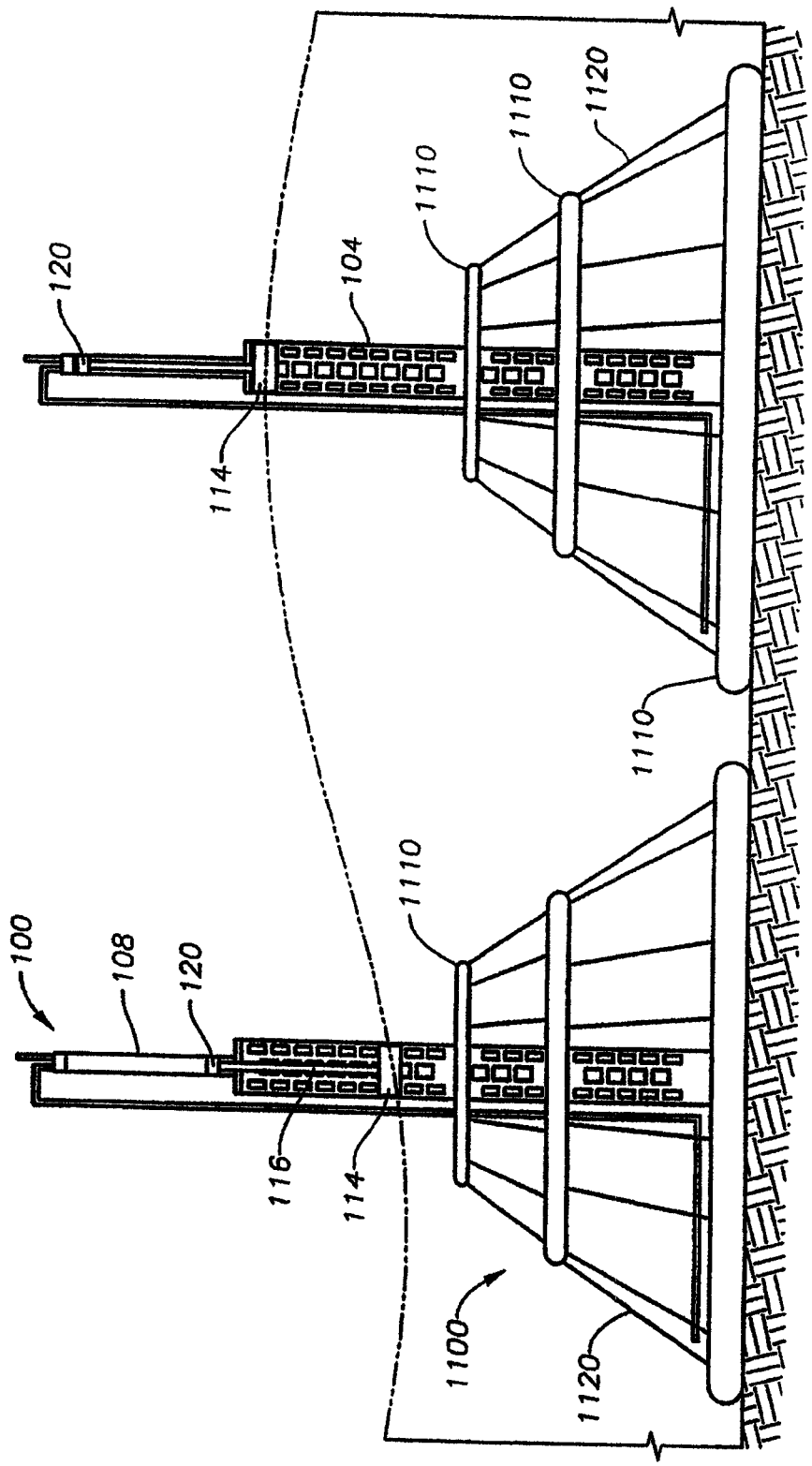
FIG. 11 is an elevated side view of a buoyancy pump device coupled to an exemplary aquiculture rig for use in a buoyancy pump power system according to the principles of the present invention.

Referring now to FIG. 11, there is shown exemplary side views of the buoyancy pump device 100 of FIG. 1 as coupled to an exemplary aquiculture rig 1100. In this configuration, the aquiculture rig 1100 includes a plurality of ballast tanks 1110 concentrically arranged about and connected to the buoyancy pump device 100. The ballast tanks 1110 are further connected to adjacent ballast tanks 1110 by a plurality of guy wires 1120. The plurality of ballast tanks 1110 may vary in length or width in order to stabilize the buoyancy pump device 100 with respect to oncoming waves from a body of water 1130 in which the buoyancy pump device 100 is positioned.

The buoyancy pump device may be a modular construction to allow the buoyancy pump device to be portable. A portable buoyancy pump device may be set up in one location, dismantled, and set up in another location. The portability of the buoyancy pump device may be distinguished from other hydro-electric generation systems that are not portable, such as a water flow turbine constructed permanently at one location. Moreover, a group or field of portable buoyancy pump devices may be moved to provide power to different land or sea-based applications (subject to the changing demand for power). For example, a group of one or more buoyancy pump devices may be deployed at a sea based location to support a military base deployed to a new region for an unknown period of time that is relocated to a different region thereafter. A group of buoyancy pump devices may be deployed substantially anywhere having sufficient sources of wave energy with waves that conform to the specifications of the buoyancy pump devices.

Figure 12A:
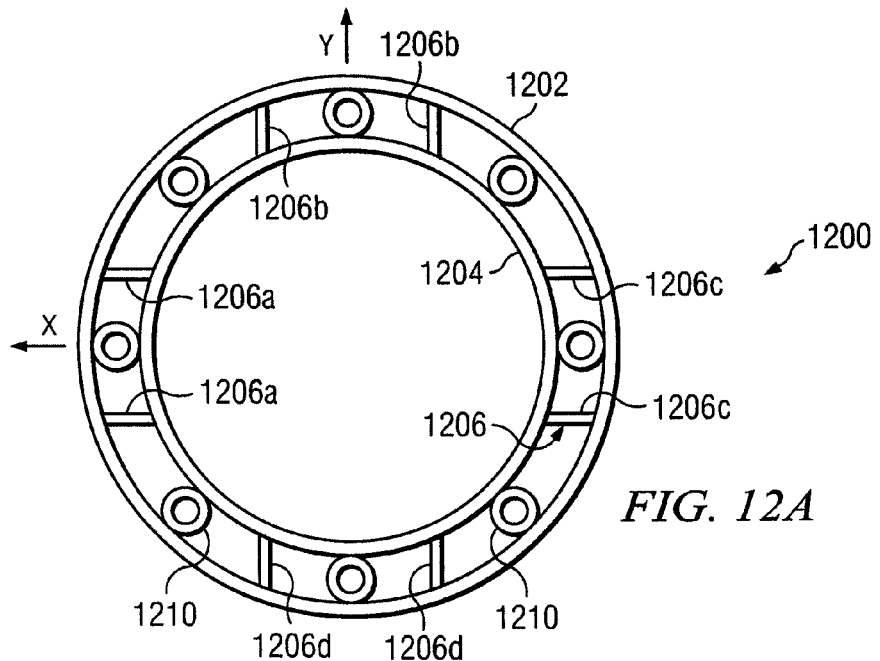
FIG. 12A is an illustration of an exemplary buoyancy chamber ring that may be used as a structural component of another embodiment of a buoyancy pump device.
Figure 12C:
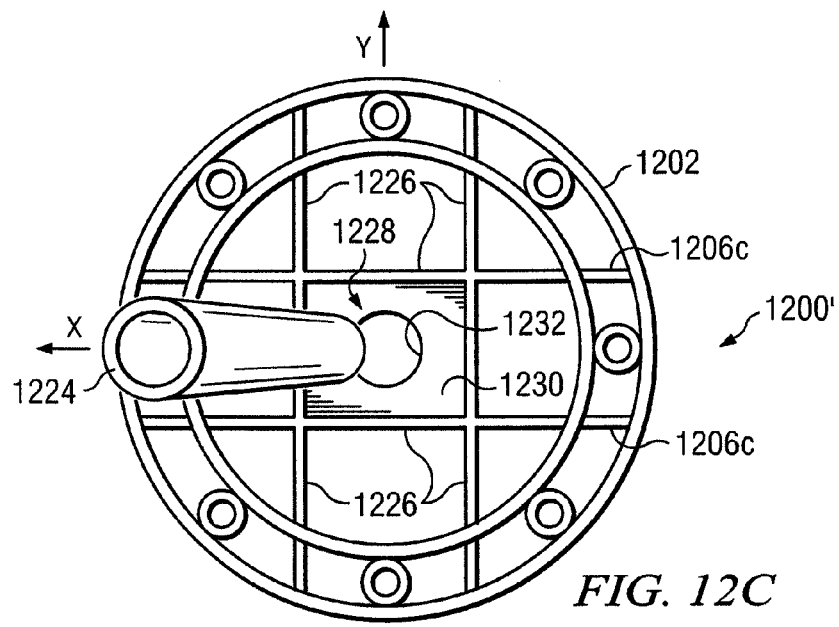
FIG. 12C is another embodiment of the buoyancy chamber ring of FIG. 12A configured as a cap of a piston chamber.
Figure 12B:
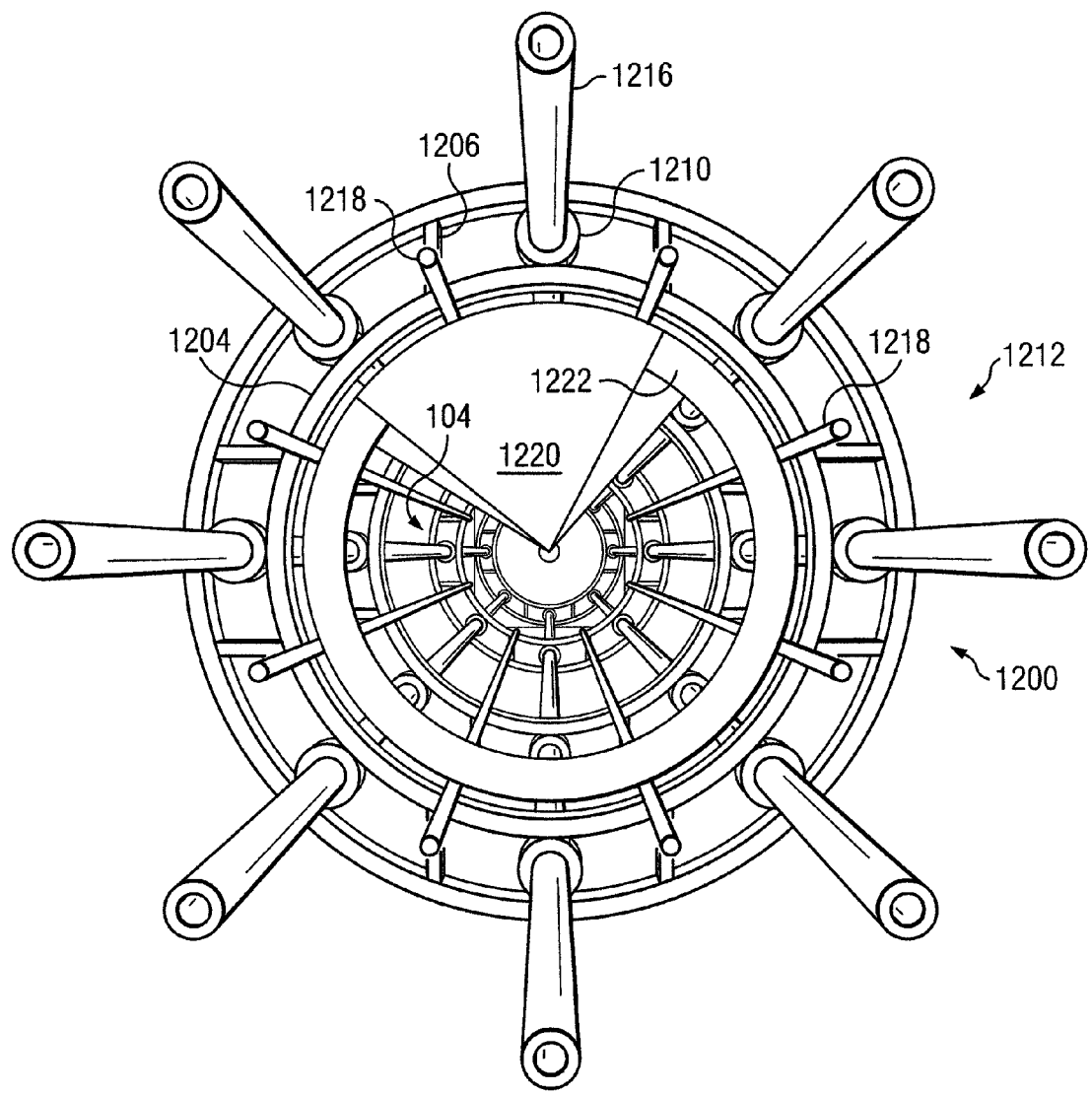
FIG. 12B is a perspective top view taken along a cross-section of the buoyancy chamber of FIG. 1 that utilizes the buoyancy chamber ring shown in FIG. 12A.

FIGS. 12A shows an exemplary buoyancy chamber ring 1200 that may be used as a structural component to construct an exemplary structure, as shown in FIG. 12B and formed of several buoyancy chamber rings 1200, to function substantially similar to the buoyancy cylinder 104 (see FIG. 1) of a buoyancy pump device. The buoyancy pump device utilizing the buoyancy chamber ring 1200 is modular in structure. The buoyancy chamber ring 1200 comprises an outer ring 1202 and an inner ring 1204. The outer and inner rings 1202 and 1204 are concentric and may be coupled by a number of spacers forming spacer pairs 1206a-1206d (collectively 1206). The spacer pairs 1206 may be configured in parallel and be symmetrically positioned about axes x and y. The spacer pairs 1206 provide structural support for the outer and inner rings 1202 and 1204. Other structural and/or geometric configurations of spacers may be utilized to provide structural support for the outer and inner rings 1202 and 1204. For example, a truss configuration of spacers between the outer and inner rings 1202 and 1204 may be utilized.

Guide ring cylinders 1210 may be centrally located between the spacer pairs 1206 and coupled to each of the outer and inner rings 1202 and 1204. The guide ring cylinders 1210 may be utilized to position and support the buoyancy chamber ring 1200 onto pilings 1216 (as discussed below with FIG. 12B). Each component of the buoyancy chamber ring 1200 may be composed of steel and/or materials, such as fiberglass or plastic, that are resistant to environmental conditions that are present in ocean or other environments.

FIG. 12B is a perspective top view taken along a cross section of the buoyancy chamber 104 (see also FIG. 1) for an exemplary buoyancy pump device 1212 that utilizes the buoyancy chamber ring 1200 shown in FIG. 12A. The buoyancy chamber 104 is formed by engaging a plurality of buoyancy chamber rings 1200 axially along eight pilings or struts 1216 that may be mounted into a base (not shown) residing on and extending vertically from the floor of a body of water. Depending on the depth of the body of water, each of the pilings 1216 may be composed of multiple segments. As shown, the pilings 1216 may extend through the guide ring cylinders 1210 positioned radially about the buoyancy chamber ring 1200.

Tubular shims 1218 extending vertically from the base of the buoyancy pump device 1212 may be coupled to the inner ring 1204 in alignment with each of the spacers of the spacer pairs 1206. The tubular shims 1218 are utilized as guides for a buoyancy block 1220 (shown in part). The buoyancy block 1220 may include or be coupled to a buoyancy ring 1222. The buoyancy ring 1222 may engage or be guided by the tubular shims 1218 to maintain alignment of the buoyancy block 1220 as it travels up and down within the buoyancy chamber 104. Because of the modular design, the buoyancy pump device 1212 may be constructed and taken apart for relocation purposes.

FIG. 12C is another embodiment of the buoyancy chamber ring 1200' configured as a cap for the buoyancy chamber 104. The buoyancy chamber ring 1200' further may be configured to position a piston chamber 1224. Positioning spacers 1226 may be substantially aligned with spacer pairs 1206 to form a rectangular region 1228 about a center point of the outer and inner rings 1202 and 1204. A rectangular guide block 1230 may be positioned in the rectangular region 1228 and coupled to the positioning spacers 1226. The rectangular guide block 1230 may include an opening 1232 sized to insert the piston chamber 1224 therethrough and maintain the piston chamber 1214 therein with connection members (not shown). It should be understood that the opening 1232 may be alternatively shaped and sized depending on the shape and size of the structural component (e.g., piston chamber 1224) being supported and aligned by the buoyancy chamber ring 1200'.

Figure 13:
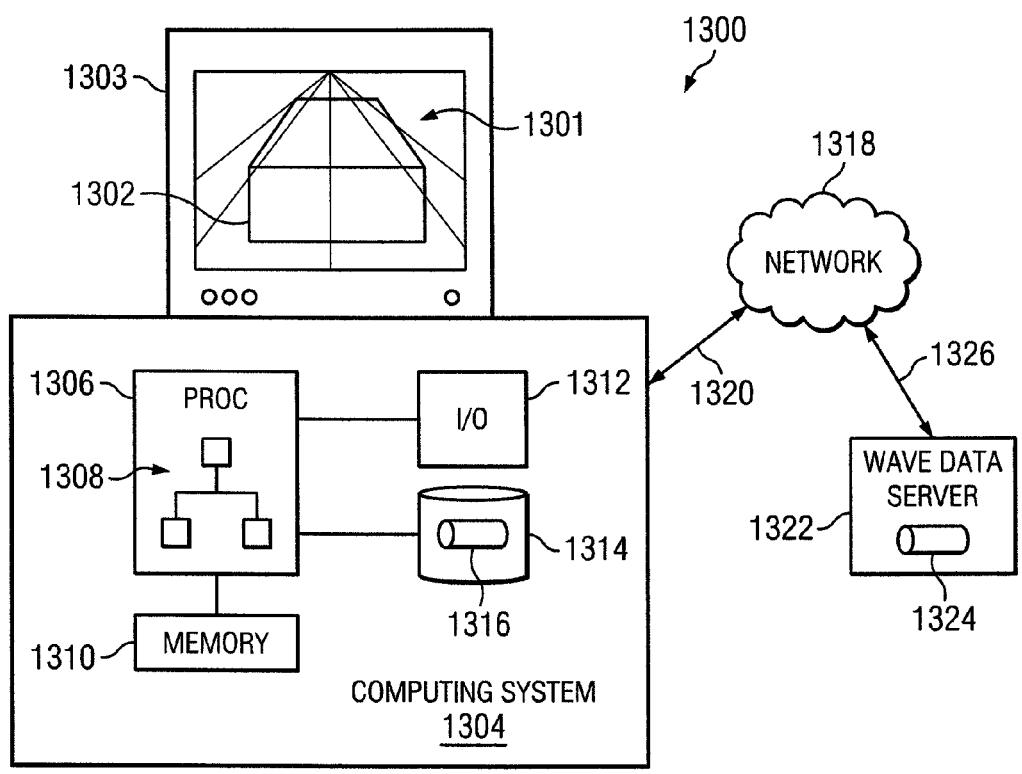
FIG. 13 is a drawing of a system for dynamically determining and/or adjusting the size of a buoyancy block based on wave data, such system depicting an image of a schematic of an exemplary buoyancy block displayed on a monitor of a computing system.

FIG. 13 is a drawing of a system 1300 for dynamically determining and/or adjusting the size of a buoyancy block based on wave data, such system depicting an image 1301 of a schematic of an exemplary buoyancy block 1302 displayed on a monitor 1303 of a computing system 1304. The computing system 1304 includes a processor 1306 that is operable to execute software 1308. The software 1308 is used to calculate dimensions and/or model operation of the buoyancy block 1302 based on historical wave data for a location in a body of water that a buoyancy pump device using the buoyancy block 1302 is to be positioned. The software 1308 may be formed of lines of code or formulas contained in a spreadsheet, for example. The software 1308 includes an algorithm that has input parameters for the historical wave data and outputs mechanical specification and system operational data.

The computing system 1304 further includes a memory 1310 coupled to the processor 1306. The memory may be utilized to store the program 1308 and data produced thereby. An input/output (I/O) device 1312 is coupled to the processor 1306 and used to receive and transmit data internally to or externally from the computing system 1304. A storage unit 1314 is in communication with the processor 1306 and is operable to store a database 1316. The database 1316 may store the historical wave data and other data related to the configuration of one or more buoyancy pump devices for deployment. In one embodiment, the database 1316 is a datafile containing data associated with the buoyancy block 1302.

The computing system 1304 may be in communication with a network 1318 via communication path 1320. In one embodiment, the network 1318 is the Internet. Alternatively, the network 1318 may be a satellite communication system.

The historical wave data server 1322 that maintains a database 1324 or other datafile containing wave data collected by buoys from various locations from bodies of water around the world as understood in the art. The wave data server 1322 is in communication with the network 1318 via communication path 1326 such that the computing system 1304 may access or look-up the wave data stored in the database 1324. The wave data that is accessed and collected from the wave data server 1322 by the computing system 1304 may be manually, semi-automatically, or automatically included in the database 1316 and utilized by the software 1308 to generate dimensions and/or model operations of the buoyancy block 1302.

The image 1301 of the buoyancy block 1302 may further include a variety of data fields to receive input parameters and/or display computed results in display fields for designing the buoyancy block 1302. A designer of the buoyancy block 1302 may use the input parameters to enter information associated with specific or typical historical wave motions for certain periods of time. Alternatively, the input parameters may be read from a datafile stored in the storage unit 1314, on the wave data server 1322, or elsewhere, and displayed on the image 1301.

In designing the buoyancy block 1302, consideration of the installation location and duration of the installation is to be taken into account. For example, if a buoyancy pump device is to be installed in a particular location for a period of time, such as three months, then the designer may enter low, peak, and average historical wave motion for those particular months at the particular location in designing the buoyancy block 1302. If the buoyancy pump is to be installed for a more permanent period of time, then the low, peak, and average historical wave motion may be entered over a longer period of time, such as five years, to determine the dimensions of the buoyancy block 1302.

The image 1301 may include input and output fields, including tables, grids, graphical images, or other visual layout, to assist the designer of the buoyancy pump device. During the design phase of the buoyancy pump device, the designer may perform a design process, such as those discussed with regard to EXAMPLES A and B, TABLES 1-4, and FIGS. 3A-3F and 4D. In performing the design process, EXAMPLE A (low wave size), EXAMPLE B (average wave size), and TABLE 1, provide examples for utilizing historical wave data in computing various component (e.g., buoyancy block) dimensions and system parameters (e.g., horsepower). Dimensions, such as the buoyancy block volume ($BB_V$), volume of cone (VC), volume of base (VB), and other dimensions, may be computed as a function of the historical wave data. TABLE 2, which describes buoyancy block diameter as a function of wave height ($W_H$), may be used to determine both dimensions and system parameters. The results shown on the image 1301 may be graphically displayed in conjunction with elements and dimensions shown on FIGS. 3A-3F and 4D, for example. It should be understood that more simple or detailed graphical images of elements of the buoyancy pump device may be computed and shown on the image 1301. Input data shown in TABLE 3 (Annualized Wave Averages) and TABLE 4 showing monthly average wave information may be input into the computing system 1300 in designing components for the buoyancy pump device based on the location and duration for deployment.

Continuing with FIG. 13, the display fields are used to show results from calculations produced by the software 1308 being executed by computing system 1304. The results shown in the display fields may include a variety of mechanical specifications for the buoyancy block 1301, including height ($h_1$) of the base (see FIG. 4D), diameter ($d_1$) of the base, height ($h_2$) of the cone, and other dimensions. Additionally, other dimensions of components of the buoyancy pump device may be computed, such as piston dimensions. The display fields may also include parameters that affect operational specifications, such as length of stroke available and lift travel time, and lift pressure, which is an amount of upward pressure developed by the buoyancy block 1301 as a function of the wave parameters (e.g., height and length).

The buoyancy pump devices are also scalable to serve the demand for a specific region. For example, a pre-determined number of buoyancy pump devices may be initially installed to service the demand for an existing region or part of a region, and then supplemented with additional buoyancy pump devices to serve the region as it expands or the remaining portion of the original region. The region may have only a small demand for energy requiring only 200 buoyancy pump devices, for example, or require a large demand for energy that would need several square miles of buoyancy pump devices comparable to that provided by a dam. Hence, the buoyancy pump devices are scalable and adaptable to whatever energy demands exist for a particular region being served.

Figure 14:
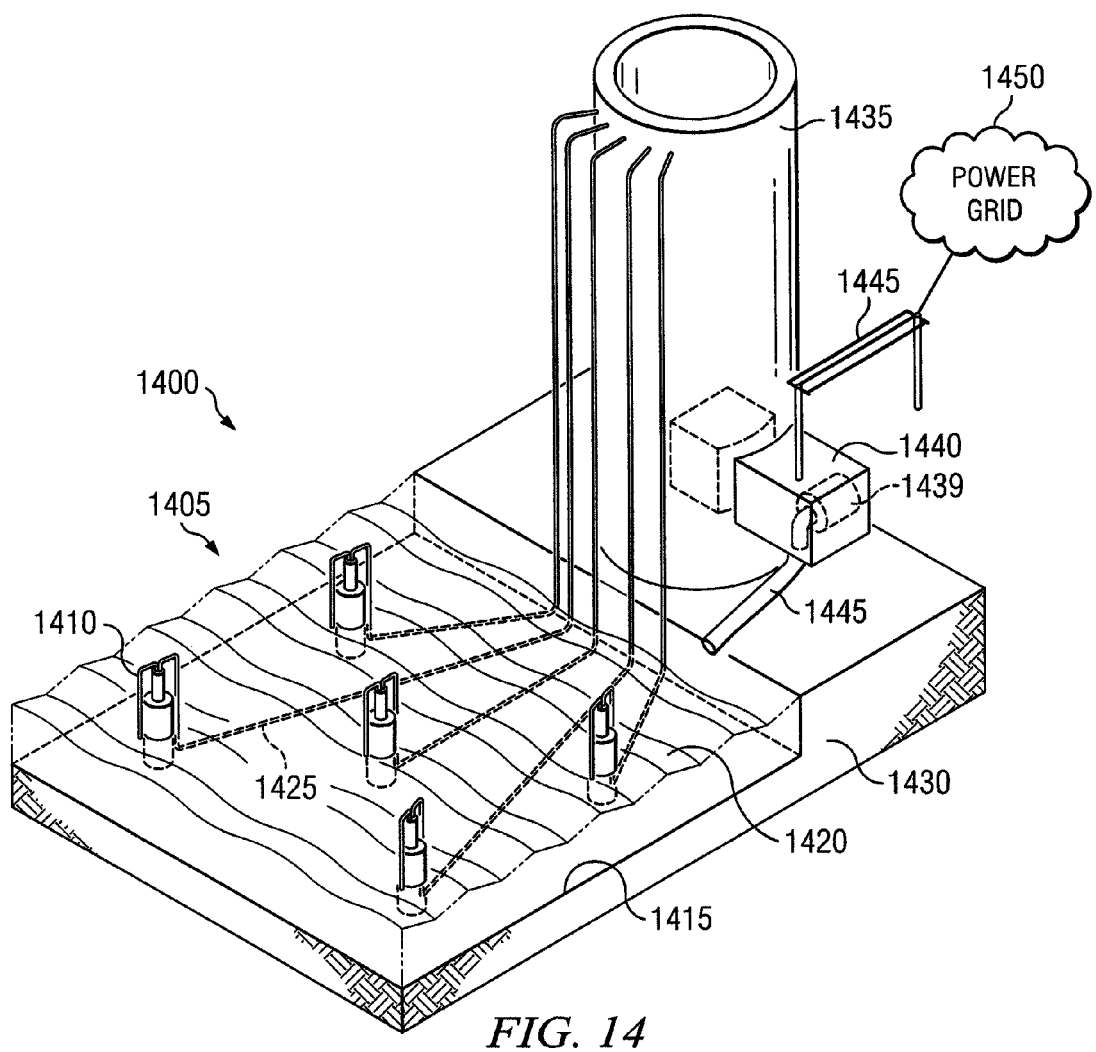
FIG. 14 is an elevated of an exemplary buoyancy pump power system that utilizes a water tower according to the principles of the present invention.

Referring now to FIG. 14, an elevated view of an embodiment of an exemplary buoyancy pump power system 1400 that utilizes a water tower is shown. A group 1405 of one or more buoyancy devices 1410 is distributed along a floor 1415 of a body of water 1420 in a predetermined configuration. The group 1405 of buoyancy pump device(s) 1410 can be configured in a grid, array, or otherwise distributed in a manner to accommodate each buoyancy pump device 1410 in receiving wave motion with little or no effect due to other buoyancy pump devices 1410.

Outlet lines 1425 from the buoyancy pump devices 1410 may extend along the floor 1415 toward a short 1430 that supports a water tower 1435. The outlet lines 1425 operate as water feeds that deliver water at or near the top of the water tower 1435.

The water tower 1435 operates as a reservoir for the pumped water to operate one or more turbines 1439 located in a turbine house 1440 at or near the bottom of the water tower 1435. It should be understood that the turbine house 1440 may be included within, located adjacent, or closely located to the water tower 1435 so as to receive water stored in the water tower 1435 by a function of gravity to produce electric energy from the flow of water through the turbine(s) 1439. Water that passes through the turbine(s) 1439 may be returned back to the body of water 1420 via a turbine discharge outlet 1440. Alternatively, the water may be discharged for distribution for other uses, such as irrigation or desalinization to convert to drinking water, for example.

Power lines 1445 may be coupled to the turbine(s) 1439 for distribution of the electric power generated by the turbines onto a power grid 1450 to which the power lines 1445 are coupled. It is contemplated that pumps that are provided power by other techniques than by the use of buoyancy principles may be utilized to feed water to the water tower 1435 in accordance with the principles of the present invention. For example, pumps that produce power by rotation means and/or wind power may be utilized to supply water to the water tower 1435.

Figure 15:
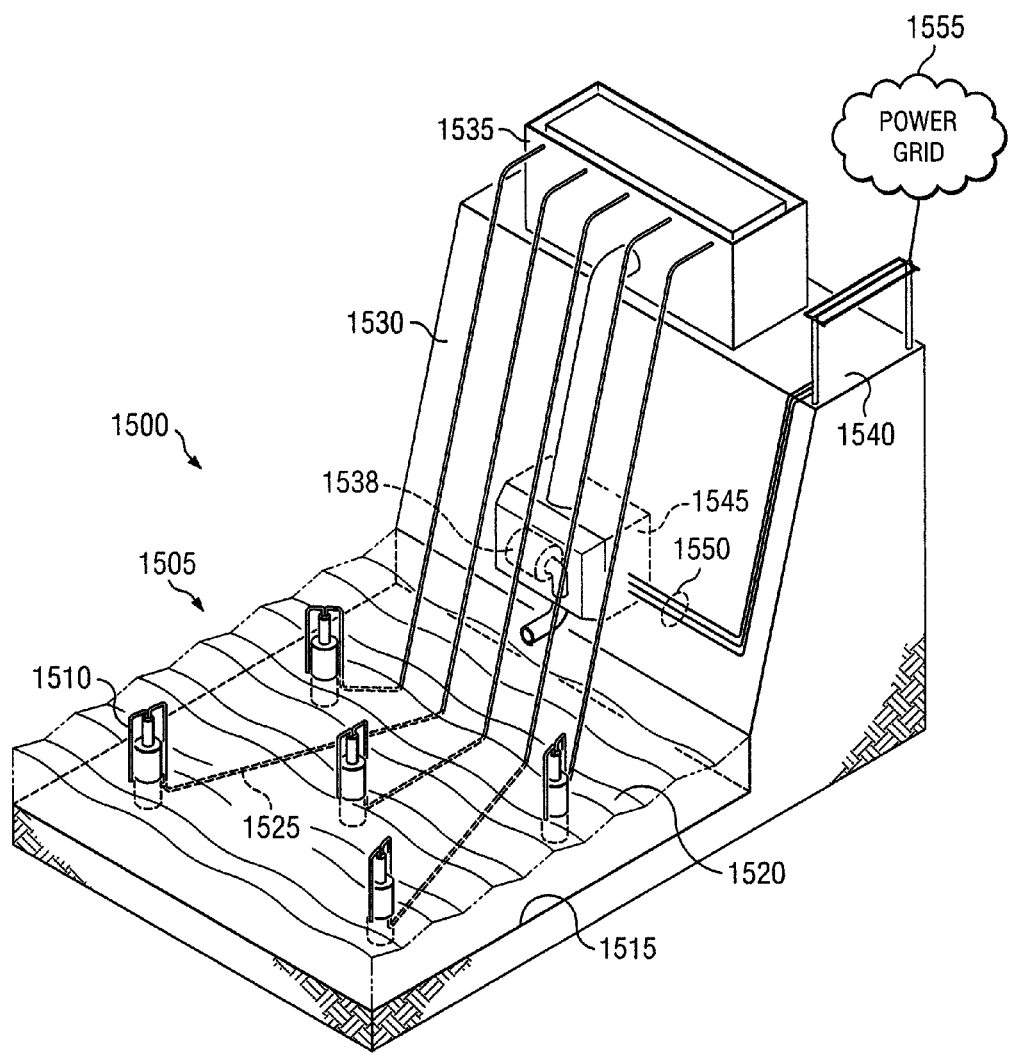
FIG. 15 is an elevated view of a buoyancy pump power system in an alternate embodiment according to the principles of the present invention.

FIG. 15 is an elevated view of another embodiment of an exemplary buoyancy pump power system 1500. The same or similar configuration of a group 1505 of one or more buoyancy pump devices 1510 along a floor 1515 of a body of water 1520 shown in FIG. 14 may be established. The group 1505 of buoyancy pump devices 1510 may be configured in a grid, array, or otherwise distributed in a manner to accommodate each buoyancy pump device 1510 in receiving wave motion with little or no effect due to other buoyancy pump devices 1510.

Outlet lines 1525 from the buoyancy pump devices 1510 may extend along the floor 1515 toward a cliff 1530 that supports one or more reservoirs 1535 on a cliff top 1540. Alternatively, the reservoir(s) 1535 may be constructed into the cliff top 1540 as one or more in-ground pools or ponds. The outlet lines 1525 operate as water feeds that deliver water at or near the top of the reservoir 1535. In one embodiment, the reservoir(s) 1535 may be formed to provide secondary uses. One such secondary use is a fish hatchery. The reservoir 1535 operates to store the water pumped from the buoyancy pump devices 1510 to operate one or more turbines 1538 located in a turbine house 1545 located at or near the bottom of cliff 1530 to provide for maximum water pressure to be applied to the turbine(s) 1538 as a function of gravity. Alternatively, the turbine house 1545 may be located in other locations so long as it is below the reservoir and capable of driving the turbine(s) 1538. As understood in the art, different turbines operate on different water pressures so that the height of the cliff and/or the distance of the turbines below the reservoir 1535 may be based on the type of turbine being utilized. Electricity generated by the turbines 1538 may be conducted onto power lines 1550 for distribution onto a power grid 1555.

Figure 16:
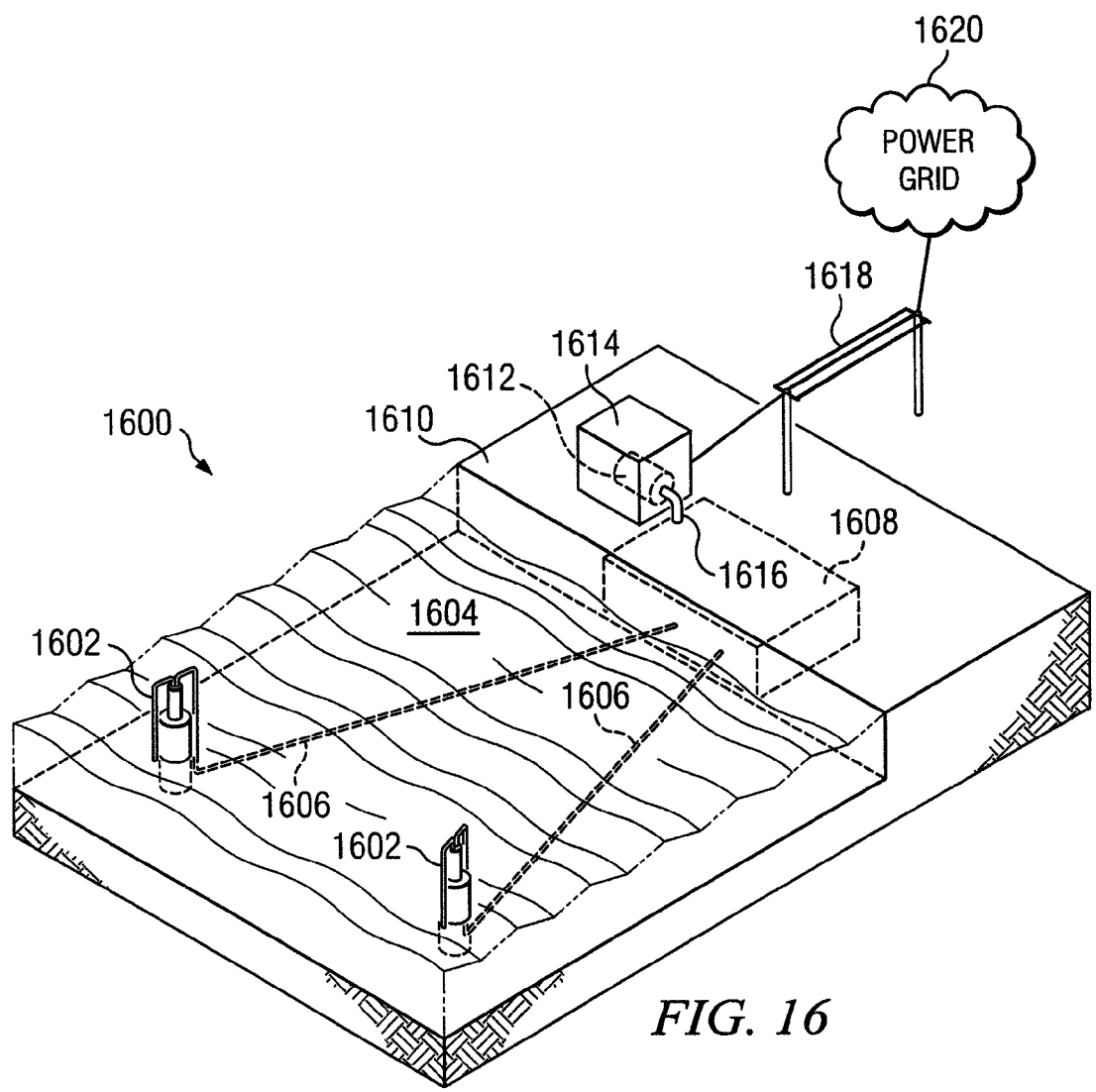
FIG. 16 is an elevated view of yet another buoyancy pump power system in an alternate embodiment.

FIG. 16 is an illustration of another exemplary configuration of buoyancy pump devices 1602 located in a body of water 1604 for converting wave energy into mechanical energy. The buoyancy pump devices 1602 are configured to drive a gas, such as air, through outlet lines 1606 in response to buoyancy blocks (not shown) of the buoyancy pump devices 1602 being moved by waves. A reservoir 1608 may be located on top of a shore 1610 or underground on the shore 1610 as the gas may be compressed and does not need to be elevated to drive a turbine 1612 contained in a turbine house 1614. The turbine 1612 may be connected to the reservoir 1608 via input feed lines 1616 to receive the compressed gas to drive the turbine 1612. The turbine is connected to power lines 1618 to distribute the electricity generated by the turbine 1612 to a power grid 1620 or other drain, such as a factory.

Figure 17A:
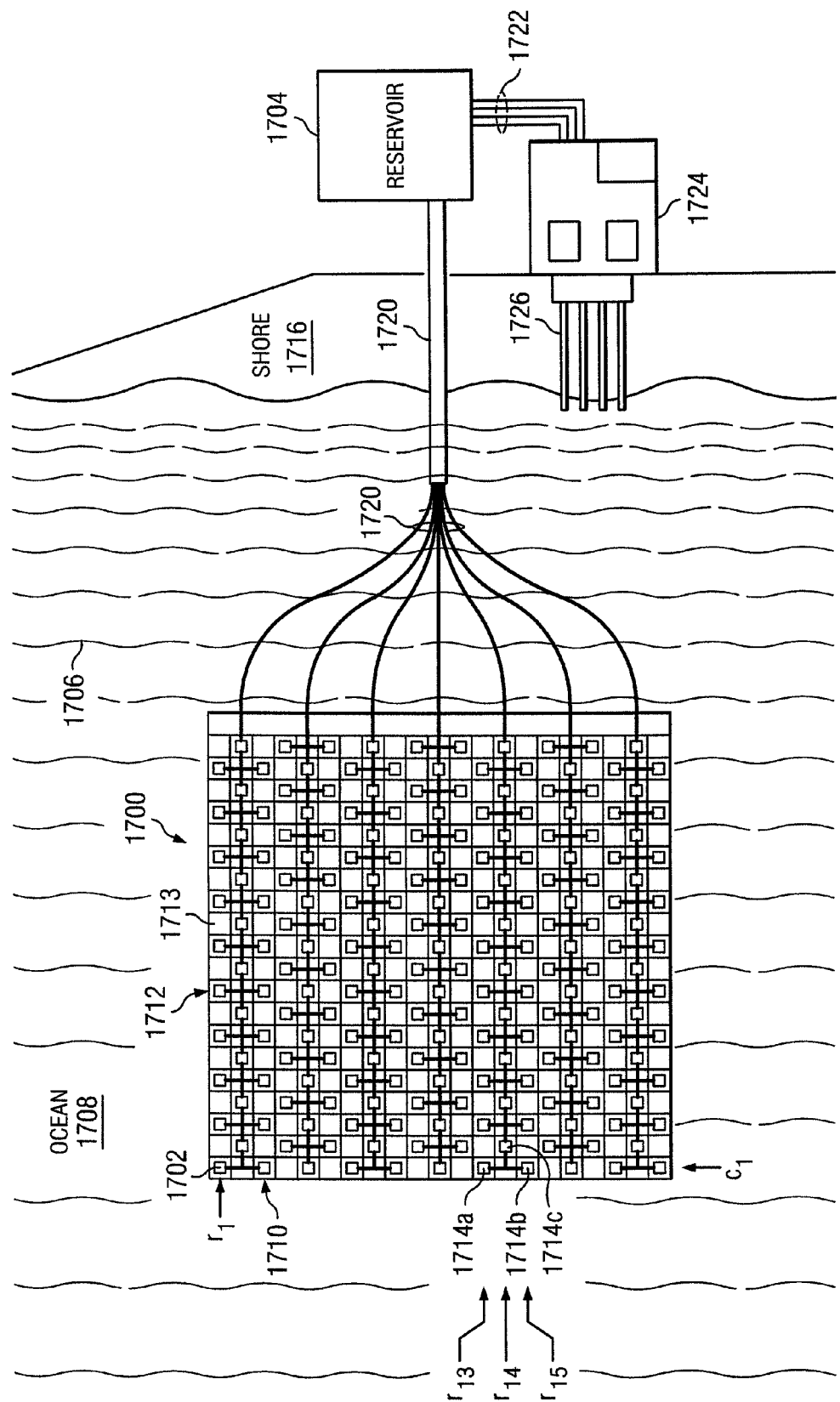
FIG. 17A is an illustration of an exemplary pump field 1700 that includes of buoyancy pump devices configured to drive fluid to a reservoir in response to waves in an ocean.

FIG. 17A is an illustration of an exemplary pump field 1700 that includes of buoyancy pump devices 1702 configured to drive fluid to a reservoir 1704 in response to waves 1706 in an ocean 1708. The pump field 1700 is configured as a grid of buoyancy pump devices 1702 including rows 1710 and columns 1712 of plots 1713 for the buoyancy pump devices 1702 to be located. An empty plot along a column separates or spaces two buoyancy pump devices 1702 along each row. Similarly, an empty plot along a row separates two buoyancy pump devices 1702 along each column. By separating or spacing the buoyancy pump devices 1702 as shown, a wave that passes across a first column $c_1$ and between two buoyancy pump devices 1714a and 1714b re-forms prior to a buoyancy pump device 1714c at a second column $c_2$ and along row $r_{14}$ perpendicularly located between rows $r_{13}$ and $r_{15}$ the two buoyancy pump devices 1714a and 1714b, thereby allowing the buoyancy pump device 1714c in the second column $c_2$ to receive substantially the same wave energy that was received by the buoyancy pump devices 1714a and 1714b in the first column $c_1$. The separation of the buoyancy pump devices 1702 further helps to minimize the amount of energy that is drained from each wave. By minimizing the amount of energy that is drained from the wave, each buoyancy pump device 1702 located in the pump field 1700 is powered substantially equally. It should be understood that other configurations of the buoyancy pump devices 1702 that provides the same or similar minimal alteration to the wave to provide maximum wave energy to each pump may be utilized. By using the configuration of the pump field 1700 of FIG. 17, the beach 1714 receives each wave substantially the same as would have been received had the pump field 1700 not been located in front of the beach 1714. The configuration of the pump field 1700, therefore, is an environmentally friendly solution in generating power from waves.

Figure 17B:
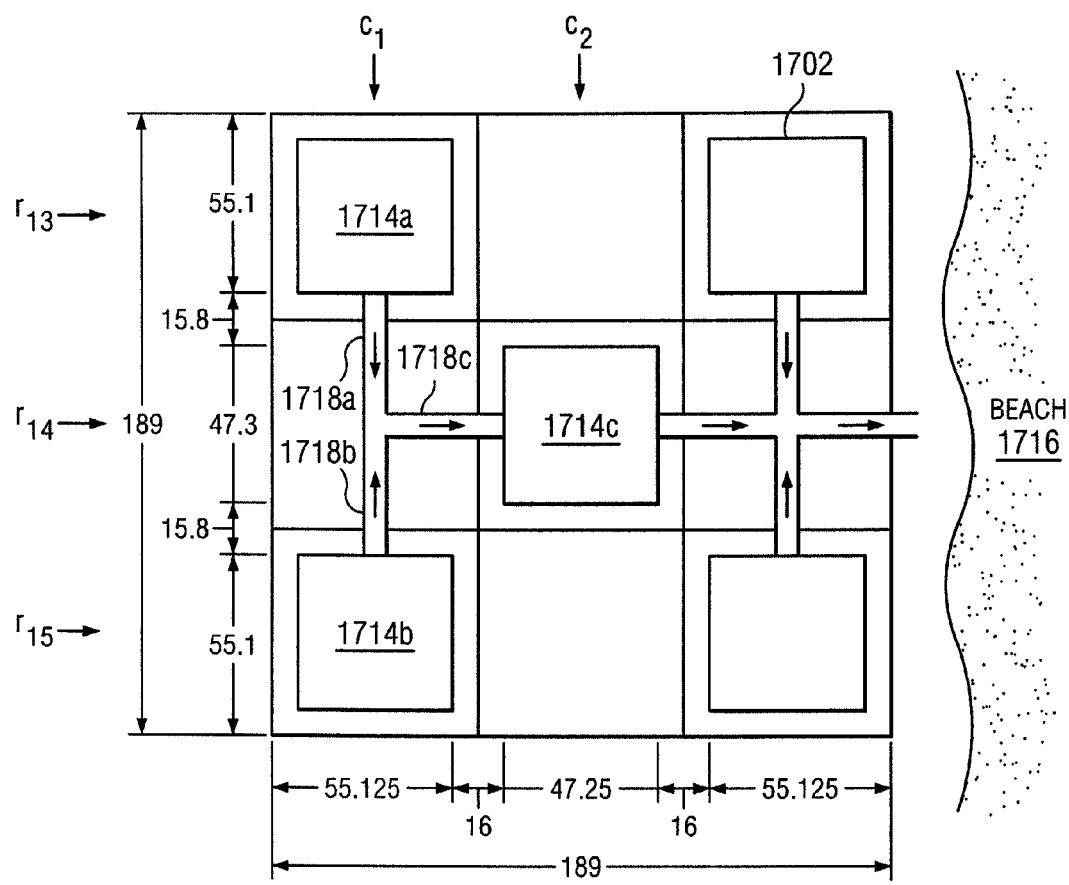
FIG. 17B is an enlarged view of the configuration of the buoyancy pump devices, including specific buoyancy pump devices.

FIG. 17B is an enlarged view of the configuration of the buoyancy pump devices 1702, including specific buoyancy pump devices 1714a-1714c. Outlet lines 1718a and 1718b of buoyancy pump devices 1714a and 1714b, respectively, are configured to extend from each buoyancy pump device 1714a and 1714b along a first column $c_1$ toward row $r_{14}$ containing the buoyancy pump device 1714c. The outlet lines 1718a and 1718b are coupled to another outlet line 1718c that extends along row $r_{14}$ toward the beach (1716). Accordingly, an outlet line (not shown) from the buoyancy pump 1714c may connect to the outlet line 1718c. In addition, outlet lines from other buoyancy pumps 1702 located in rows $r_{13}$-$r_{15}$ may connect to the outlet line 1718c to deliver fluid matter (i.e., liquid or gas) exhausted from the buoyancy pump devices 1702 to a reservoir (not shown) located on the land or otherwise. It should be understood that other configurations of the outlet lines may be utilized for the fluid matter to be delivered to the reservoir. The other configurations may be structurally or geometrically different. For example, rather than connecting the outlet lines 1718a and 1718b to a single outlet line 1718c, each outlet line 1718a and 1718b may remain separate from each other.

Continuing with FIG. 17B, exemplary configuration dimensions are shown for the pump grid. Each buoyancy pump device 1702 has a base dimension of 47.3 square feet. A separation distance of 15.8 feet between each row (e.g., rows $r_1$ and $r_2$) of the buoyancy pump devices 1702 is used.

With further reference to FIG. 17A, the reservoir 1704 located on a cliff top 1718 receives water pumped from the buoyancy pump devices 1702 via outlet lines 1720. The water may be stored in the reservoir 1704 and flowed through output feed lines 1722 to turbine(s) (not shown) located in a turbine building 1724. The water may be discharged back into the ocean 1708 via discharge lines 1726. In another embodiment, the reservoir may be located above a body of water, such as on a boat or an oil-drilling rig.

It is to be appreciated that the buoyancy pump system may be designed to completely absorb almost all potential energy from a passing wave and use that power in the manner described and shown herein. Alternatively, the buoyancy pump system may be designed to absorb a portion (e.g., 50 percent) of potential energy from a passing wave. These designs may utilize the grid or other arrangements for the pump field, but include buoyancy pump devices in some or all empty plots based on the arrangement.

Referring to FIG. 18, a buoyancy pump system 1811 according to the principles of the present invention includes at least one buoyancy pump 1813 having a buoyancy block 1815 that reciprocates in response to wave motion. The buoyancy block 1815 pumps an operating fluid, preferably using a piston and piston shaft similar to the systems previously described. The operating fluid, preferably water, is pumped from offshore at the location of the buoyancy pump 1813 to one of a low reservoir 1821 and a high reservoir 1823. Preferably, the reservoirs are located on-shore but could be positioned off-shore on an existing or new platform. The low reservoir 1821 is provided to receive water pumped during normal operating conditions of the buoyancy pump 1813. Normal operating conditions typically occur during the presence of normal sized wave heights, or those in which the buoyancy pump was primarily designed to operate. When waves of larger height are present, the buoyancy pump can take advantage of the larger wave heights to generate higher pressures in the operating fluid, thereby pumping the operating fluid into the high reservoir 1823. To pump the operating fluid at the higher pressure (i.e. higher than during the normal operating conditions), the inner volume of the buoyancy block must be increased by a "warp" process. The warp process involves either increasing the height or diameter of the buoyancy block through one of the processes previously described (see FIGS. 3D-3F). In the presence of larger waves, the increased volume of the buoyancy block is able to increase the pressure imparted to the operating fluid, while maintaining approximately the same flow rate as the flow rate produced during normal operating conditions. It is important to take advantage of the presence of higher wave heights because an operating fluid stored in a reservoir at a higher elevation (i.e. the high reservoir 1823) can be used to more efficiently generate electricity. This is due primarily to the fact that a turbine 1831, which is driven by the operating fluid dropped from the reservoir, operates more efficiently when driven by high pressure, low flow rate fluid as opposed to low pressure, high flow rate fluid. While the concept of using multiple reservoirs for storage of the operating fluid has been described above with reference to two reservoirs of differing heights, a person of ordinary skill in the art will recognize that the concept could be expanded to include a multitude of reservoirs, each of which would be designed to ideally receive operating fluid when waves of a certain height are present and when the buoyancy block is adjusted (via warp) to a particular volume.

Figure 19:
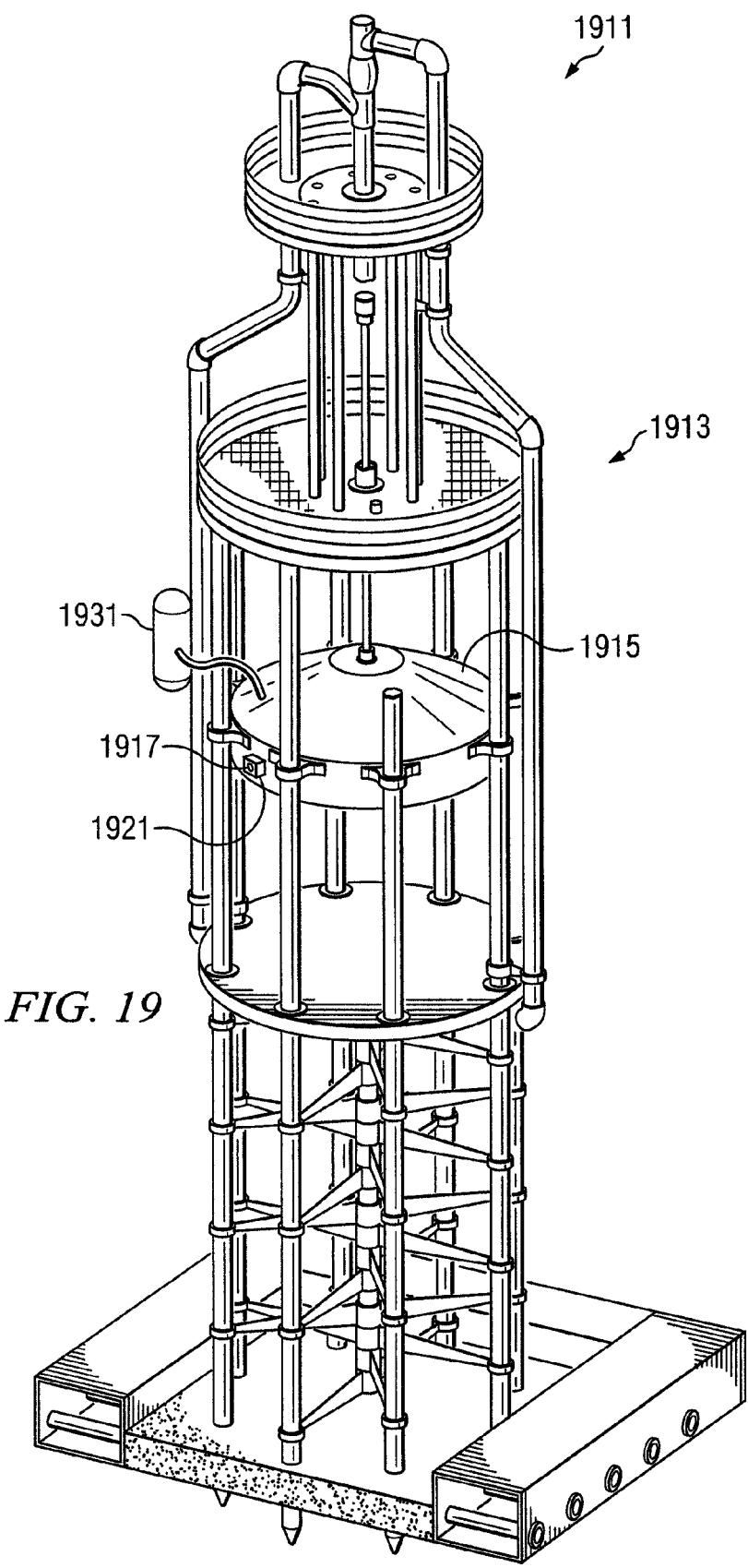
FIG. 19 is a perspective view of a buoyancy pump according to an embodiment of the present invention.

Referring to FIG. 19, a buoyancy pump system 1911 according to the principles of the present invention includes at least one buoyancy pump 1913 having a buoyancy block 1915 that reciprocates in response to wave motion. Because of the potential of large storms and hurricanes in areas where buoyancy pumps are used, the buoyancy pump could be at risk of becoming dislodged from the ocean floor if wave heights become excessively high. To minimize this risk, buoyancy block 1915 includes a relief port 1917 that allows the buoyancy block 1915 to be selectively flooded. While flooded, the buoyancy block would not exert any buoyancy forces on the piston or the rest of the buoyancy pump 1913 (or if partially flooded, would exert less buoyancy force), which would prevent the buoyancy pump from becoming dislodged from the ocean floor. The relief port 1917 could be opened by a valve 1921 and a controller (not shown) as shown in FIG. 19. The signal to open the valve 1921 could either be provided manually, remotely, or automatically in response to a sensor that measures wave height, water pressure adjacent the buoyancy block, or the buoyancy force exerted by the buoyancy block. Instead of using a valve to open and close the relief port 1917, the relief port 1917 could by sealed by a stopper that is tethered to a stationary structure, such as the buoyancy pump pilings or the ocean floor. The tether would be a predetermined length such that excessive movement of the buoyancy block within the buoyancy chamber (e.g. in response to a large wave) would cause the tether to dislodge the stopper from the relief port 1917, thereby flooding the buoyancy block. In addition to the relief port 1917, the buoyancy pump 1913 may include a pressurized gas source 1931 to purge the buoyancy block following flooding operations. The pressurized gas would displace the water in the buoyancy block, thereby allowing the buoyancy pump to return to normal operations.

The buoyancy pumps according to the principles of the present invention include buoyancy blocks that primarily are designed to "match" the average lengths of waves in the area at which the buoyancy pump operates. Preferably, the buoyancy block is sized such that it is large enough relative to the wave length to produce significant buoyancy forces for pumping operating fluid, yet small enough to be able to capture the energy of a wave without the presence of adjacent waves significantly reducing the process of capturing that energy. Preferably, the diameter of the buoyancy block is greater than or equal to approximately ⅙ of the average wave length and less than or equal to approximately ½ of the average length. Although typically not preferred, the buoyancy block could be designed such that the diameter of the buoyancy block is as large as the average wave length.

It is also important to note that the buoyancy block according to the principles of the present invention is preferably designed such that approximately ⅓ of the volume of the buoyancy block remains out of the water as the buoyancy block reaches a maximum height while rising on the average wave. If the buoyancy block were to become completely submerged during each upstroke, the ability of the block to quickly track the motion of the wave (and thereby pump operating fluid) would be significantly diminished. By allowing a significant portion of the buoyancy block to remain out of the water, the buoyancy block quickly tracks the motion of each wave and more efficiently pumps the operating fluid. Of course, the volume of the buoyancy block riding out of the water will vary throughout the upstroke, and the precise volume out of the water at the maximum point of the upstroke could be higher or lower than ⅓ of the total volume.

Figure 20:
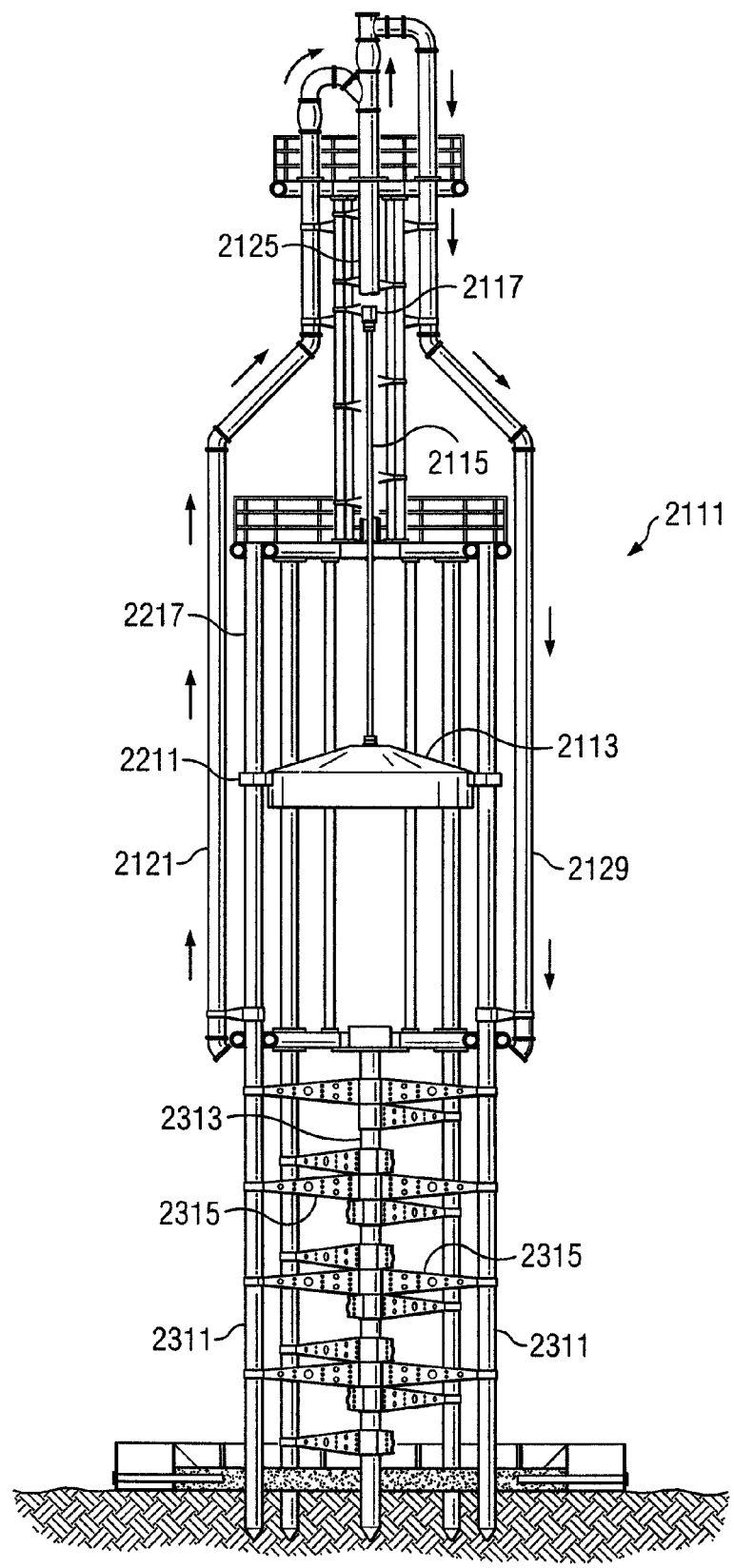
FIG. 20 illustrates a partial cutaway, front view of a buoyancy pump according to an embodiment of the present invention, the pump being shown with selected guide posts omitted to more clearly illustrate a buoyancy block of the buoyancy pump, the pump further being shown with a portion of the piston chamber omitted to more clearly illustrate a piston shaft and piston.
Figure 21:
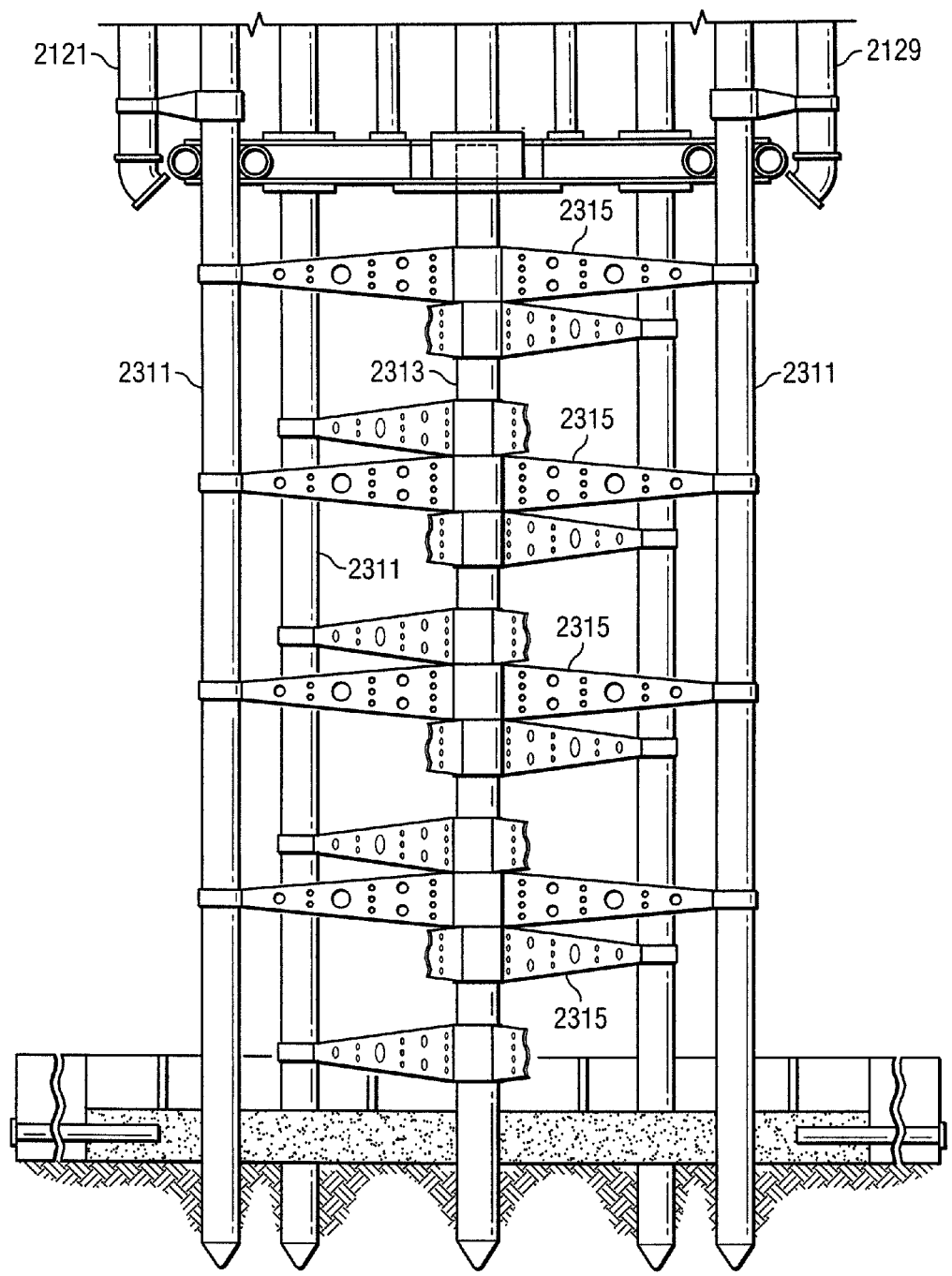
FIG. 21 illustrates an enlarged front view of a lower portion of the buoyancy pump of FIG. 20, illustrating pilings and struts used to support the buoyancy pump.
Figure 24A:
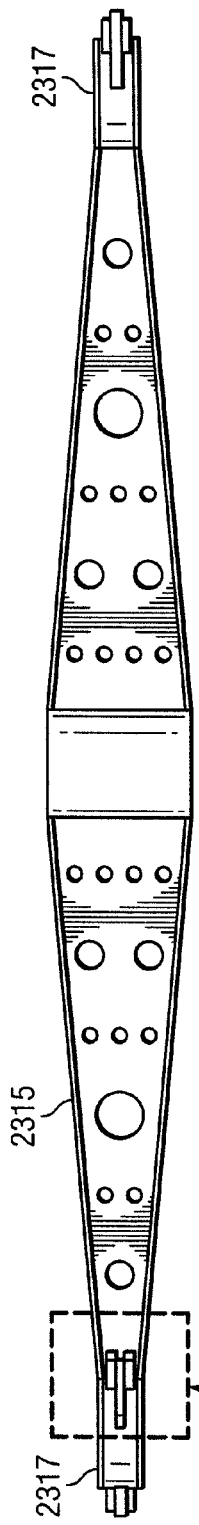
FIGS. 24A, 24B, and 24C illustrate front, top, and detailed front views, respectively, of a strut assembly, including struts of FIG. 21 and sleeves of FIG. 22A.
Figure 24B:
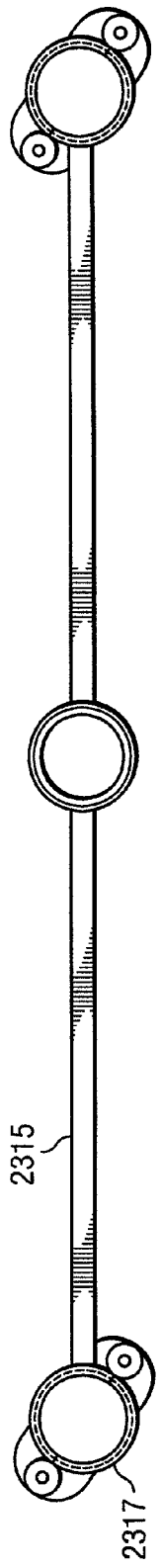
Figure 24C:
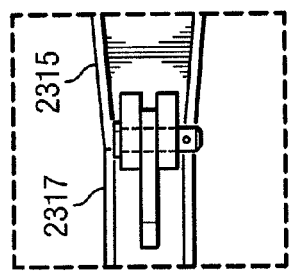
Figure 25:
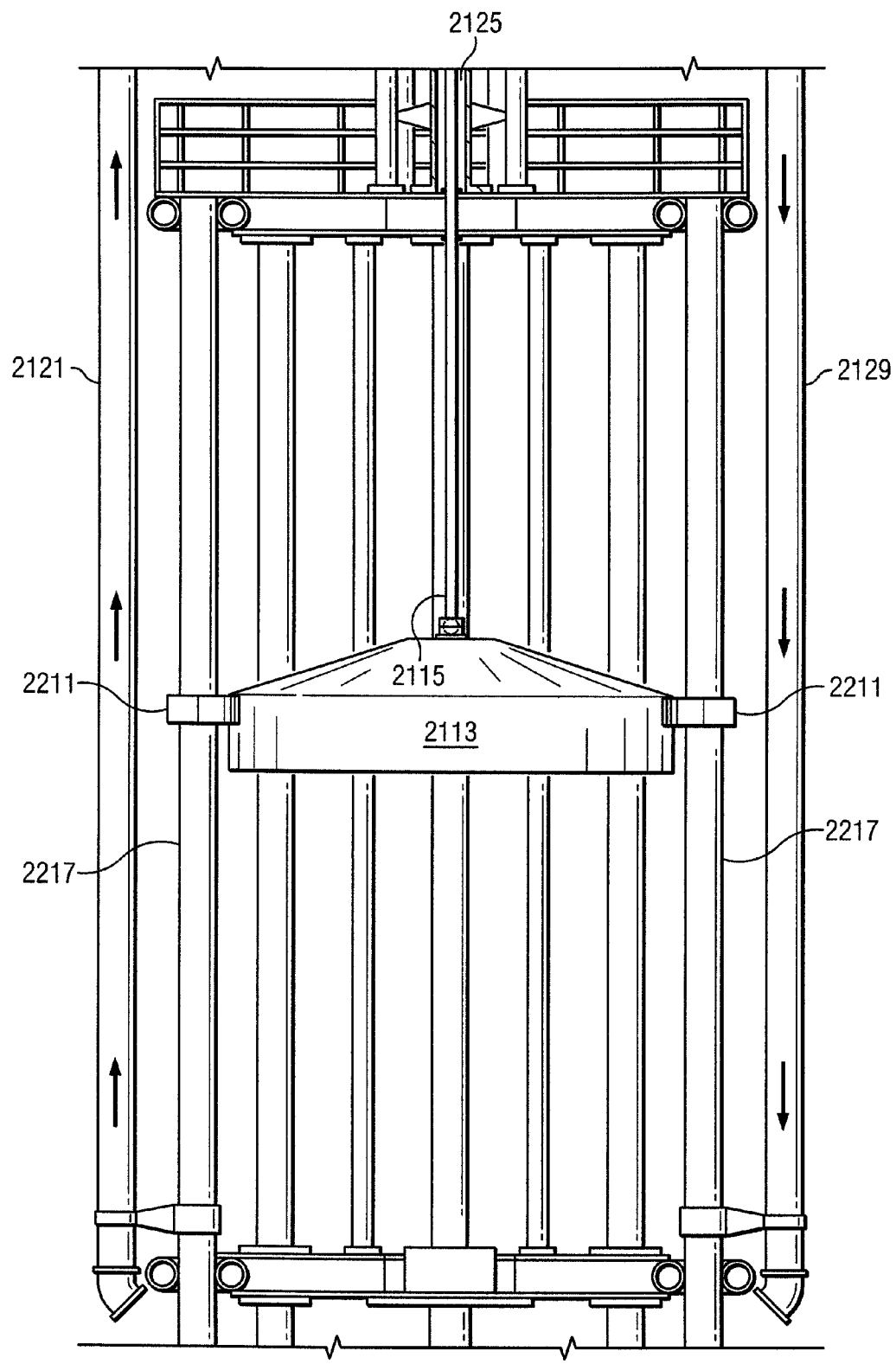
FIG. 25 illustrates an enlarged front view of a portion of the buoyancy pump of FIG. 20, illustrating the buoyancy block and piston shaft.
Figure 28:
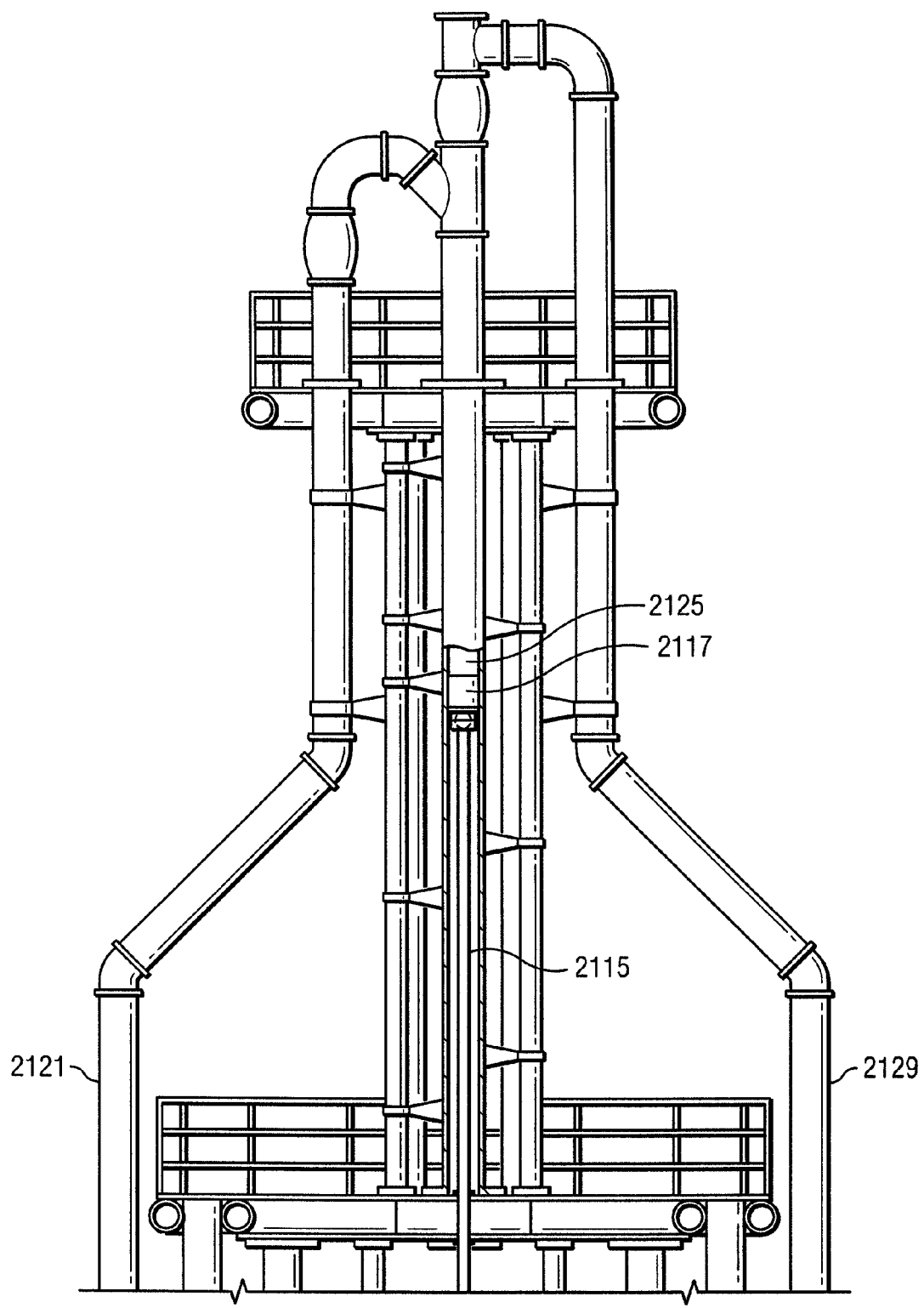
FIG. 28 illustrates an enlarged front view of a portion of the buoyancy pump of FIG. 20, illustrating the piston chamber, piston, and piston shaft.
Figure 29:
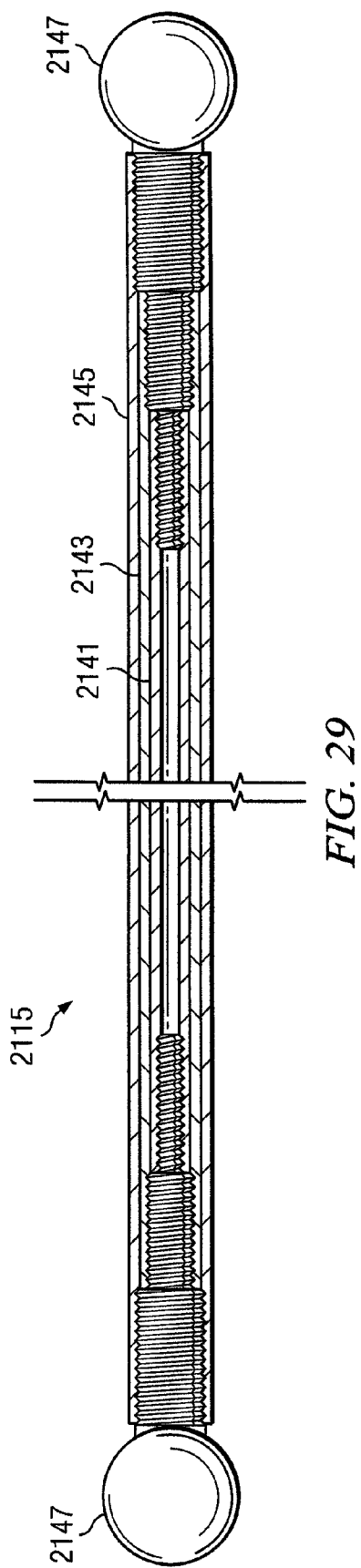
FIG. 29 illustrates a front view of the piston shaft of FIG. 20, including a plurality of nested tubes and a ball fitting connected at each end of the piston shaft to the tubes.
Figure 35A:
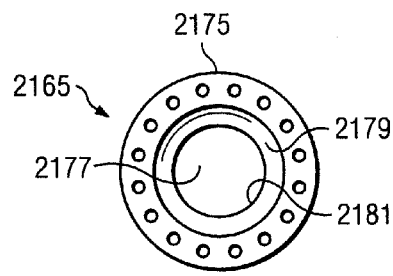
FIGS. 35A, 35B, and 35C illustrate top, front, and bottom views, respectively, of a locking portion of the ball joint of FIG. 27.
Figure 35C:
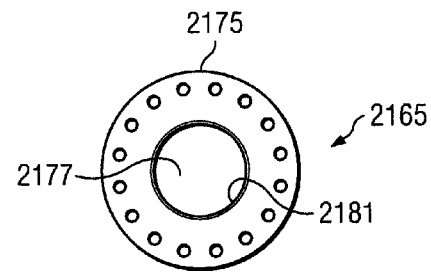
Figure 35B:
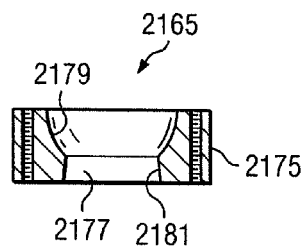

An exemplary buoyancy pump 2111 according to the principles of the present invention is shown in FIGS. 20-38. All dimensions shown in relation to these figures are for exemplary purposes only and are not intended to limit the scope of the appended claims. An assembly view of the buoyancy pump 2111 is illustrated in FIG. 20, and the pump 2111 includes a buoyancy block 2113 connected by a piston shaft 2115 to a piston 2117. The buoyancy block 2111 reciprocates in response to wave action to reciprocally drive the piston 2117 such that an operating fluid is drawn through an intake pipe 2121 and into a piston chamber 2125 on a downward stroke of the piston 2117. On an upward stroke of the piston 2117, the operating fluid is expelled from the piston chamber 2125 and into an outlet pipe 2129.

Referring to FIGS. 25 through 35, the piston shaft 2115 is illustrated in more detail. Piston shaft 2115 includes a plurality of nested tubes 2141, 2143, 2145 connected at each end to a ball fitting 2147. Tube 2141 is smallest in diameter and nests within tube 2143, which in turn nests within tube 2145. Each of the tubes includes internal threads on each end to threadingly receive the ball fitting 2147. The ball fitting 2147 includes a tiered, shaft 2149 comprised of a minor portion 2151, an intermediate portion 2153, and a major portion 2155. The major portion 2155 is rigidly attached to a ball end 2159. Each of the minor portion 2151, the intermediate portion 2153, and the major portion 2155 includes external threads. When the piston shaft 2115 is assembled, one of the ball fittings 2147 is attached to the tubes 2141, 2143, 2145 at each end such that the minor portion 2155 threadingly engages tube 2141, intermediate portion 2153 threadingly engages tube 2143, and major portion 2155 threadingly engages tube 2145. The ball fittings 2147 assist in securing the tubes relative to one another and ensure that the loads imparted to the piston shaft 2115 are distributed to all of the individual tubes 2141, 2143, 2145. The ball end 2159 of the ball fitting 2147 is received by a ball joint 2165. A first ball joint is connected to the buoyancy block, while a second ball joint is connected to the piston. The ball joint 2165 includes a cap portion 2167 having a semi-spherical recess 2169 for receiving the ball end 2159. A locking portion 2175 of the ball joint 2165 is connected to the cap portion 2167 to secure the ball end 2159 within the ball joint 2165. The locking portion 2175 includes a passage 2177 having a partially spherical shoulder region 2179 adjacent to a tapered region 2181. The spherical shoulder region 2179 serves to lock the ball end 2159 within the semi-spherical recess 2169. The tapered region 2181 is tapered outward as it extends from the spherical shoulder region 2179. The tapered region allows the piston shaft 2115 to rotate about the ball end 2159 relative to the ball joint 2165 such that slight angular movements of the buoyancy block within the buoyancy chamber do not impart significant torsional or bending forces to the piston shaft 2115. The primary angular movements of the buoyancy block 2113 against which the ball joint 2165 protects are those angular movements about axes perpendicular to the reciprocating motion of the buoyancy block 2113.

Figure 37A:
Figure 37B:
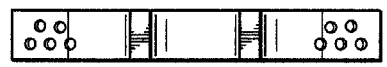
Figure 36A:
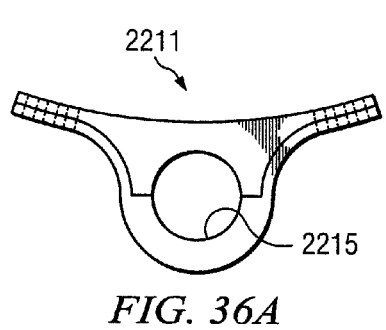
FIGS. 36A and 36B illustrate top and front views, respectively, of a slide mount used to guide the buoyancy block of FIG. 20 as it reciprocates within the buoyancy chamber.
Figure 38A:
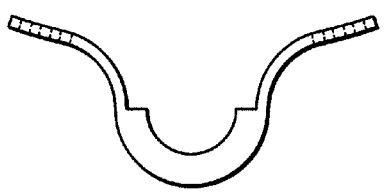
FIGS. 38A and 38B illustrate top and front views, respectively, of another portion of the slide mount.
Figure 36B:
Figure 38B:
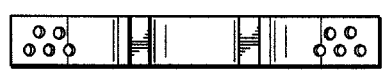
Figure 39:
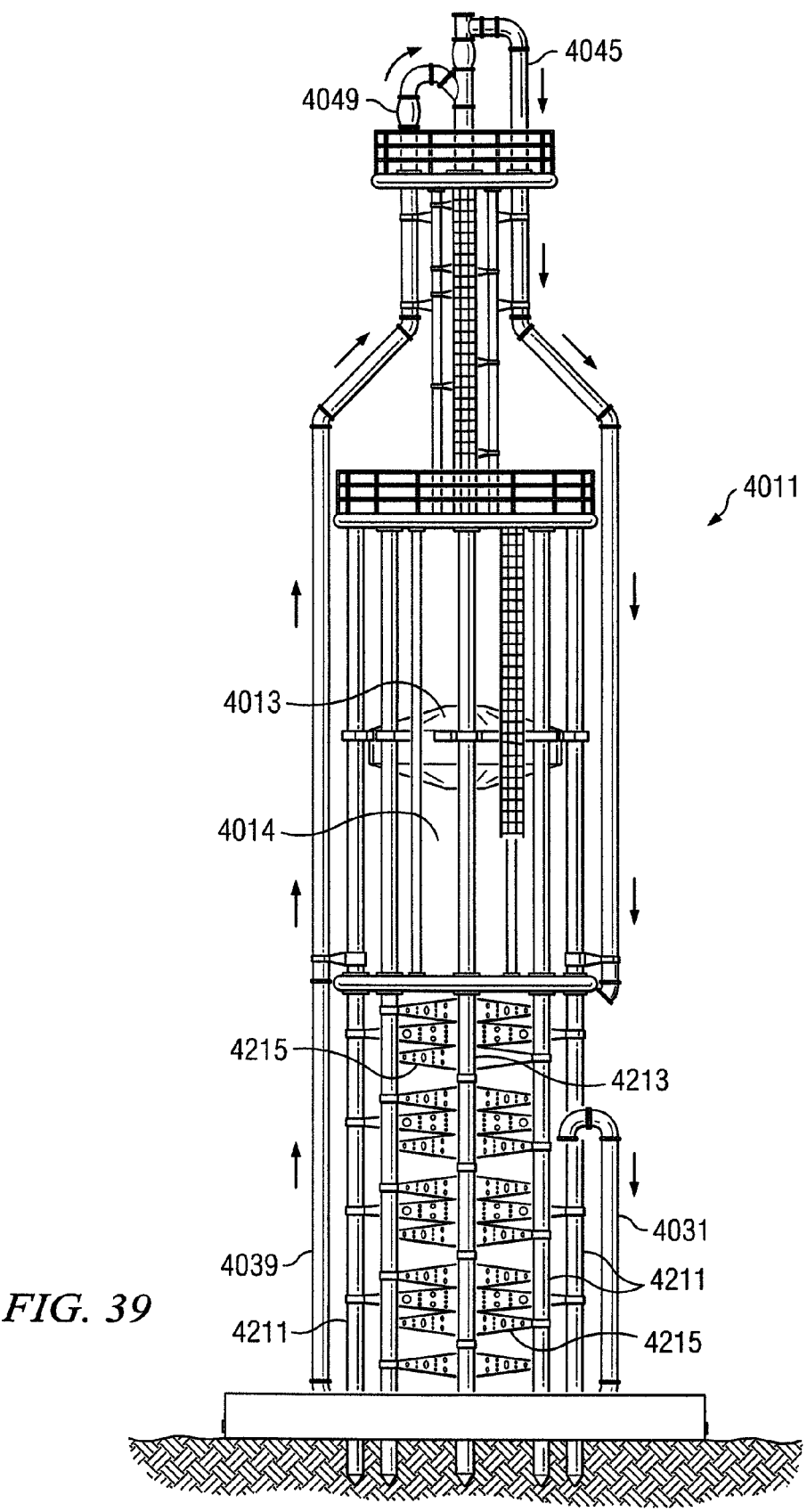
FIG. 39 illustrates a front view of a buoyancy pump according to an embodiment of the present invention.
Figure 40:
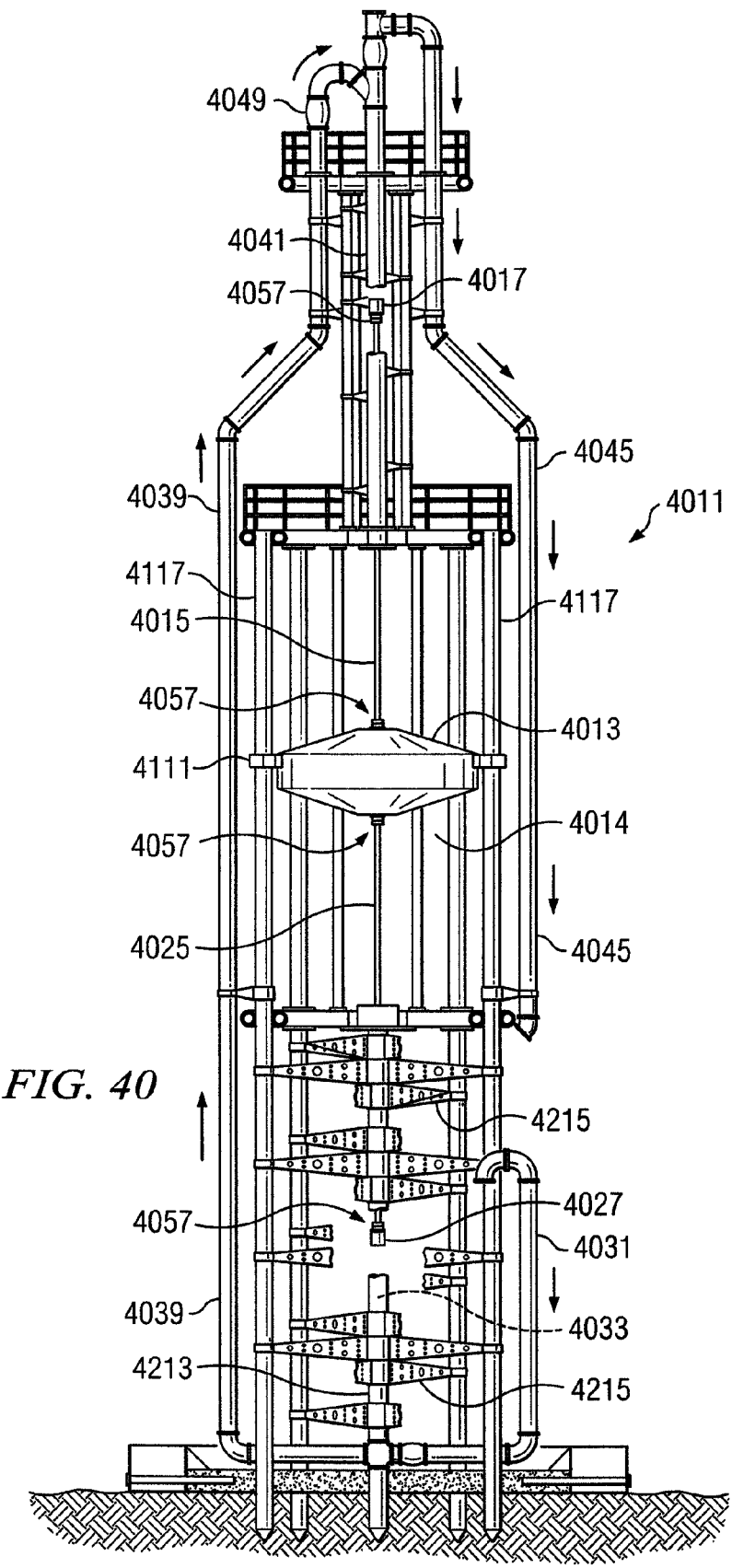
FIG. 40 illustrates a partial cutaway front view of the buoyancy pump of FIG. 39, the buoyancy pump having a buoyancy block, an upper piston shaft and piston, and a lower piston shaft and piston.
Figure 41:
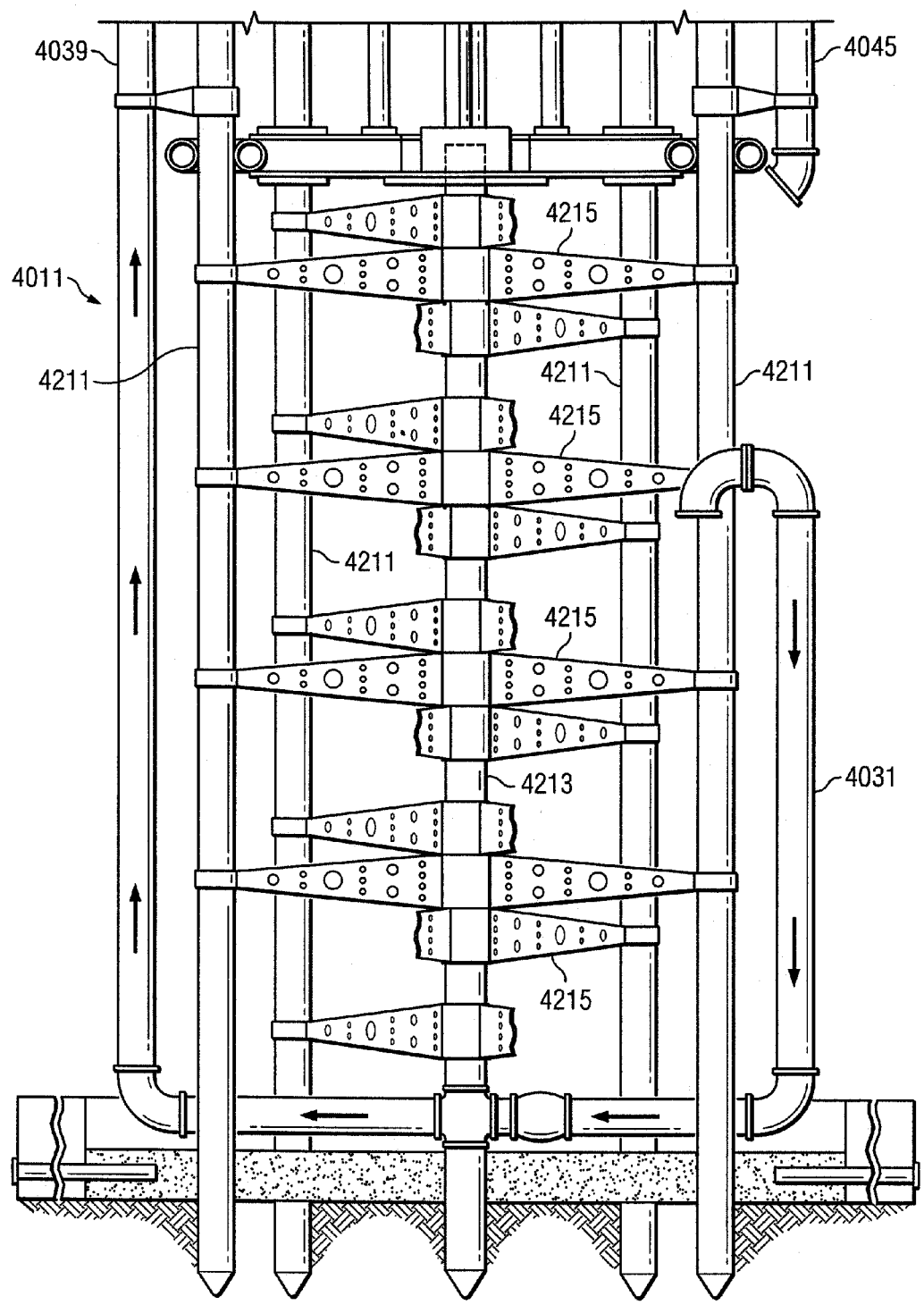
FIG. 41 illustrates an enlarged front view of a lower portion of the buoyancy pump of FIG. 40, illustrating pilings and struts used to support the buoyancy pump.
Figure 42:
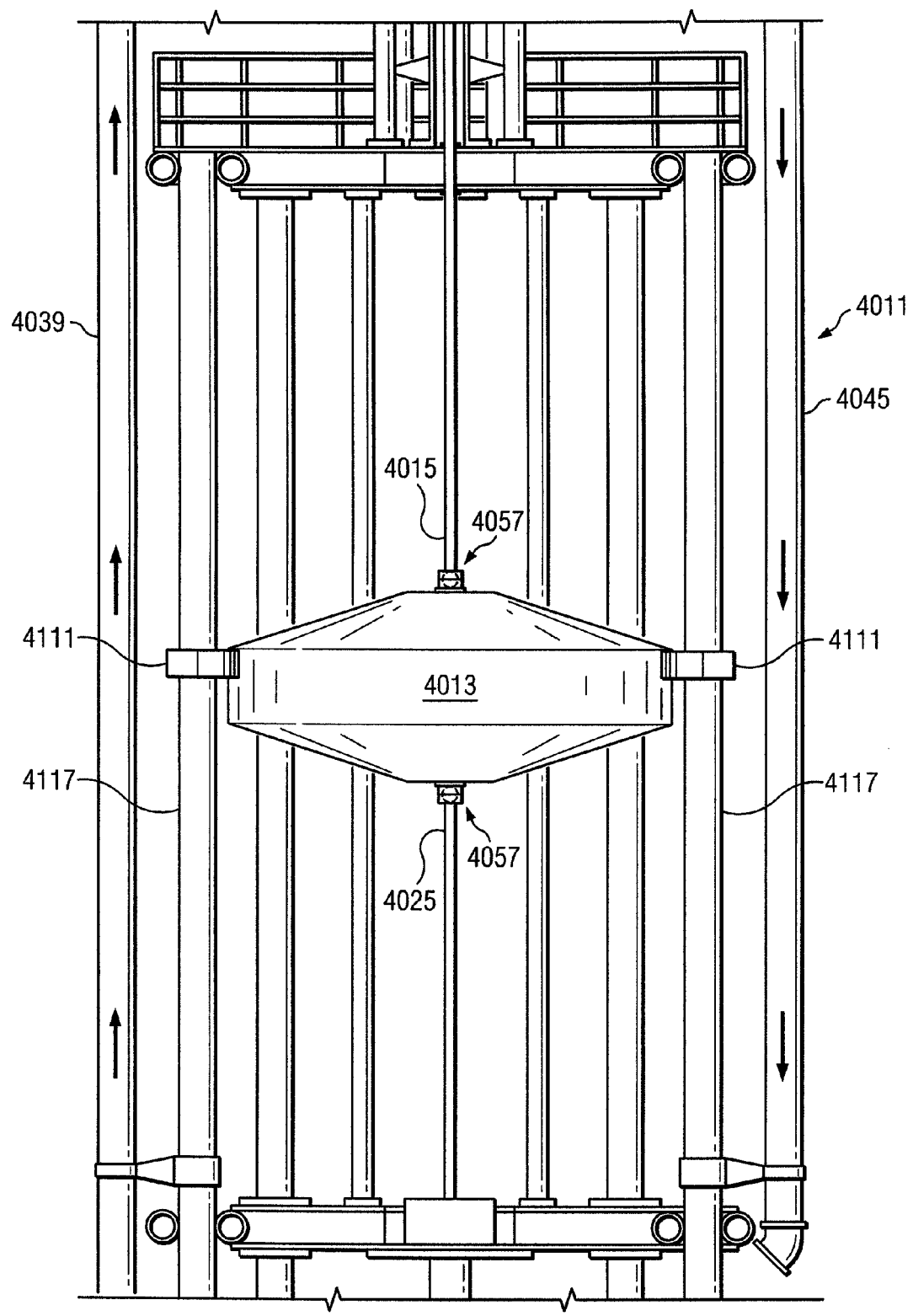
FIG. 42 illustrates an enlarged front view of a portion of the buoyancy pump of FIG. 40 showing the buoyancy block, upper piston shaft, and lower piston shaft.
Figure 43:
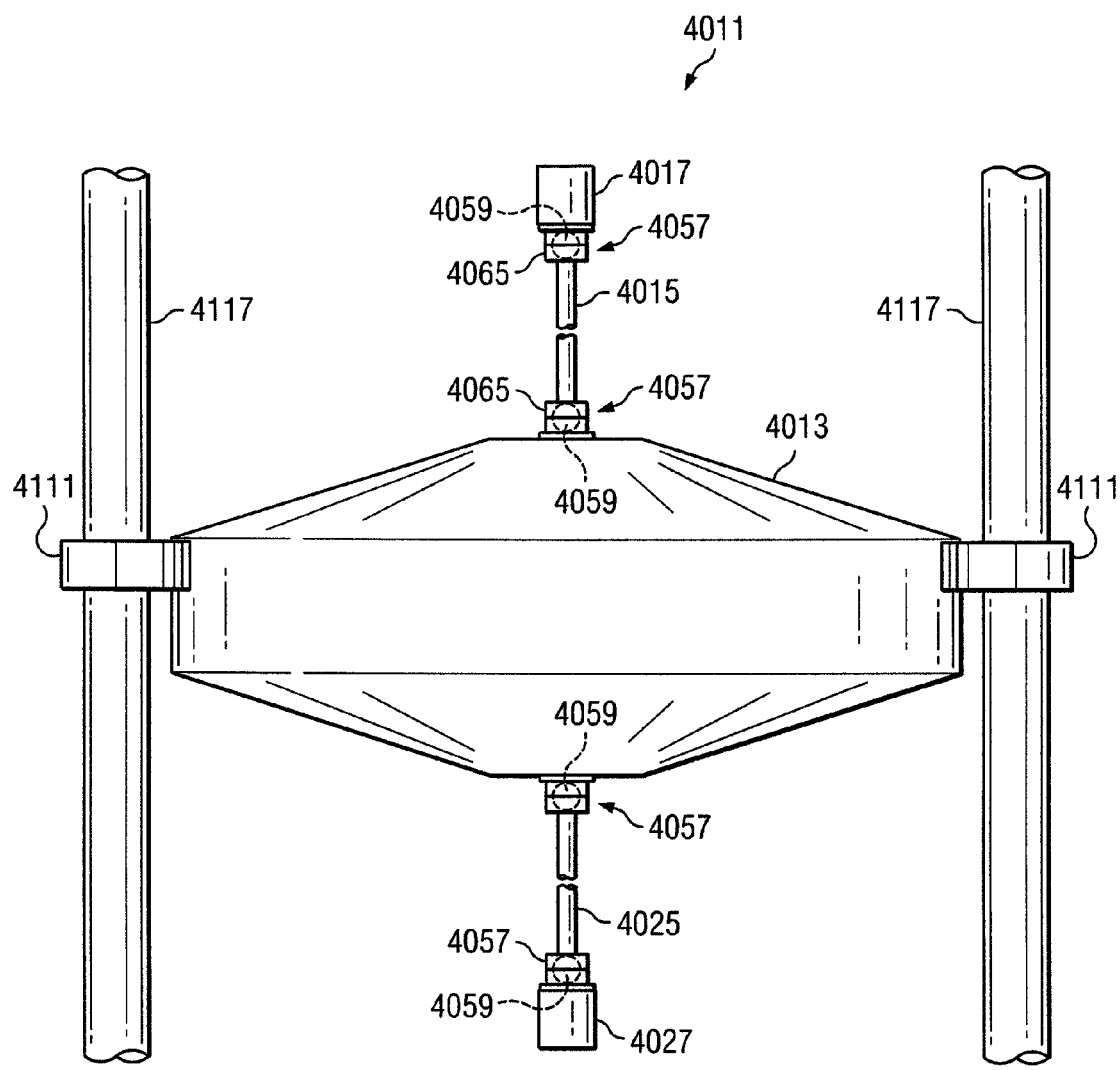
FIG. 43 illustrates a front view of the buoyancy block, upper piston shaft, upper piston, lower piston shaft, and lower piston of FIG. 40.

Referring to FIGS. 36 through 38 and FIG. 26, the angular movements of the buoyancy block 2113 described above are minimized by the presence of at least one slide mount 2211 attached to an exterior surface of the buoyancy block 2113. The slide mount 2211 includes a guide passage 2215 that is oriented to receive a guide post 2217 positioned around the perimeter of the buoyancy chamber. The slide mount 2211 assists in guiding the buoyancy block 2113 as it reciprocates within the buoyancy chamber. Preferably, the slide mount 2211 is comprised of two separate portions as illustrated in FIGS. 37 and 38 to facilitate easier installation. Preferably, the guide passage 2215 is lined with a polymer material to reduce the friction between the slide mount 2211 and the guide post 2217.

Referring to FIGS. 20 through 24, the buoyancy pump 2111 is anchored using a plurality of pilings that structurally support the various platforms, piston chamber, conduit, and other systems of the buoyancy pump 2111. Preferably, the buoyancy pump 2111 includes eight pilings (perimeter pilings 2311) that are spaced equally apart in a circular pattern, and an additional center piling 2313 located at the center of the circular pattern. Since the length of the pilings is relatively long, and since the pilings are subjected to forces from the pump operation, the ocean currents, the ocean tide, and wave action, a plurality of wing struts 2315 are connected between each perimeter piling 2311 and the center piling 2313. Each of the wing struts 2315 includes a sleeve 2317 at each end of the wing strut, and each sleeve receives one piling. Preferably, each sleeve is lined with a polymer to prevent metal-on-metal contact between the wing strut 2315 and the pilings. In addition to preventing excessive movement of the pilings relative to one another (thereby stiffening the pilings), the wing struts 2315 add considerable weight to the buoyancy pump 2111. The weight of the wing struts 2315 greatly assists in anchoring the buoyancy pump 2111, which is especially important when a portable buoyancy pump such as that shown in FIG. 20 is used.

Referring now to FIGS. 39-43, a buoyancy pump 4011 according to the principles of the present invention is illustrated. All dimensions shown in relation to these figures are for exemplary purposes only and are not intended to limit the scope of the appended claims. The pump 4011 includes a buoyancy block 4013 movably positioned within a buoyancy chamber 4014 and connected by an upper piston shaft 4015 to an upper piston 4017 and by a lower piston shaft 4025 to a lower piston 4027. The buoyancy block 4013 reciprocates in response to wave action. As the buoyancy block 4013 rises on a wave, the lower piston 4027 rises, allowing an operating fluid to flood through an intake pipe 4031 and into a lower piston chamber 4033. As the buoyancy block 4013 falls in response to wave motion, the lower piston 4027 is driven by the weight of the buoyancy block 4013 to expel the operating fluid from the lower piston chamber 4033 into a transfer pipe 4039 and subsequently into an upper piston chamber 4041. During this downward stroke of the buoyancy block 4013, the upper piston 4017 moves downward, thereby allowing the operating fluid from the transfer pipe 4039 to enter the upper piston chamber 4041. As the buoyancy block 4013 moves upward again, the upper piston 4017 is driven upward by a buoyancy force to expel the operating fluid from the upper piston chamber 4041 into an outlet pipe 4045. A check valve 4049 prevents the operating fluid from the upper piston chamber 4041 from flowing back through transfer pipe 4039.

The ability of the buoyancy pump 4011 to pump operating fluid via positive pressure on both the upstroke and the downstroke of the buoyancy block 4013 allows efficient operation of the buoyancy pump 4011, especially when the wave conditions for a particular area require a tall buoyancy chamber 4014 and upper piston chamber 4041. For buoyancy pumps having only a single piston, the operating fluid must be drawn (i.e. sucked) into the piston chamber to fill the chamber. The piston in this type of system pulls the operating fluid into the piston chamber by exerting a negative pressure on the operating fluid. Some pump designs may require an excessive amount of negative pressure in order to fill the piston chamber. This is usually caused by having a very tall buoyancy chamber and/or piston chamber located high above the surface of the water in which the buoyancy pump operates. A large negative pressure may cause foaming or boiling of the operating fluid, which significantly decreases the ability of the buoyancy pump to fill the piston chamber.

For the buoyancy pump 4011 illustrated in FIGS. 39-43, the preferred operating fluid is water, and the size and location of the piston chamber may require a 60 foot suction head to fill the piston chamber, which would likely cause the water to foam or boil. To prevent boiling, the buoyancy pump 4011 of the present invention uses positive pressure to push the operating fluid into the upper piston chamber 4041, as opposed to using negative pressure to draw the operating fluid into the upper piston chamber 4041. The positive pressure is generated by the downward stroke of the lower piston 4027, which is driven by the weight of the buoyancy block 4013. For this reason, the buoyancy block 4013 may be designed to be heavier than a buoyancy block that is linked only to a single piston. Of course, if the buoyancy block 4013 is heavier, it is also advantageous to increase the displacement volume of the buoyancy block 4013 to support the extra weight while riding in the water.

The upper and lower piston shafts 4015, 4025 include a plurality of nested tubes connected at each end to a ball fitting 4057. Each of the tubes includes internal threads on each end to threadingly receive the ball fitting 4057. The ball fitting 4057 includes a tiered shaft comprised of a minor portion, an intermediate portion, and a major portion. The major portion is rigidly attached to a ball end 4059. Each of the minor portion, the intermediate portion, and the major portion includes external threads. When the piston shafts 4015, 4025 are assembled, one of the ball fittings 4057 is attached to the tubes at each end such that the each of the minor portion, the intermediate portion, and the major portion engages one of the tubes. The ball fittings 4057 assist in securing the tubes relative to one another and ensure that the loads imparted to the piston shafts 4015, 4025 are distributed to all of the individual tubes. The ball end 4059 of the ball fitting 4057 is received by a ball joint 4065. Ball joints 4065 are connected to each of the upper and lower surfaces of the buoyancy block 4013, and ball joints 4065 are further connected to each of the upper and lower pistons 4017, 4027. The ball joint 4065 includes a semi-spherical recess for receiving the ball end 4059. A locking portion of the ball joint 4065 is provided to secure the ball end 4059 within the ball joint 4065. The configuration of the ball joint allows the piston shaft 4015 to rotate about the ball end 4059 relative to the ball joint 4065 such that slight angular movements of the buoyancy block within the buoyancy chamber do not impart significant torsional or bending forces to the piston shaft 4015. The primary angular movements of the buoyancy block 4013 against which the ball joint 4065 protects are those angular movements about axes perpendicular to the reciprocating motion of the buoyancy block 4013.

The angular movements of the buoyancy block 4013 described above are minimized by the presence of at least one slide mount 4111 attached to an exterior surface of the buoyancy block 4013. The slide mount 4111 includes a guide passage that is oriented to receive a guide post 4117 positioned around the perimeter of the buoyancy chamber. The slide mount 4111 assists in guiding the buoyancy block 4013 as it reciprocates within the buoyancy chamber 4014. Preferably, the guide passage is lined with a polymer material to reduce the friction between the slide mount 4111 and the guide post 4117. The angular movements of the buoyancy block 4013 are further minimized by the presence of both the upper and lower piston shafts 4015, 4025.

The buoyancy pump 4011 is anchored using a plurality of pilings that structurally support the various platforms, piston chamber, conduit, and other systems of the buoyancy pump 4011. Preferably, the buoyancy pump 4011 includes eight pilings (perimeter pilings 4211) that are spaced equally apart in a circular pattern, and an additional center piling 4213 located at the center of the circular pattern. Since the length of the pilings is relatively long, and since the pilings are subjected to forces from the pump operation, the ocean currents, the ocean tide, and wave action, a plurality of wing struts 4215 are connected between each perimeter piling 4211 and the center piling 4213. Each of the wing struts 4215 includes a sleeve 4217 at each end of the wing strut, and each sleeve receives one piling. Preferably, each sleeve is lined with a polymer to prevent metal-on-metal contact between the wing strut 4215 and the pilings. In addition to preventing excessive movement of the pilings relative to one another (thereby stiffening the pilings), the wing struts 4215 add considerable weight to the buoyancy pump 4011. The weight of the wing struts 4215 greatly assists in anchoring the buoyancy pump 4011, which is especially important when a portable buoyancy pump is used.

The previous description is of preferred embodiments for implementing the invention, and the scope of the invention should not necessarily be limited by this description. The scope of the present invention is instead defined by the following claims.

We claim:

1. A buoyancy pump comprising:
   a buoyancy block operable to reciprocally move in response to wave action in a body of water;
   a piston slidably disposed within a piston chamber and connected to the buoyancy block, the piston being reciprocally moveable in a first direction and a second direction in response to movement of the buoyancy block, the piston moving in the second direction to draw an operating fluid into the piston chamber and moving in the first direction to force the operating fluid out of the piston chamber; and
   a relief port operably associated with the buoyancy block to allow selective flooding of the buoyancy block to reduce a buoyancy force exerted by the buoyancy block.

2. The buoyancy pump according to claim 1 further comprising:
   a buoyancy block housing defining a buoyancy chamber through which water from the body of water may flow; and
   wherein the buoyancy block is disposed within the buoyancy chamber.

3. The buoyancy pump according to claim 2, wherein the operating fluid is water from the body of water.

4. The buoyancy pump according to claim 1 further comprising:
   a valve fluidly connected to the relief port to selectively prevent or allow a flooding fluid to enter the buoyancy block.

5. The buoyancy pump according to claim 4, wherein the flooding fluid is water from the body of water.

6. The buoyancy pump according to claim 4, wherein the valve is positioned on the buoyancy block.

7. The buoyancy pump according to claim 4, wherein the valve is remotely controlled.

8. The buoyancy pump according to claim 4, wherein the valve is automatically controlled in response to a sensor that measures wave height, water pressure adjacent the buoyancy block, or the buoyancy force exerted by the buoyancy block.

9. The buoyancy pump according to claim 1, wherein:
   the relief port is sealed by a stopper connected by a tether to a stationary structure; and
   the tether is of a predetermined length such that excessive movement of the buoyancy block within the buoyancy chamber causes the tether to dislodge the stopper from the relief port, thereby flooding the buoyancy block.

10. The buoyancy pump according to claim 9, wherein the stationary structure is a portion of the buoyancy pump.

11. The buoyancy pump according to claim 1 further comprising:
    a pressurized gas source fluidly connected to an inner space of the buoyancy block to purge the buoyancy block of liquid to increase the buoyancy force exerted by the buoyancy block.

12. A buoyancy pump comprising:
    a buoyancy block operable to reciprocally move in response to wave action in a body of water;
    a piston slidably disposed within a piston chamber and connected to the buoyancy block, the piston being reciprocally moveable in a first direction and a second direction in response to movement of the buoyancy block, the piston moving in the second direction to draw an operating fluid into the piston chamber and moving in the first direction to force the operating fluid out of the piston chamber; and
    a gas source fluidly connected to an inner space of the buoyancy block to purge the buoyancy block of liquid to increase a buoyancy force exerted by the buoyancy block.

13. The buoyancy pump according to claim 12, wherein the gas source is a pressurized gas tank connected to a portion of the buoyancy pump.

14. The buoyancy pump according to claim 12 further comprising:
    a buoyancy block housing defining a buoyancy chamber through which water from the body of water may flow; and
    wherein the buoyancy block is disposed within the buoyancy chamber.

15. The buoyancy pump according to claim 14, wherein the operating fluid is water from the body of water.

* * * * *